United States Patent
Song et al.

(10) Patent No.: US 12,191,548 B2
(45) Date of Patent: *Jan. 7, 2025

(54) HYBRID REDOX FUEL CELL SYSTEM

(71) Applicant: ESS TECH, INC., Wilsonville, OR (US)

(72) Inventors: Yang Song, West Linn, OR (US); Craig Evans, West Linn, OR (US)

(73) Assignee: ESS TECH, INC., Wilsonville, OR (US)

(*) Notice: Subject to any disclaimer, the term of this patent is extended or adjusted under 35 U.S.C. 154(b) by 54 days.

This patent is subject to a terminal disclaimer.

(21) Appl. No.: 17/929,623

(22) Filed: Sep. 2, 2022

(65) Prior Publication Data

US 2023/0089941 A1    Mar. 23, 2023

Related U.S. Application Data

(60) Provisional application No. 63/261,406, filed on Sep. 20, 2021.

(51) Int. Cl.
*H01M 8/18* (2006.01)
*H01M 8/06* (2016.01)
*H01M 8/22* (2006.01)

(52) U.S. Cl.
CPC ......... *H01M 8/188* (2013.01); *H01M 8/0693* (2013.01); *H01M 8/225* (2013.01)

(58) Field of Classification Search
CPC ..... H01M 8/188; H01M 8/0693; H01M 8/225
See application file for complete search history.

(56) References Cited

U.S. PATENT DOCUMENTS

| 7,572,546 | B2 | 8/2009 | Karamanev | |
| 2006/0251959 | A1* | 11/2006 | Karamanev | H01M 4/90 429/492 |
| 2009/0320648 | A1 | 12/2009 | Kummer et al. | |
| 2011/0200848 | A1* | 8/2011 | Chiang | H01M 8/188 429/105 |

(Continued)

FOREIGN PATENT DOCUMENTS

| EP | 4016681 A1 | 6/2022 |
| JP | S62256382 A | 11/1987 |
| KR | 20190012413 A | 2/2019 |

OTHER PUBLICATIONS

Fatih, K. et al., "Advancements in the Direct Hydrogen Redox Fuel Cell," Electrochemical and Solid-State Letters, vol. 11, No. 2, Nov. 26, 2007, 6 pages.

(Continued)

*Primary Examiner* — Alexander Usyatinsky
(74) *Attorney, Agent, or Firm* — McCoy Russell LLP

(57) ABSTRACT

A hybrid redox fuel cell system includes a hybrid redox fuel cell including an anode side through which a reductant is flowed and a cathode side through which liquid electrolyte is flowed, and a trickle bed reactor including a catalyst bed fluidly connected to the cathode side of the hybrid redox fuel cell. Furthermore, the liquid electrolyte includes a metal ion at a higher oxidation state and the metal ion at a lower oxidation state, and power is generated at the hybrid redox fuel cell by way of reducing the metal ion at the higher oxidation state to the lower oxidation state at the cathode side while oxidizing the reductant at the anode side.

9 Claims, 15 Drawing Sheets

(56) References Cited

U.S. PATENT DOCUMENTS

| | | |
|---|---|---|
| 2012/0171531 A1* | 7/2012 | Park .................. B60L 58/40 |
| | | 429/105 |
| 2013/0084482 A1 | 4/2013 | Chang et al. |
| 2014/0065460 A1* | 3/2014 | Evans ............... H01M 8/04186 |
| | | 429/101 |
| 2017/0040630 A1 | 2/2017 | Song et al. |
| 2018/0316033 A1* | 11/2018 | Evans ............... H01M 8/04186 |
| 2019/0097253 A1* | 3/2019 | Song .................. H01M 8/20 |
| 2022/0134292 A1 | 5/2022 | Liu et al. |
| 2022/0200030 A1 | 6/2022 | Liu et al. |
| 2022/0200035 A1 | 6/2022 | Kender |
| 2022/0209274 A1 | 6/2022 | Nicholls et al. |

OTHER PUBLICATIONS

Moraw, F., "Hybrid PEM Fuel Cell: Redox Cathode Approach," Master's of Applied Science Thesis, School of Chemical and Biological Engineering, University of British Columbia, Mar. 2009, 159 pages.

Cho, S. et al., "Flow-Field Geometry Effect on H2-Iron Redox Flow Battery," Journal of Energy Engineering, vol. 146, No. 6, Dec. 2020, 10 pages.

ISA Korean Intellectual Property Office, International Search Report and Written Opinion Issued in Application No. PCT/US2022/075601, Dec. 27, 2022, WIPO, 9 pages.

\* cited by examiner

FIG. 9
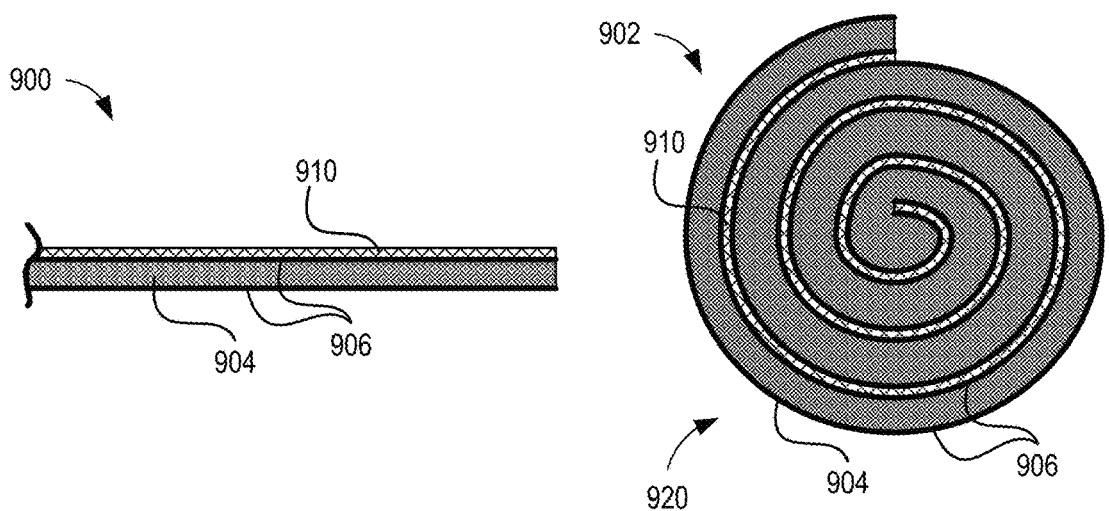
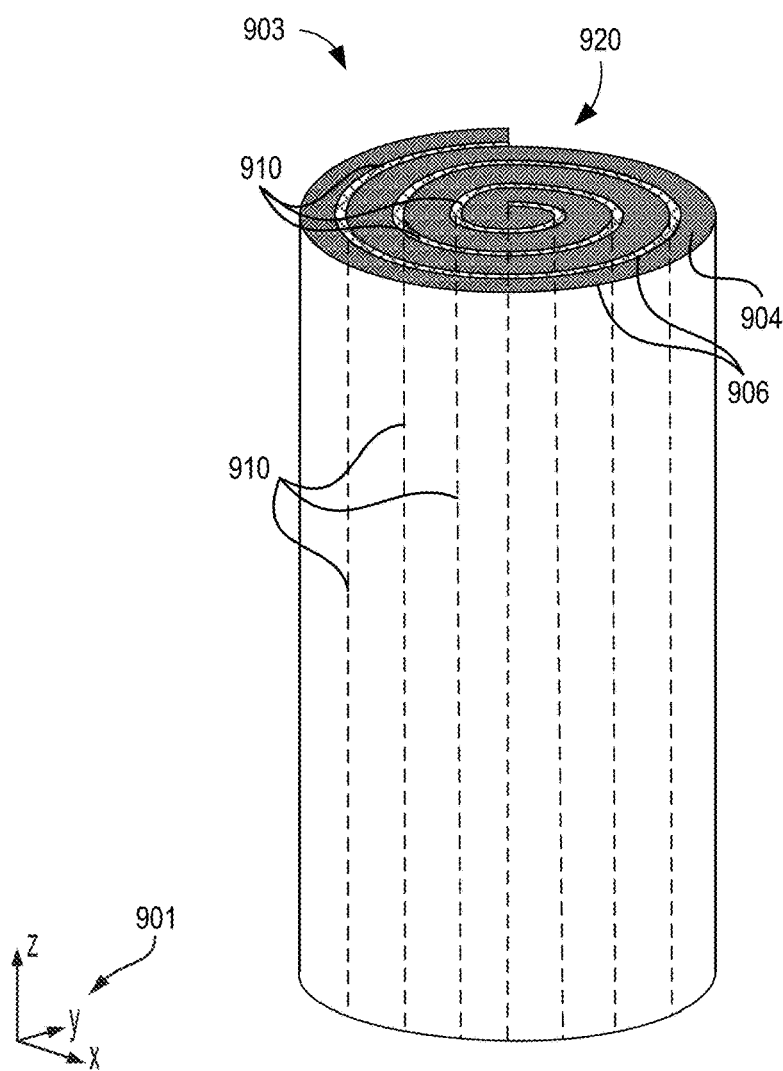

FIG. 16
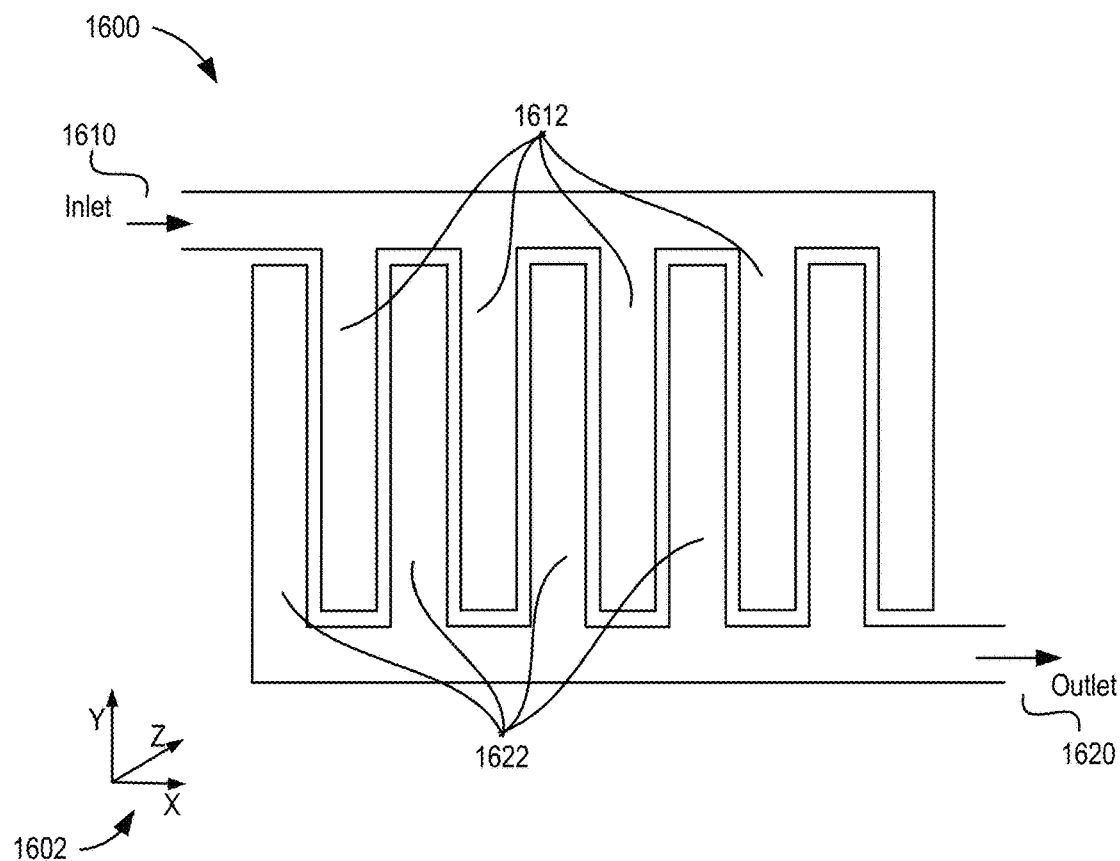
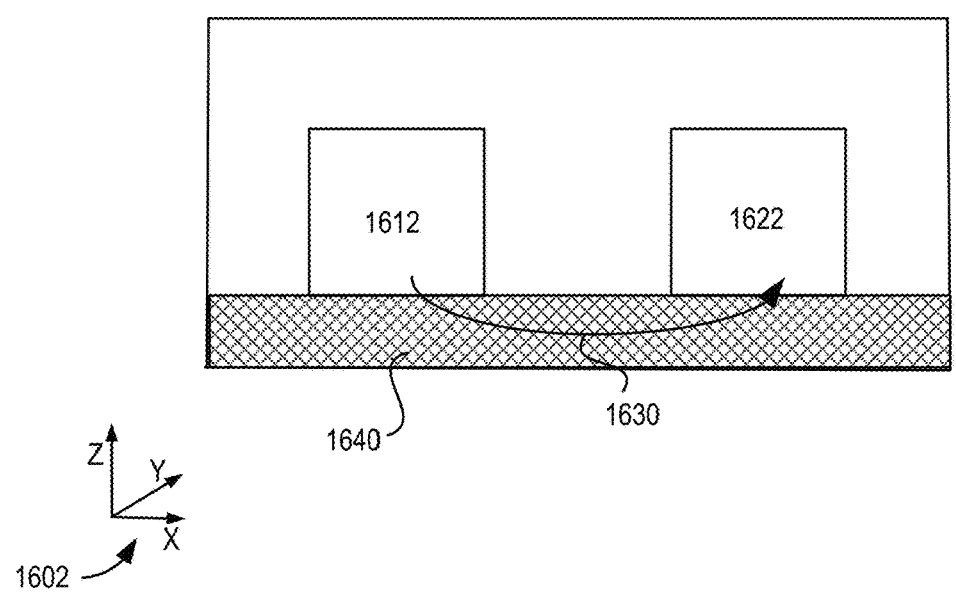

HYBRID REDOX FUEL CELL SYSTEM

CROSS REFERENCE TO RELATED APPLICATIONS

The present application claims priority to U.S. Provisional Application No. 63/261,406 entitled "HYBRID REDOX FUEL CELL SYSTEM" filed Sep. 20, 2021. The entire contents of the above identified application is hereby incorporated by reference for all purposes.

FIELD

The present description relates generally to a hybrid redox fuel cell system and methods of operating the hybrid redox fuel cell system.

BACKGROUND AND SUMMARY

Hydrogen-air fuel cell technologies have not achieved widespread adoption due to their high cost, lower electrical efficiency, and reliability challenges. These issues are largely a result of the slow kinetic rate and high electrochemical potential of the cathode oxygen reduction reaction (ORR). In particular, the ORR utilizes expensive precious metal catalysts and complex three-boundary electrode designs to drive the ORR. Further still, the high ORR electrochemical potential (~1.2V) contributes to several major fuel cell stack degradation mechanisms, such as carbon corrosion and membrane degradation. Consequently, traditional fuel cell systems utilize expensive raw materials, such as graphitized electrodes and bipolar plates, which undergo complex and costly manufacturing treatment processes in order to mitigate material degradation caused by the high electrochemical potential. Further still, to achieve increased performance and system efficiency desirable for economic and practical viability, traditional fuel cell systems include additional subsystems for heat recovery, water management, and other complex system designs to increase stack performance, which increases overall system complexity and reduces overall system reliability.

In contrast with hydrogen-air fuel cells, a hybrid redox fuel cell replaces oxygen with a metal ion redox couple as the oxidant, whereby reduction of a metal ion oxidant at the cathode occurs concomitantly with hydrogen oxidation at the anode, as represented by equations (1) and (2). In equation (2), $M^{x+}$ represents a higher oxidation state metal ion, and $M^{(x-1)+}$ represents a lower oxidation state metal ion, wherein the lower oxidation state is lower in oxidation number than the higher oxidation state. As non-limiting examples, the metal, M, utilized for the metal ion redox couple may include manganese ($Mn^{2+}/MnO_2$), vanadium, copper, and iron. In one example, the metal ion redox couple may include a ferric ion/ferrous ion redox couple, with the fuel cell reactions represented by equations (1) and (2'):

$$1/2\ H_2 - e^- \leftrightarrow H^+ \quad \text{(anode reaction)} \quad E^0 = 0.00\ V \quad (1)$$

$$M^{x+} + e^- \leftrightarrow M^{(x-1)+} \quad \text{(generalized cathode reaction)} \quad (2)$$

$$Fe^{3+} + e^- \leftrightarrow Fe^{2+} \quad \text{(cathode reaction)} \quad E^0 = 0.771\ V \quad (2')$$

When the standard potential ($E^0$) at the cathode is greater than the standard potential at the anode, the resulting Gibbs free energy of the anode and cathode reactions is negative and therefore, the reactions given by equations (1) and (2) occur spontaneously. As such, the hybrid redox fuel cell achieves a substantially higher theoretical electrical efficiency as compared to conventional hydrogen-air fuel cells. Due to the high energy density of hydrogen and the low cost of earth abundant metal ion such as iron, there is substantial commercial interest in the development of hybrid redox fuel cells. However, to enable long term energy storage, regeneration of the metal ion is desirable to preclude storage and handling of large volumes of liquid electrolyte. A common regeneration scheme includes air oxidation of the reduced metal oxidant (e.g., the lower oxidation state metal ion), which is thermodynamically favorable, but kinetically slow due to the oxygen reduction reaction and mass transfer limitations. As such, although hybrid redox fuel cells are able to achieve higher theoretical electrical efficiencies as compared to hydrogen-air fuel cells, power generation in hybrid redox fuel cells tends to be limited by an attainable rate of oxidant regeneration.

One approach, that at least partially addresses the issues discussed above, includes a hybrid redox fuel cell system including a hybrid redox fuel cell, the hybrid redox fuel cell including an anode side through which a reductant is flowed and a cathode side through which liquid electrolyte is flowed, and a trickle bed reactor including a catalyst bed fluidly connected to the cathode side of the hybrid redox fuel cell. Furthermore, the liquid electrolyte includes a metal ion at a higher oxidation state and the metal ion at a lower oxidation state, and power is generated at the hybrid redox fuel cell by way of reducing the metal ion at the higher oxidation state to the lower oxidation state at the cathode side while oxidizing the reductant at the anode side.

Utilizing the catalyst bed in the trickle bed reactor is advantageous as compared to conventional fuel cell system oxidant regeneration reactor configurations because contact time and contact surface area between oxygen and the liquid electrolyte are both increased substantially, thereby reducing mass transfer limitations. In this way, the technical effect of increasing oxidant regeneration rates in the hybrid redox fuel cell system can be achieved. Furthermore, the trickle bed reactor is simple in design, thereby reducing manufacturing complexity and cost, and increasing system reliability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows a schematic of example configurations of an oxidant regeneration reactor catalyst bed in the hybrid redox fuel cell system of FIG. 8, including end and perspective views of a spiral wound jelly roll catalyst bed configuration.

FIG. 16 shows a schematic of an example structured flow field for the hybrid redox fuel cell of FIG. 1.

DETAILED DESCRIPTION

Figure 2:
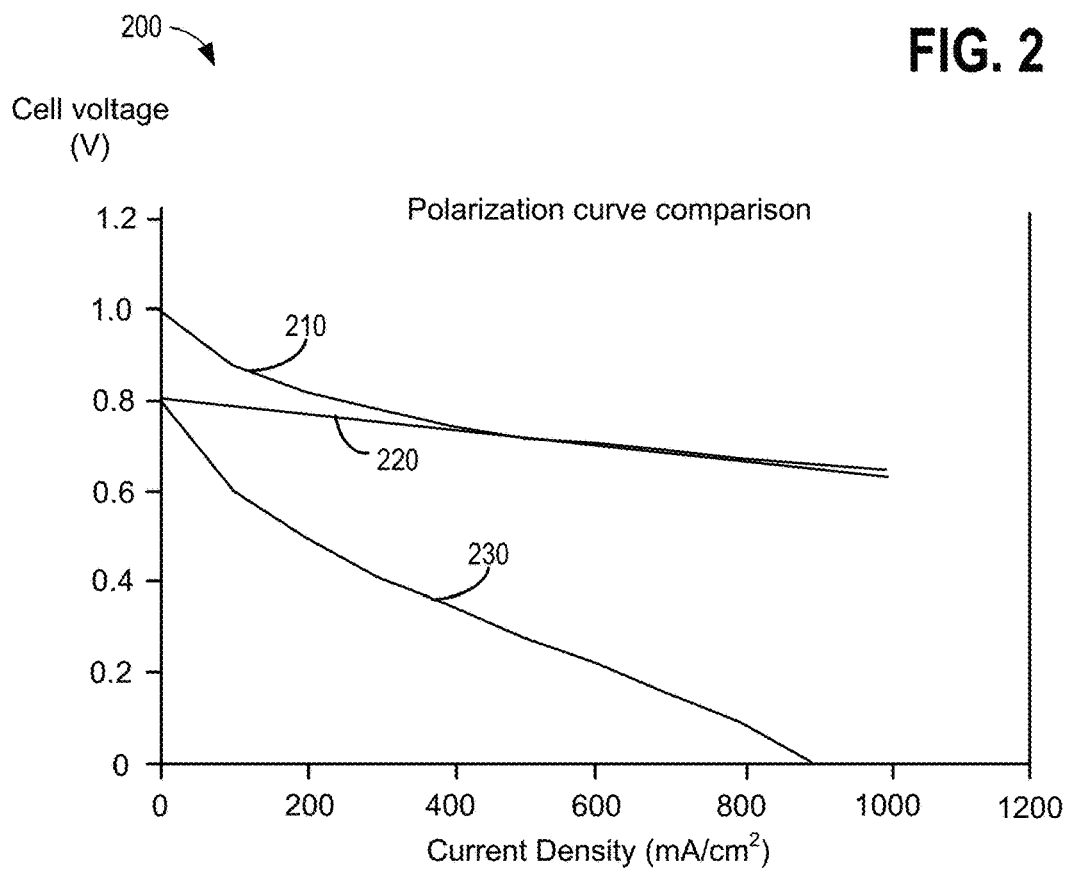
FIGS. 2 and 3 show example graphs comparing performance data of various fuel cells.
Figure 3:
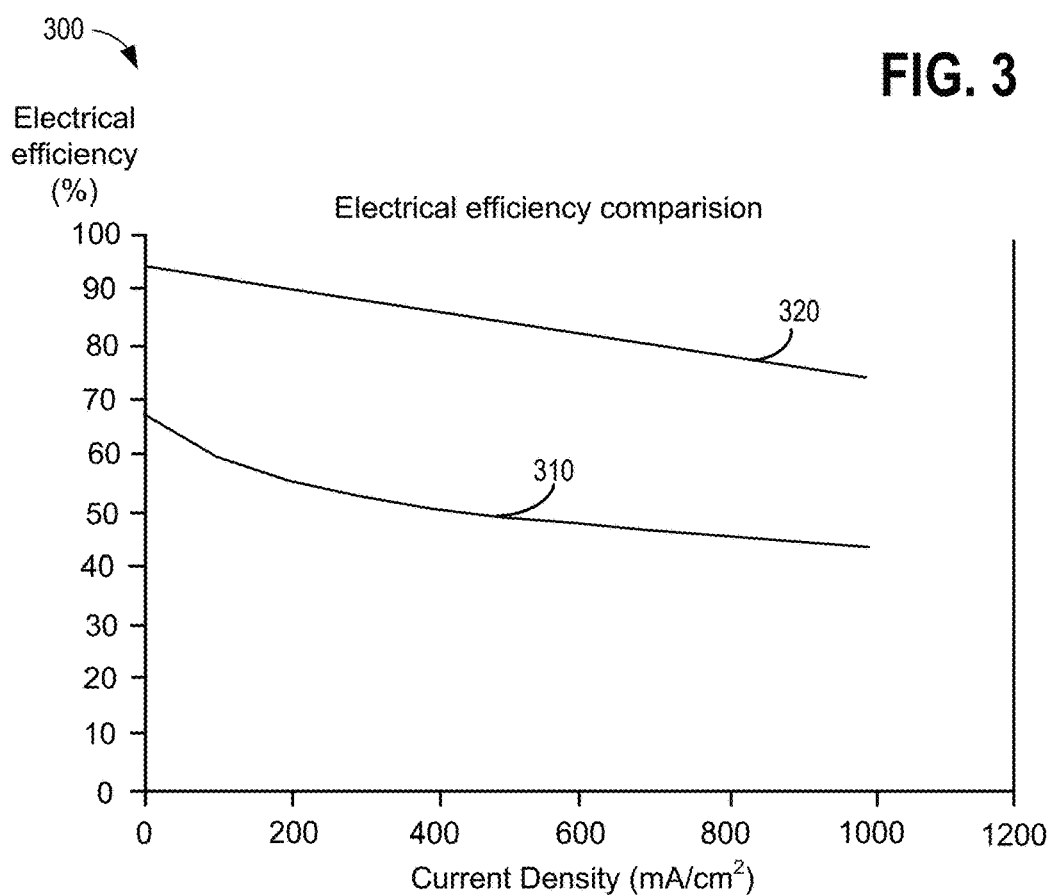
Figure 7:
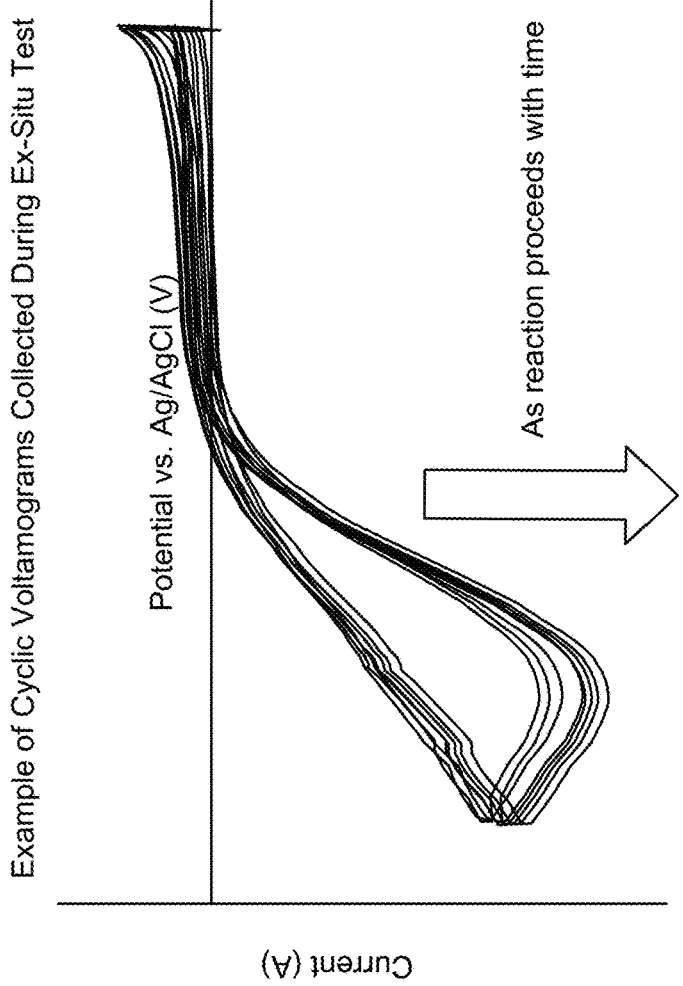
FIG. 7 shows a plot illustrating performance of an oxidant regeneration process, such as the oxidant regeneration process characterized by way of the test apparatus of FIG. 6.
Figure 8:
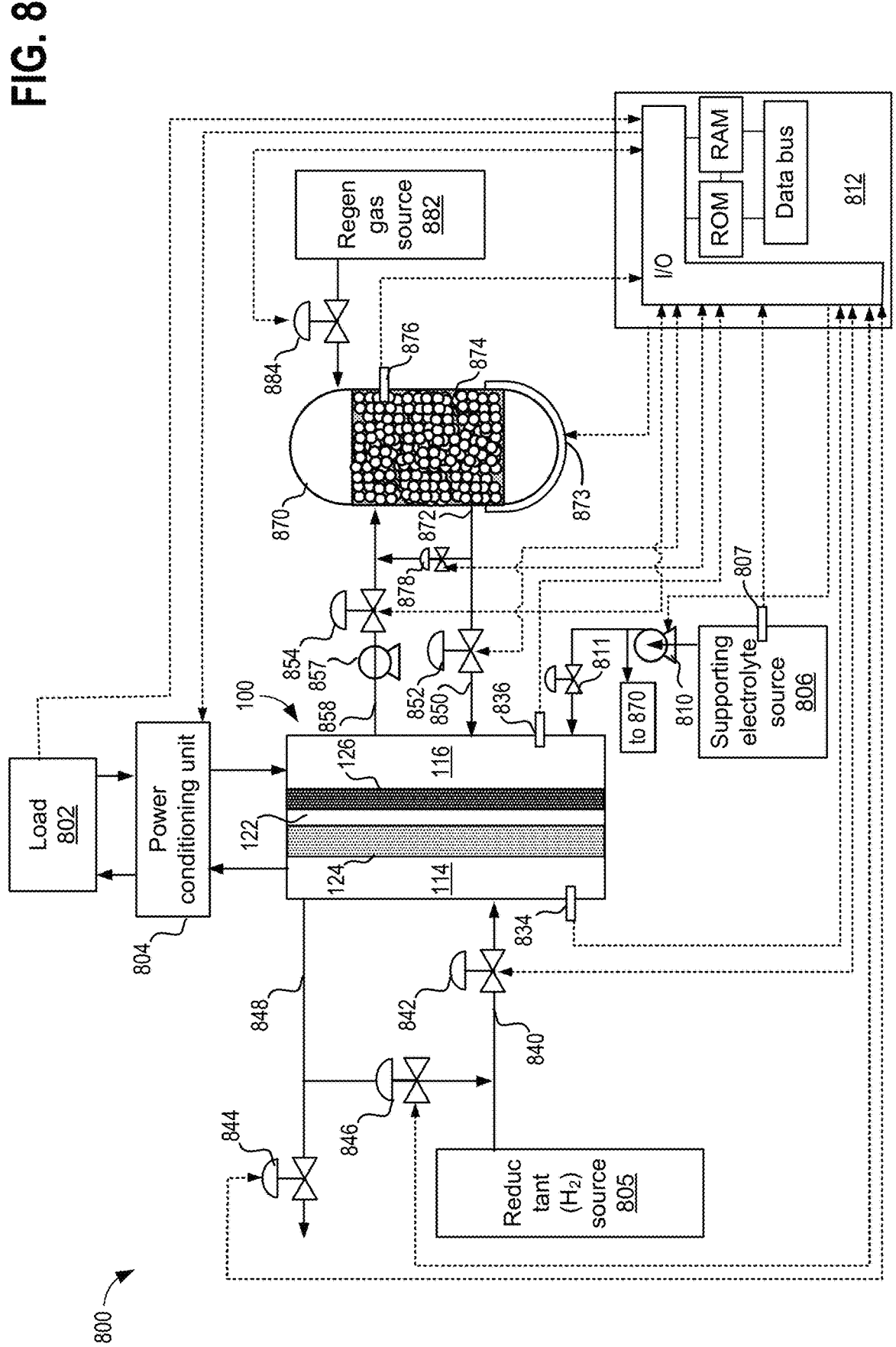
FIG. 8 shows a schematic of an example hybrid redox fuel cell system including the hybrid redox fuel cell of FIG. 1 and the oxidant regeneration process characterized by the test apparatus of FIG. 6.
Figure 10:
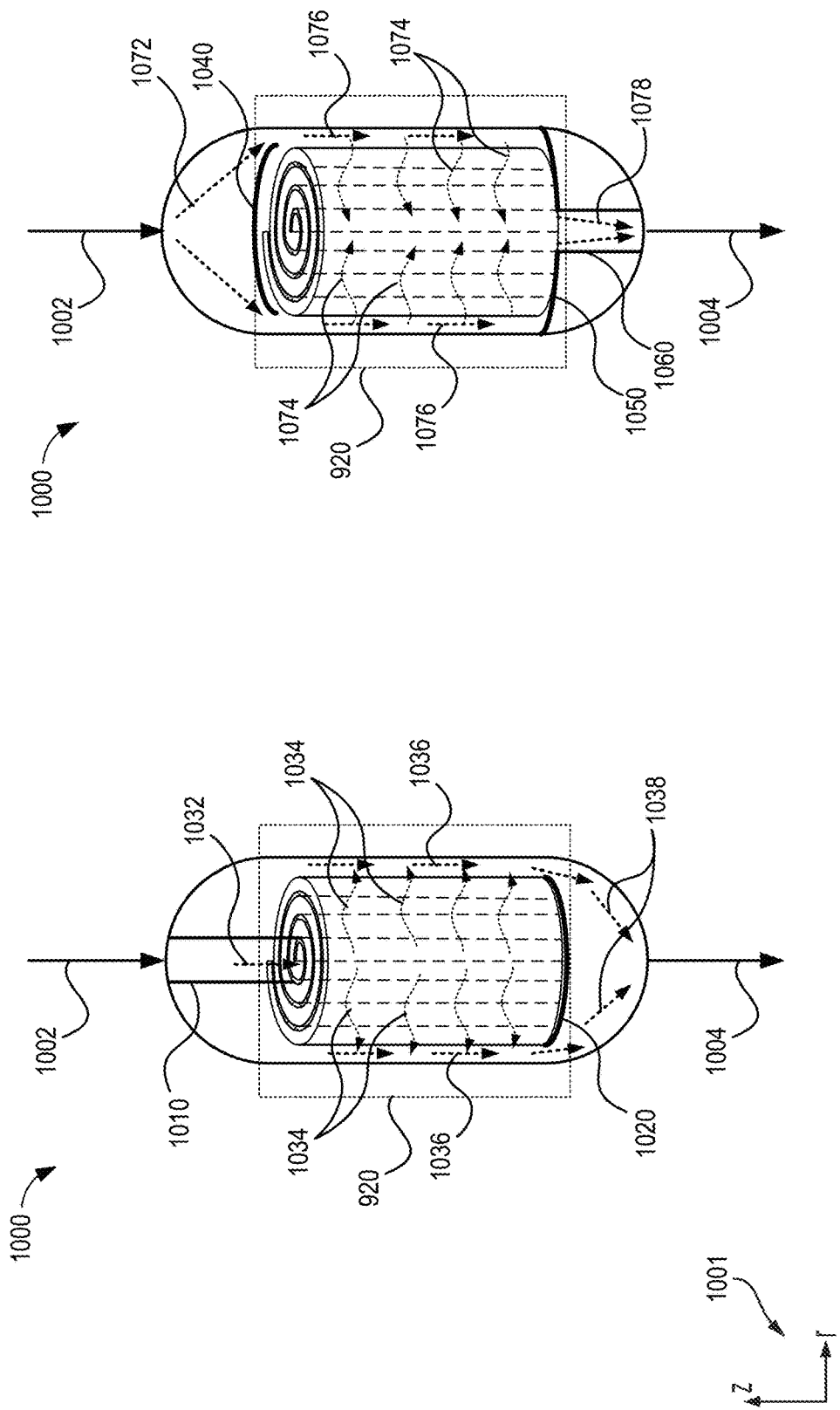
FIG. 10 shows a schematic of example oxidant regeneration reactor vessels, including the spiral-wound jelly roll catalyst bed configuration of FIG. 9.
Figure 11:
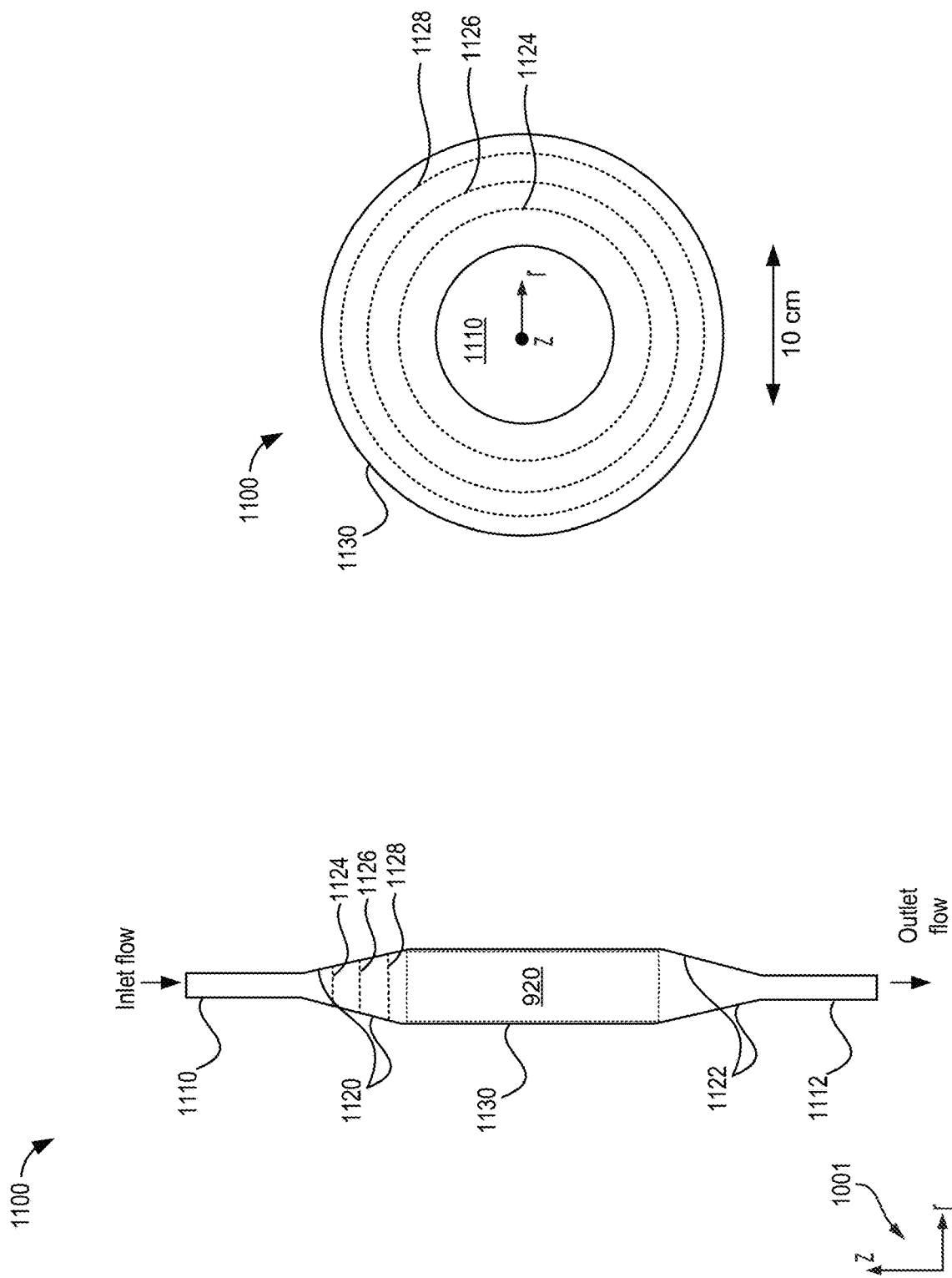
FIG. 11 shows schematic of various views of the oxidant regeneration reactor vessels of FIG. 10.

The following description relates to systems and methods for a hybrid redox fuel cell system. In an exemplary embodiment, the hybrid redox fuel cell system includes a hybrid redox fuel cell depicted schematically in FIG. 1. The hybrid redox fuel cell includes structured flow fields, as shown in FIG. 16, for increasing electroactive surface area of the electrode and for increasing distribution of the electrolyte to and from the electroactive surface area of the electrode. Furthermore, the hybrid redox fuel cell can be configured as a cell assembly shown in FIG. 4, whereby multiple hybrid redox fuel cells can be stacked in series and/or parallel to form a hybrid redox fuel cell stack (e.g., power module). The performance of the hybrid redox fuel cell as compared to a conventional fuel cell is shown in FIGS. 2 and 3. In contrast with a conventional fuel cell system as shown in FIG. 5A, the hybrid redox fuel cell system includes an oxidant delivery system to provide for regeneration of the redox oxidant. Various oxidant regeneration reactor configurations, as shown in FIGS. 5B and 5C, can be piloted with an experimental test apparatus shown in FIG. 6 and each of the test apparatuses can be evaluated by way of a cyclic voltammogram, as shown in FIG. 7. FIG. 8 illustrates a hybrid redox fuel cell system, including the hybrid redox fuel cell and the oxidant regeneration reactor. In one embodiment, the oxidant regeneration reactor may include a catalyst bed spiral wound into a jelly roll configuration, as shown in FIGS. 9-11, with corresponding flow distributions therethrough depicted in FIG. 12. In an alternative embodiment, the oxidant regeneration reactor of FIG. 10 may include a catalyst bed configured as a trickle bed. Operation of the hybrid redox fuel cell system may be performed by way of methods illustrated in the flow charts of FIGS. 13 and 14. In one example, the power generation capacity of the hybrid redox fuel cell system can be increased by including a plurality of hybrid redox fuel cells coupled with a plurality of oxidant regeneration reactors, as shown in FIG. 15.

Figure 1:
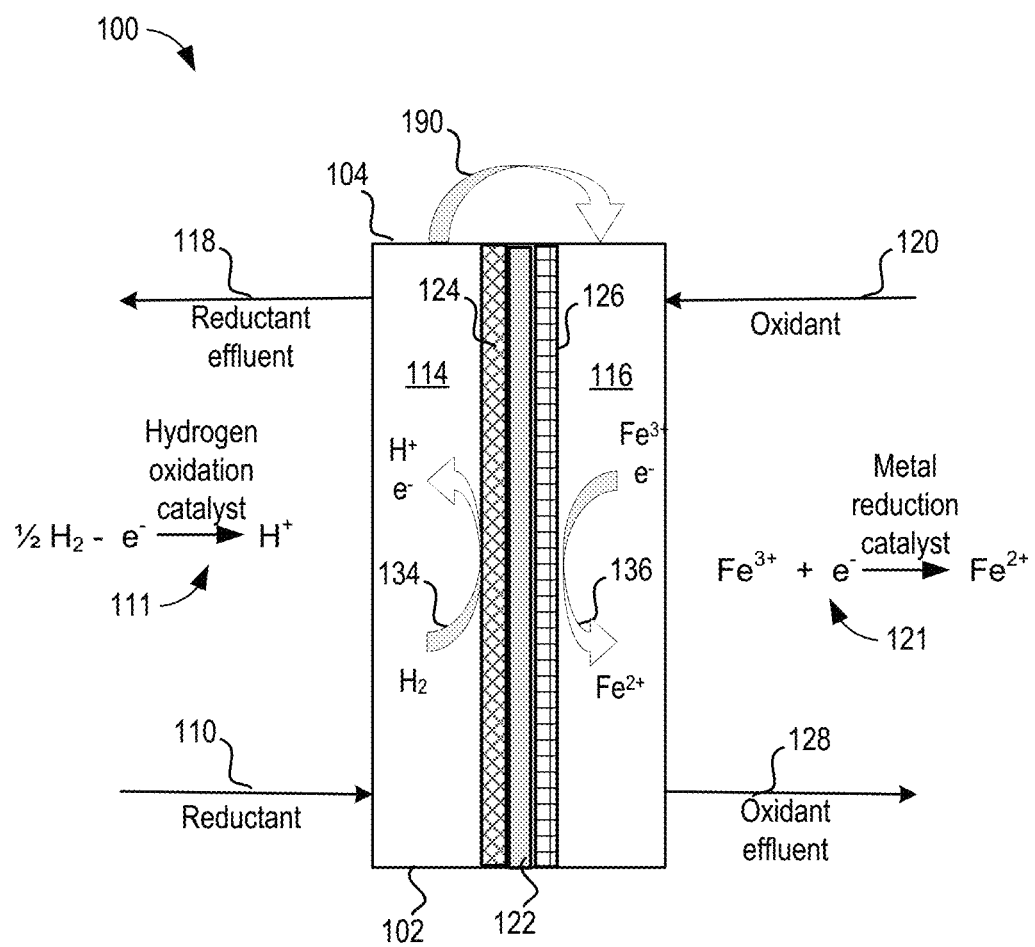
FIG. 1 shows a schematic diagram of an example hybrid redox fuel cell.

Turning now to FIG. 1, it illustrates a process schematic of an example high performance hybrid redox fuel cell 100. In one embodiment, a hybrid redox fuel cell system 800 may include one or more hybrid redox fuel cells 100. FIG. 1 depicts a non-limiting example of a hydrogen-ferric/ferrous ion hybrid redox fuel cell; however, the hybrid redox fuel cell systems and methods described herein may additionally or alternatively include other types of hybrid redox fuel cells. Herein, anode refers to an electrode where electroactive material loses electrons and cathode refers to an electrode where electroactive material gains electrons. As illustrated in FIG. 1, reductant (e.g., hydrogen gas) 110 is supplied to the anode side of a hybrid redox fuel cell 100, where the reductant 110, flows through a flow field of the anode compartment 114 (also herein referred to as anode side 114) to the anode 124. In some examples, the reductant includes only gaseous reductant without any liquid reductant. As indicated by the hydrogen oxidation chemical equation 111 and the reaction arrow 134, within the anode compartment 114, the hydrogen gas is fluidly contacted with a hydrogen oxidation catalyst, and electrons are catalytically stripped from the hydrogen to produce protons (e.g., hydrogen ions) and electrons, according to equation (1). In one example, the hydrogen oxidation catalyst may be supported on a surface of the anode 124 so that upon oxidation of the hydrogen, electrons are conducted from the hybrid redox fuel cell 100 by way of an anode current collector (not shown in FIG. 1) conductively coupled to the anode 124, as depicted schematically by current flow arrow 190. In one example, the hydrogen oxidation catalyst may include a platinum-based catalyst supported on a carbon substrate. In other examples, the hydrogen oxidation catalyst may include a small amount (e.g., 0.02 mg/cm$^2$ to >0.2 mg/cm$^2$) of one or a combination of precious metals, such as Pt, Pd, Ru, Rd or their alloys, supported on a conductive carrier, such as carbon.

Simultaneously with the oxidation of reductant 110 at the anode 124, an oxidant 120 (e.g., ferric ion electrolyte) is supplied to the cathode side of the hybrid redox fuel cell 100, where the oxidant 120 flows through a flow field of the cathode compartment 116 (also herein referred to as cathode side 116) to the cathode 126. In the case of a hydrogen-ferric/ferrous ion hybrid redox fuel cell, as indicated by the ferric ion reduction chemical equation 121 and the reaction arrow 136, within the cathode compartment 116, the ferric ion solution is fluidly contacted at a metal reduction catalyst such as a carbon catalyst (e.g., carbon surface) at the cathode 126, and electrons are accepted by ferric ions, thereby reducing the ferric ions and producing ferrous ions. The carbon surface at the cathode 126 may include a porous carbon felt or foam, to aid in increasing surface area for fluidly contacting the liquid electrolyte (e.g., ferric ions in solution) with the cathode surface. Furthermore, the carbon surface may be supported on the cathode 126 so that electrons conductively supplied into hybrid redox fuel cell (e.g., as depicted by current flow arrow 190) at the cathode surface by the cathode current collector (not shown in FIG. 1) conductively coupled thereto may be fluidly contacted at the carbon surface concomitantly with the ferric ion to produce ferrous ion.

The oxidant 120 may include a metal ion liquid electrolyte solution, whereby the metal ion electrolyte includes one or more of a higher oxidation state metal ion and a lower oxidation state metal ion. The higher oxidation state metal ion refers to the oxidized state of the oxidant 120 and the lower oxidation state metal ion refers to the reduced state of the oxidant 120. Accordingly, the lower oxidation state metal ion has a lower oxidation number than the higher oxidation state metal ion. In the example of FIG. 1, the metal ion electrolyte solution includes a solution of ferric ions, such as an ionic solution of a ferric salt. Choice of oxidant electrolyte composition, including metal ion salts, ion complexes, and supporting conductive species, can influence electrolyte resistivity, charge-transfer kinetics and overall kinetic rates of oxidant reduction at the hybrid redox fuel cell cathode. In one non-limiting example, the oxidant electrolyte solution may include ferric sulfate and ferrous sulfate. Furthermore, the oxidant electrolyte solution may include sulfuric acid solution, and the oxidant electrolyte solution may include ferrous and ferric free ions and/or complex compounds. The oxidant electrolyte may include ferric chloride and ferrous chloride. A concentration of the oxidant electrolyte may be maintained up to a threshold oxidant electrolyte concentration. When the oxidant electrolyte includes ferric chloride and ferrous chloride, the threshold oxidant electrolyte concentration (e.g., total concentration of ferric/ferrous chloride) includes 6 M. In one example, the threshold oxidant electrolyte concentration may correspond to a solubility of the oxidant electrolyte, whereby above the threshold oxidant electrolyte concentration, precipitation of the oxidant electrolyte may occur over operating temperature ranges of the hybrid redox fuel cell. For the case when the oxidant electrolyte includes ferric sulfate and ferrous sulfate, the threshold oxidant electrolyte concentration includes 2 M. In another example, the oxidant electrolyte solution may include a mixture of ferric sulfate and ferrous sulfate, and ferric chloride and ferrous chloride.

The hybrid redox fuel cell 100 further includes a separator 122. The separator 122 may include an electrically-insulating ionic-conducting barrier interposed between and in fluid communication with both the anode compartment 114 and the cathode compartment 116. The separator 122 provides high ionic conductivity while preventing anolyte and catholyte from crossover. In particular, the separator 122 prevents bulk mixing of the reductant 110 (e.g., hydrogen gas) and the oxidant 120 (liquid electrolyte), while allowing conductance of specific ions therethrough. For example, the separator 122 may include an ion-exchange membrane or a microporous membrane. In one embodiment, for the case of the hydrogen-ferric/ferrous ion hybrid redox fuel cell, hydrogen protons (e.g., $H^+$) produced at the anode compartment 114 may cross over to the cathode compartment 116 by way of a selectively ion-permeable membrane (e.g., separator 24). As such, ionic movement and diffusion of the hydrogen protons drive the hydrogen protons into solution at the cathode compartment 116. In contrast, the ion-permeable membrane may be impermeable to bulk liquid and gas, and as such, may preclude crossover of ion species in the liquid electrolyte from the cathode compartment 116 to the anode compartment 114 and crossover of hydrogen gas to from the anode compartment 114 to the cathode compartment 116. In the example of FIG. 1, the separator 24 is interposed between and in direct fluid communication with both the anode 124 and the cathode 126. As such, hydrogen protons generated from hydrogen gas oxidation at the anode surface can readily cross over to the cathode compartment by way of crossover through the separator 122.

Selecting a separator 122 with higher ionic conductivity allows for higher voltaic efficiency of the hybrid redox fuel cell. Furthermore, by selecting a separator 122 with high ion selectivity to reduce electrolyte crossover, the separator 122 allows for higher coulombic efficiency of the hybrid redox fuel cell. Further still, selecting a separator 122 with higher chemical and mechanical stability across the operating conditions of the hybrid redox fuel cell can increase reliability and reduce operational costs.

Although not depicted in FIG. 1, a load external to the fuel cell 100 may be conductively coupled between the anode current collector and the cathode current collector. As such, electrons generated from oxidation of reductant 110 at the anode may flow through the load, supplying power thereto, prior to being supplied to the cathode for the oxidant reduction reaction.

Effluent from the hybrid redox fuel cell 100 includes a reductant effluent 118 exiting the anode compartment 114 and an oxidant effluent 128 exiting the anode compartment 114. The reductant effluent 118 can include unreacted reductant 110 and various products of the anode reductant oxidation reaction. The oxidant effluent 128 can include unreacted oxidant 120, products of the oxidant reduction reaction, and other unreactive species in the redox electrolyte solution. In the case of the hydrogen-ferric/ferrous ion hybrid redox fuel cell, the reductant effluent 118 includes unreacted hydrogen gas, while the oxidant effluent 128 includes an electrolyte solution of ferric ion, ferrous ion, hydrogen protons, and oxidant electrolyte anions. In the case where the oxidant electrolyte includes ferric and ferrous chloride, the oxidant electrolyte anions include chloride anions. In the case where the oxidant electrolyte includes ferric and ferrous sulfate, the oxidant electrolyte anions include sulfate anions. In the case where the oxidant electrolyte includes a mixture of ferric and ferrous chloride and ferric and ferrous sulfate, the oxidant electrolyte anions include chloride anions and sulfate anions.

As depicted in FIG. 1, the hybrid redox fuel cell may be operated in a countercurrent flow configuration, whereby supply of the reductant 110 to the anode compartment 114 at a first end 102 of the hybrid redox fuel cell 100 corresponds to discharge of the oxidant effluent 128 from the cathode compartment 116 at the first end 102 of the hybrid redox fuel cell 100; and discharge of the reductant 110 from the anode compartment 114 at a second end 104 of the hybrid redox fuel cell 100 corresponds to supply of the oxidant 120 to the cathode compartment 116 at the second end 104 of the hybrid redox fuel cell 100. In other examples, the hybrid redox fuel cell 100 may be operated in a co-current (e.g., parallel) flow configuration, whereby supply of the reductant 110 to the anode compartment 114 at a first end 102 of the hybrid redox fuel cell 100 corresponds to supply of the oxidant 120 to the cathode compartment 116 at the first end 102 of the hybrid redox fuel cell 100; and discharge of the reductant effluent 118 from the anode compartment 114 at a second end 104 of the hybrid redox fuel cell 100 corresponds to discharge of the oxidant effluent 128 from the cathode compartment 116 at the second end 104 of the hybrid redox fuel cell 100. A countercurrent flow configuration may be advantageous because of increased distribution of reductant 110 and oxidant 120 to and from the electroactive surface area of the anode 124 and cathode 126, respectively.

In some embodiments, operation of the hybrid redox fuel cell according to the methods and systems described herein can include various features in order to reduce performance loss mechanisms characteristic of traditional fuel cell systems. In one example, forced convection of the liquid electrolyte to and within the hybrid redox fuel cell can aid in further increasing the cathode active surface area, helping to ensure that the cathode and carbon surface areas are more completely utilized, thereby increasing oxidant reduction rates thereat. Utilizing forced convection also aids in refreshing electrolyte concentrations at the carbon surface, sweeping away redox products expediently, thereby reducing concentration gradients and mass-transfer limitations to the redox reaction. In one example, forced convection can include turbulent flow of the liquid electrolyte within the cathode compartment 116 to reduce formation of boundary layers at liquid-solid interfaces, thereby further reducing mass transfer limitations.

Furthermore, the hybrid redox fuel cell may include flow field plates (also described herein as flow plates) or structures integrated and/or incorporated with the electrodes or in conjunction with the electrodes to impose a desired flow field configuration for increasing electroactive surface area of the electrode and for increasing distribution of the electrolyte to and from the electroactive surface area of the electrode. As an example, the flow field plates may include an interdigitated flow field (IDFF), serpentine flow field, parallel flow field, and/or other flow fields to aid in distribution of electrolyte evenly across the active electrode surface. The flow field plates may include structural features such as channels and ribs interposed between the channels, and flow field design parameters such as a number of channels, a number ribs, a channel-to-rib ratio, and the like, may be selected to balance increasing flow plate-to-membrane electrode assembly (MEA) contact area (to reduce ohmic resistance) while maintaining adequate diffusion of electrolyte reactants around the ribs to aid in reducing a risk of stagnation (e.g., mass transfer limited) regions thereat. The flow field plates may further be designed to reduce a pressure difference across the separator 122, which aids in reducing undesired anolyte and catholyte crossover. Reducing the pressure difference across the separator 122 in the case of a hydrogen-ferric/ferrous ion hybrid redox fuel cell, can substantially aid in reducing anolyte and catholyte crossover since the anode side reaction occurs in the gas-phase, while the cathode side reaction occurs in the liquid phase.

Increasing uniformity of the flow distribution of electrolyte across the hybrid redox fuel cell electrodes aids in sustaining higher fuel cell efficiencies and prolonging fuel lifetime. Increasing uniformity of the flow distribution may refer to having a more even mass distribution of electrolyte reactants across each flow channel within a single hybrid redox fuel cell. Increasing uniformity of the flow distribution may further refer to having a more even mass distribution of electrolyte reactants across each flow channel and across multiple hybrid redox fuel cells in a multi-cell stack or in a multi-stack energy generation system. Further still, increasing uniformity of flow distribution may refer to supplying adequate mass distribution of electrolyte reactants in the vicinity of the electrolyte effluent discharge on the cathode side of the hybrid redox fuel cell. Said in another way, increasing uniformity of flow distribution of electrolyte refers to reducing overall mass transfer limitations related to electrolyte reactants across the cathode compartment of the hybrid redox fuel cell.

At the same time, a thickness of the cathode may be reduced to reduce ohmic resistance and to reduce electrode manufacturing costs. As such, these electrodes with higher carbon surface area (and reduced thickness) may be provided to aid in reducing a distance between the reaction front and the separator 122 (e.g., sustaining the redox reaction front adjacent to the separator 122 by reducing boundary layer formation and mass transfer limitations), which reduces ohmic losses in the hybrid redox fuel cell, especially as compared to conventional fuel cells. Further performance increases in the hybrid redox fuel cell associated with operational methods and control systems are described hereinbelow with reference to FIG. 8.

Turning now to FIGS. 2 and 3, they illustrate plots 200 and 300 comparing performance of the hybrid redox fuel cells described herein as compared to prior art. By incorporating forced convection and structured flow field features into the hybrid redox fuel cells (as described in greater detail below with reference to FIG. 16), a substantial increase in fuel cell performance and electrical efficiency compared to the prior art is expected. FIG. 2 illustrates a plot of fuel cell voltage versus current density for a hydrogen-air fuel cell 210 and a conventional hybrid redox fuel cell 230, in comparison with that of an improved hybrid redox fuel cell 220 incorporating the performance features (e.g., forced convection, structured flow field elements, electrode design, operational methods and control schemes, and the like) described herein. Owing to insufficient utilization of the cathode active surface area and mass transfer limitations that cause reduced redox reaction rates in the fuel cell, the cell voltage of the conventional hybrid redox fuel cell 230 drops significantly below the cell voltage of the hydrogen-air fuel cell as current density is increased. In contrast, the improved hybrid redox fuel cell 220 is able to achieve cell voltages on par with the hydrogen-air fuel cell 210 at higher current densities (e.g., above 500 mA/cm$^2$). Furthermore, referring to FIG. 3, it illustrates a plot of electrical efficiency versus current density for a hydrogen-air fuel cell 310 as compared with an improved hybrid redox fuel cell 320. The improved hybrid redox fuel cell 320 is able to achieve the higher cell voltages at higher current densities while maintaining a substantially higher electrical efficiency, as compared with hydrogen-air fuel cell 310. In other words, the improved hybrid redox fuel cell is able to achieve on par cell voltage with a traditional hydrogen-air fuel cell at current densities above 500 mA/cm$^2$, but with greater than 80% electrical efficiency, as compared to ~50% electrical efficiency for a traditional hydrogen-air fuel cell.

As discussed previously, the increase in electrical efficiency for the hybrid redox fuel cell as compared to the hydrogen-air fuel cell can be achieved because metal ion reduction rates over the hybrid redox fuel cell carbon cathode are orders of magnitude higher as compared to the oxygen reduction reaction (ORR) at the cathode of a hydrogen-air fuel cell, thereby increasing electrical efficiency and reducing material costs. Furthermore, selecting a metal ion oxidant with a lower redox equilibrium potential as compared with the ORR potential can reduce a risk of fuel cell degradation while facilitating inclusion of less costly fuel cell components. Further still, additional subsystems for heat recovery are precluded. Further still incorporating forced convection and structured flow field features allows for further increases in fuel cell performance by reducing mass transfer limitations and utilizing more of the electrode active surface area. In this way, the improved hybrid redox fuel cell can generate energy at higher current densities with higher electrical efficiency while reducing material and manufacturing costs, decreasing a risk of fuel cell degradation, simplifying manufacturing complexity, and increasing system reliability, as compared with conventional fuel cell systems.

Figure 4:
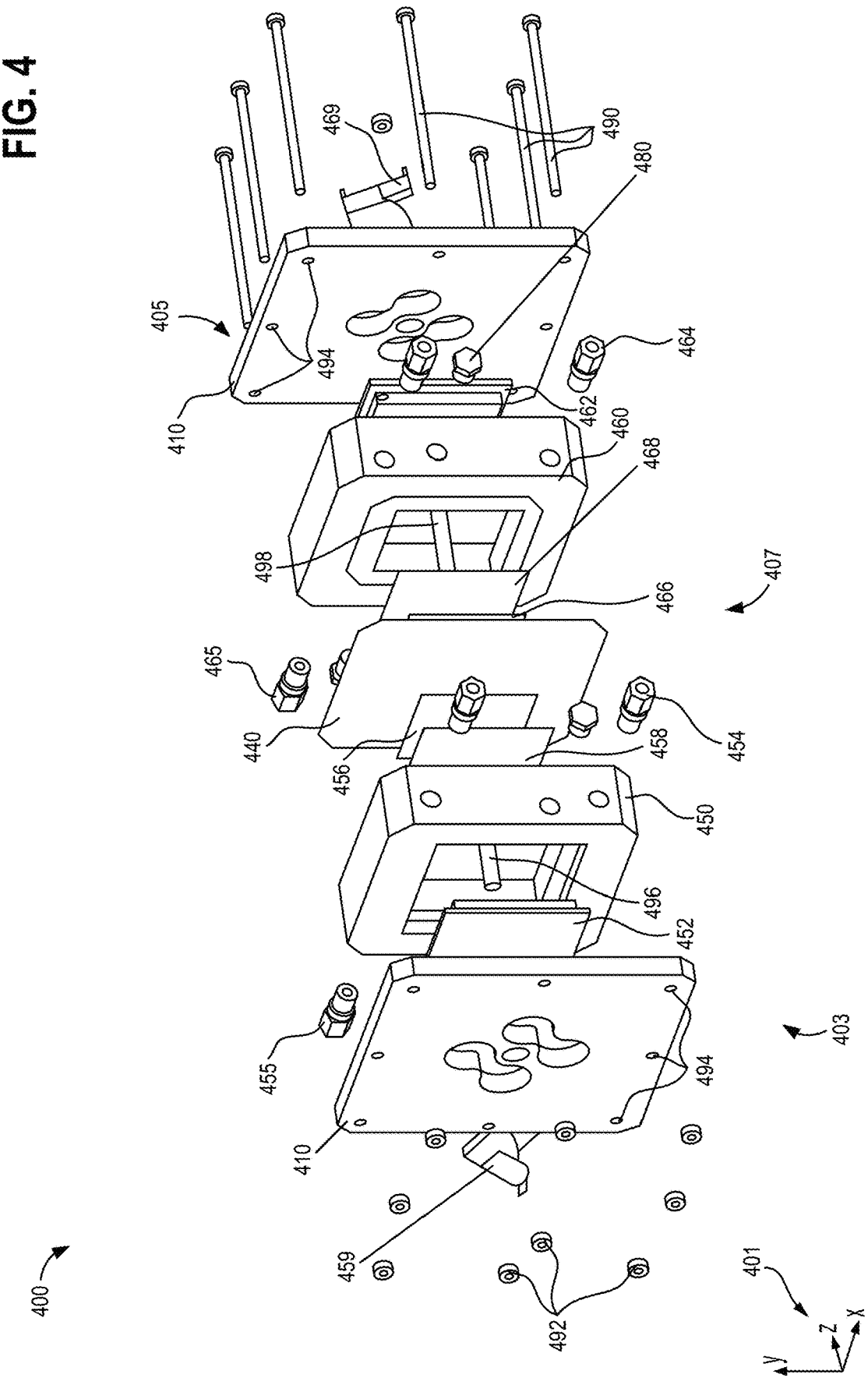
FIG. 4 shows an exploded view of an example cell assembly for the hybrid redox fuel cell of FIG. 1.
Figure 5A:
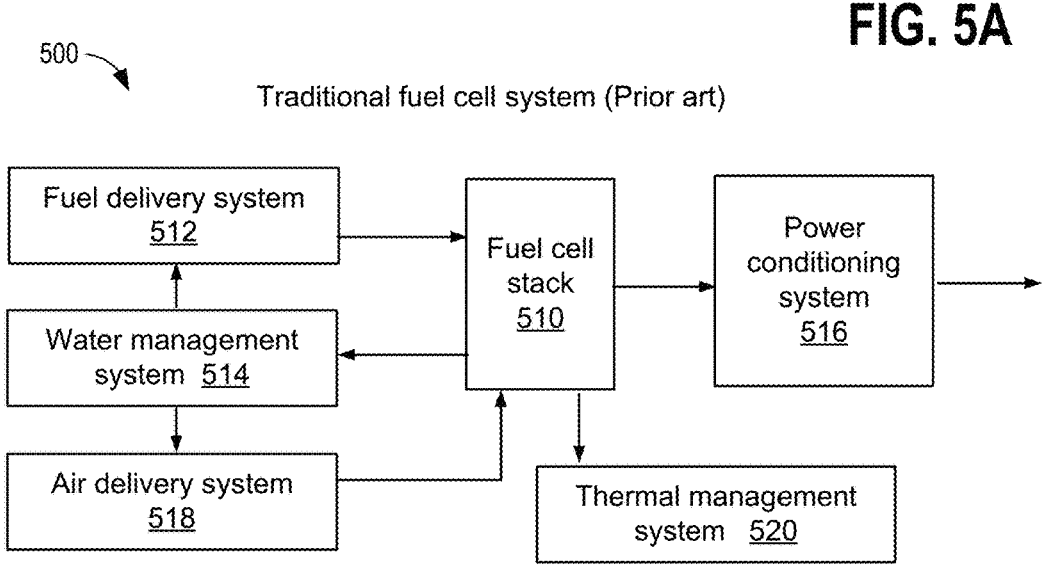
FIGS. 5A, 5B, and 5C show example process flow schematics of a conventional fuel cell system and a hybrid redox fuel cell system, and an oxidant delivery system.
Figure 5B:
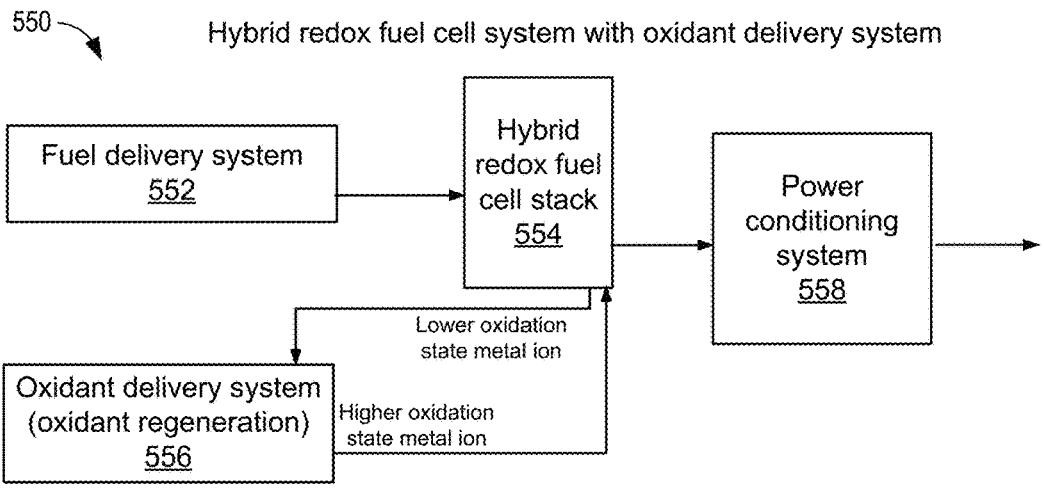
Figure 5C:
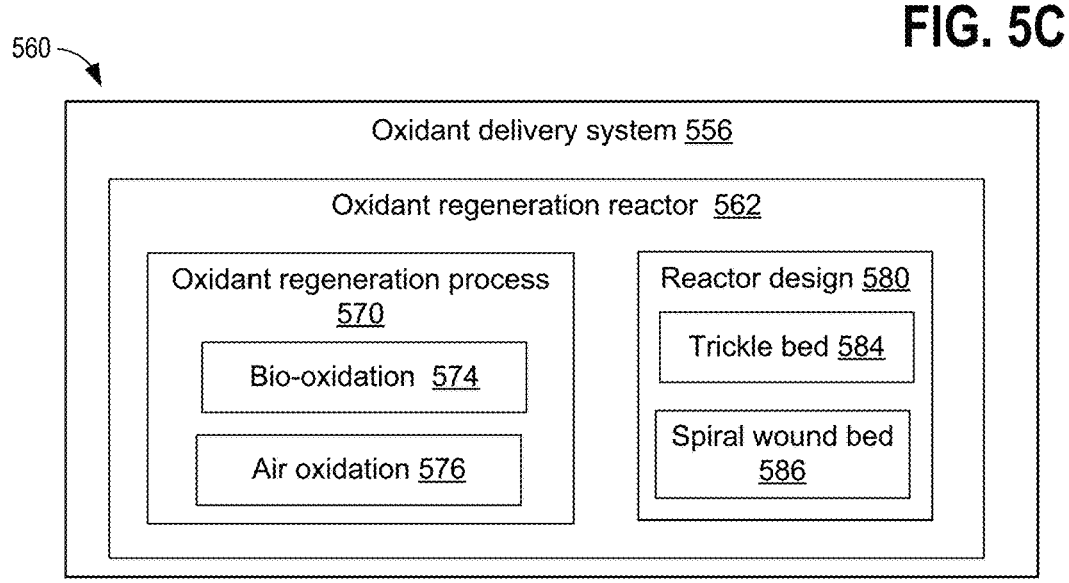

Turning now to FIG. 4, it illustrates an example cell assembly 400 for the hybrid redox fuel cell of FIG. 1, drawn to scale. A set of reference axes 401 is provided, indicating a y-axis, an x-axis, and a z-axis. The cell assembly 400 may include a series of components arranged as layers within the cell assembly 400. The layers may be positioned co-planar with a y-x plane and stacked along the z-axis. Pressure plates 410 may be arranged at a first end 403 on the anode side of the cell assembly 400 and a second end 405 on the cathode side of the cell assembly 400. The pressure plates 410 provide rigid end walls that define boundaries of the cell assembly 400, and allow layers of the cell assembly 400 to be pressed together between the pressure plates 410 to seal components of the power module within an interior 407 of the cell assembly 400. In one example, the pressure plates 410 include aluminum pressure plates.

The interior 407 of the cell assembly may refer to the components and volume between the pressure plates 410 at the first end 403 and the second end 405 of the cell assembly 400 when the pressure plates 410 are pressed to seal the components of cell assembly 400 together. The interior 407 includes features of the cell assembly 400 corresponding to and defining the anode compartment 114 (herein also referred to as anode side) and cathode compartment 116 (herein also referred to as cathode side) of the hybrid redox fuel cell 100. Sealing the cell assembly 400 may be performed by inserting the tie rods 490 through the corresponding tie rod holes 494 in the pressure plates 410 and tightening the tie rod nuts 492, thereby sandwiching and sealing the components and volume of the interior 407 between the first end 403 and the second ends 405 of the cell assembly 400.

Next, components of the interior 407 of the cell assembly 400 are described. The interior surface of the pressure plates 410 may include picture frame structures (not shown in FIG. 4) raised and arranged around the inside perimeter of the pressure plates, e.g., against sides of the pressure plates facing inwards along the z-axis, towards the interior 407 of the cell assembly 400. The picture frame structures may be configured to interface with one another to seal fluids within the interior 407 of the cell assembly 400. In one example, the picture frame structures may include grooves for housing perimeter gaskets seal fluids within the interior 407 of the cell assembly 400.

Elements of the interior 407 of cell assembly 400 at the anode side of the fuel cell are now described along a direction from the first end 403 (e.g., anode side) towards the second end 405 (e.g., cathode side). An anode spacer 452 and anode flow plate 450 are arranged adjacent to the interior surface of the pressure plate 410 positioned at the first end 403, the anode spacer 452 and anode flow plate 450 serving as flow manifolds, defining flow channels for directing and distributing reductant fluid entering the cell assembly 400 across active surfaces of the anode. The reductant may enter and exit the anode side of the cell assembly 400 by way of anode flow ports 454 and 455, one of the anode flow ports 454 and 455 configured to deliver fluid into the anode flow plate 450 of the cell assembly 400 and the other of the anode flow ports configured to discharge fluid from the anode flow plate 450 of the cell assembly 400.

As described above, the flow channels defined by the anode spacer 452 and anode flow plate 450 may include interdigitated flow field, serpentine, parallel, and/or other types of flow channels to aid in more fully distributing the reductant across an active surface area of the anode. An anode current collector 458 and an anode bipolar plate 456 are positioned in face-sharing contact with the anode spacer 452 and anode flow plate 450. The anode bipolar plate 456 includes an integrated electrode (e.g., the anode 124) along a surface of the anode bipolar plate 456. Furthermore, the anode bipolar plate 456 is positioned between the anode spacer 452 and surrounded by the anode flow plate 450 that provides structural support to the bipolar plate 456 and the anode integrated therein.

By positioning the anode current collector directly adjacent to the anode and anode bipolar plate 456, electrons produced from oxidation of the reductant at the anode may be expediently conducted away of the cell assembly 400 for power generation.

A separator 440 is interposed between the anode and cathode sides of the cell assembly 400. In particular, separator 440 may be positioned directly between and adjacent to (e.g., in face-sharing contact with) the anode (and anode bipolar plate 456) and the cathode (and cathode bipolar plate 466). Furthermore, the anode integrated with the anode bipolar plate 456 may correspond to anode 124 and the cathode integrated with the cathode bipolar plate 466 may correspond to cathode 126. Separator 440 may correspond to separator 122 of hybrid redox fuel cell 100, and may include a selectively ion-permeable membrane such as an ion exchange membrane, a microporous membrane, and the like. In the cell assembly 400, the separator 440 may be coupled with and surrounded by a rigid separator frame plate for structural support.

Next, elements of the interior 407 of cell assembly 400 at a cathode side of the fuel cell are now described along a direction from the second end 405 (e.g., cathode side) towards the first end 403 (e.g., anode side). A cathode spacer 462 and cathode flow plate 460 are arranged adjacent to the interior surface of the pressure plate 410 positioned at the second end 405, the cathode spacer 462 and cathode flow plate 460 serving as flow manifolds, defining flow channels for directing and distributing oxidant fluid entering the cell assembly 400 across active surfaces of the cathode. The oxidant may enter and exit the cathode side of the cell assembly 400 by way of cathode flow ports 464 and 465, one of the cathode flow ports 464 and 465 configured to deliver fluid into the cathode flow plate 460 of the cell assembly 400 and the other of the cathode flow ports configured to discharge fluid from the cathode flow plate 460 of the cell assembly 400.

As described above, the flow channels defined by the cathode spacer 462 and cathode flow plate 460 may include interdigitated flow field, serpentine, parallel, and/or other types of flow channels to aid in more fully distributing the oxidant electrolyte across an active surface area of the anode. A cathode current collector 468 and a cathode bipolar plate 466 are positioned in face-sharing contact with a cathode spacer 462 and cathode flow plate 460. The cathode bipolar plate 466 includes an integrated electrode (e.g., the cathode 126) along a surface of the cathode bipolar plate 466. Furthermore, the cathode bipolar plate 466 is positioned between the cathode spacer 462 and surrounded by the cathode flow plate 460 that provides structural support to the cathode bipolar plate 466 and the cathode integrated therein. By positioning the cathode current collector directly adjacent to the cathode and cathode bipolar plate 466, electrons produced from oxidation of the reductant at the anode may be expediently conducted away of the cell assembly 400 for power generation.

One or more reference electrodes 480 may be positioned in the flow paths of the reductant and oxidant of the anode and the cathode sides, respectively, of the cell assembly 400 for setting and indicating a relative potential of the hybrid redox fuel cell and for monitoring the electrode performance during operation of the cell assembly 400. In one example, the reference electrodes 480 may include Ag/AgCl reference electrodes.

The cell assembly may also include various sensors for measuring temperature, conductivity, pH, electrolyte species concentration, gas pressure, and the like, as further described in detail with reference to FIG. 8. As one example, temperature sensors may be positioned at the anode and cathode outlet flow ports to provide an indication of the cell assembly temperature at the anode and cathode sides, respectively. Furthermore, heating elements (not shown in FIG. 4) may be conductively coupled to each of the anode and cathode current collectors. In response to the cell assembly temperature dropping below a lower threshold temperature, power may be supplied to one or more of the heating elements to raise the cell assembly temperature at the anode and/or cathode. Furthermore, thermal switches and/or thermal fuses 459 and 469 may be positioned at one or both of the anode and cathode sides of the fuel cell to stop power generation at the cell assembly 400 when a measured temperature thereat increases above an upper threshold temperature. The upper threshold temperature may correspond to a boiling temperature of the liquid electrolyte or a temperature above which a degradation risk of seals and/or other components of the cell assembly 400 may be increased.

Increasing the temperature of the hybrid redox fuel cell can increase electrolyte conductivity and kinetic reaction rates of the reductant oxidation at the anode and oxidant reduction at the cathode. However, increasing temperature may also adversely influence electrolyte stability. In some examples, electrolyte stability may decrease with increasing temperature because of increased propensity for electrolyte degradation and/or side reactions. Thus, in another example, the upper threshold temperature may correspond to a temperature above which a risk of electrolyte degradation (e.g., reduced electrolyte stability) is increased. In the case of a hydrogen-ferric/ferrous ion hybrid redox fuel cell, an upper threshold temperature may correspond to a boiling temperature of the liquid electrolyte at the cathode side. Furthermore, a lower threshold temperature may correspond to a freezing temperature of the liquid electrolyte at the cathode side. In the case of a hydrogen-ferric/ferrous ion hybrid redox fuel cell, degradation and precipitation reactions may occur above the boiling temperature of the liquid electrolyte and below the freezing temperature of the liquid electrolyte, respectively.

The gas pressure at the anode compartment 114 may be maintained at a lower threshold gas pressure. Furthermore, the lower threshold gas pressure may be maintained at or slightly above the liquid electrolyte pressure at the cathode compartment 116, so as to reduce a risk of electrode flooding. In one example, the lower threshold gas pressure includes 5 psi above the liquid electrolyte pressure. In another example, the lower threshold gas pressure includes 3 psi above the liquid electrolyte pressure. In another example, the lower threshold gas pressure includes a 1-2 kPa above the liquid electrolyte pressure). In another example, the lower threshold gas pressure includes 1-10 Pa overpressure. The lower threshold gas pressure at the anode compartment may be maintained as low as possible to reduce operating costs while maintaining adequately uniform electrolyte and gas flow distributions throughout the hybrid redox fuel cell.

As depicted in the embodiment of FIG. 4, the cell assembly 400 includes a single hybrid redox fuel cell with components therein corresponding to a single anode side and a single cathode side. In another embodiment, the components described above positioned at the interior 407 of the cell assembly 400 (e.g., the anode spacer 452, the anode flow plate 450, the anode flow ports 454 and 455, the anode bipolar plate 456, the anode, the anode current collector 458, the separator 440, the cathode spacer 462, the cathode flow plate 460, the cathode flow ports 464 and 455, the cathode bipolar plate 466, the cathode, the cathode current collector 468) may repeat within the cell assembly, from the first end 403 to the second end 405, a number of times, forming a multi-celled hybrid redox fuel cell stack. Each cell of the hybrid redox fuel cell stack may be electrically connected to generate current in parallel and/or in series.

In one embodiment, the cell assembly 400 may correspond to the hydrogen-ferric/ferrous ion hybrid redox fuel cell, as shown in FIG. 1. In other words, reductant 110 (e.g., hydrogen) is supplied to the anode side of the cell assembly 400, wherein the volume of the anode compartment 114 is defined by the anode spacer 452, anode flow plate 450, and anode bipolar plate 456. Surfaces of the anode bipolar plate 456 and/or the anode (e.g., anode 124) integrated therein may support hydrogen oxidation catalyst thereon to facilitate oxidation of the hydrogen gas (e.g., according to equation (1)). The anode current collector is conductively coupled to the anode bipolar plate 456 and the anode so that electrons may be expediently conducted out of the cell assembly 400 by way of the anode current collector 458 and the anode current collector lead 496. In one example, the anode current collector 458 may include a gold-coated copper current collector. Anode flow ports 454 and 455 may facilitate supply of reductant 110 to the cell assembly 400 and discharge of reductant effluent 118 therefrom.

Similarly, oxidant 120 (e.g., liquid electrolyte including ferric ion oxidant) is supplied to the cathode side of the cell assembly 400, wherein the volume of the cathode compartment 116 is defined by the cathode spacer 462, cathode flow plate 460, and cathode bipolar plate 466. The cathode bipolar plate 466 and/or the cathode (e.g., cathode 126) integrated therein may include carbonaceous surfaces for facilitating the redox reaction. In particular, the cathode may include one or more three-dimensional carbonaceous surfaces such as graphite felt and/or foam, arranged along a face of the cathode bipolar plate 466 opposite of the cathode spacer 462. In one embodiment, the cathode 126 may further include a carbon coated plastic mesh electrode. The mesh structure can allow for increased electroactive surface area, while reducing the amount of electrode active material; accordingly the cost of the expensive conductive materials can be decreased while increasing performance of the hybrid redox fuel cell 100.

Furthermore, the cathode current collector 468 is conductively coupled with and adjacent to the cathode so that electrons may be delivered into the cell assembly 400 at the cathode (by way of the cathode current collector 468 and the cathode current collector lead 498) expediently to drive reduction of ferric ion (e.g., according to equation (2)). In one example, the cathode current collector 468 may include a gold-coated copper current collector. Cathode flow ports 464 and 465 may facilitate supply of oxidant electrolyte 120 to the cell assembly 400 and discharge of oxidant effluent 128 therefrom. The separator 440 may correspond to separator 122, and may be configured to allow hydrogen protons to cross over from the anode side to the cathode side, while preventing crossover of liquid electrolyte from the cathode side to the anode side.

Turning now to FIG. 16, it illustrates an example of a structured flow field plate 1600 and electrode configuration that can aid in increasing electroactive surface area of the electrode and for increasing distribution of the electrolyte to and from the electroactive surface area of the electrode. FIG. 16 is depicted relative to a three-dimensional x-y-z coordinate axis 1602, where the x-axis is aligned in a width-direction, the y-axis is aligned in a length direction, and the z-axis is aligned in a height or thickness direction of an electrode stack assembly, analogous to coordinate axis 401

(see FIG. 4). The z-axis refers to a transverse axis that is perpendicular to the x-y plane of each layer of the electrode stack assembly.

The flow field plate 1600 may include structural features such as flow channels and ribs interposed between the flow channels, and flow field design parameters such as a number of channels, a number ribs, a channel-to-rib ratio, and the like, may be selected to balance increasing flow plate-to-membrane electrode assembly (MEA) contact area (to reduce ohmic resistance) while maintaining adequate diffusion of electrolyte reactants around the ribs to aid in reducing a risk of stagnation (e.g., mass transfer limited) regions thereat. The structured flow field plate 1600 may correspond to one or more of anode flow plate 450 and cathode flow plate 460. Furthermore, the flow channels and ribs may be created by arranging the anode spacer 452 or cathode spacer 462 and anode flow plate 450 or cathode flow plate 460 adjacent to the interior surface of the pressure plate 410, respectively.

An example of an interdigitated flow field (IDFF) plate 1600 is shown in FIG. 16 with interdigitated ribs 1612 and 1622 for directing flow of electrolyte at the cathode side of the membrane. In particular, electrolyte may be directed from an inlet 1610 to an outlet 1620 of the flow field plate 1600. As shown in the cross-sectional view 1650 of the interdigitated flow field plate 1600, electrolyte flow (indicated by the arrow 1630) from the interdigitated inlet channels of the interdigitated ribs 1612 to the outlet channels of the interdigitated ribs 1622 can occur by way of the porous electrode 1640, thus providing forced convection of the electrolyte. Here, the porous electrode 1640 may correspond to one or more of anode 124 and/or cathode 126 of the hybrid redox fuel cell 100. As non-limiting examples, the porous electrode 1640 may include a porous catalyst substrate such as a carbon mesh or carbon foam. In another non-limiting example, the positive electrode may include porous carbon foam and the negative electrode may include porous carbon paper; furthermore, both the positive electrode and the other electrode may include flow field plates. In other non-limiting examples, the flow field plate 1600 may include a non-IDFF flow plate such as a serpentine flow plate, a spiral flow plate, a pin flow plate, or a parallel flow plate with non-interdigitated ribs. Owing to the dead-end channels, the IDFF flow field may be advantageous as compared with other flow fields because electrolyte fluids may be distributed across the flow field more thoroughly, filling the interdigitated dead-end channels before diffusing through the porous electrode 1640 from the inlet channels to the outlet channels.

Turning now to FIGS. 5A and 5B, they illustrate process flow schematics for a traditional hydrogen-air fuel cell system 500 as compared with a higher performing hybrid redox fuel cell system 550, as described herein. In the case of the hydrogen-air fuel cell system 500, a fuel delivery system 512 delivers hydrogen and oxygen (e.g., air) to the hydrogen-air fuel cell stack 510, which outputs power to a power conditioning system 516. The power conditioning system 516 may serve to convert the power generated from the fuel cell system to a practically-usable form. As examples, the power conditioning system 516 may convert direct current to alternating current, transform voltage, and the like, depending on the application. The fuel and air delivery systems 512 and 518 may include humidifiers for increasing humidity of the hydrogen and/or air and reducing a risk of membrane dehydration. Additionally, compressors, filters and separators may be employed for controlling pressure and purity of the fuel supplied.

Owing to the slow kinetics of the cathodic ORR, traditional hydrogen-air fuel cells are costly (due to utilization of expensive catalysts to increase ORR reaction kinetics) and exhibit lower electrical efficiencies near 40%. In order to increase stack performance and the overall system efficiency through heat recovery, the traditional hydrogen-air fuel cell system 500 includes fuel delivery system 512, air delivery system 518, water management system 514, and thermal management subsystems 520. For example, the thermal management subsystems 520 may direct a portion of the waste heat (e.g., water vapor) generated from a hydrogen-air fuel cell to a condenser and a preheater for preheating fuel (e.g., hydrogen, air) to the fuel cell. The remaining portion of the waste heat stream may be directed to a turbine other device to generate power. By incorporating these heat recovery mechanisms (e.g., thermal management subsystems), the traditional fuel cell system 500 can achieve overall system efficiencies approaching 80%; however, the added system complexity significantly increases manufacturing and operating costs and reduces system reliability.

In contrast, the hybrid redox fuel cell system 550 is simpler when compared with the traditional fuel cell system 500. A fuel delivery system 552 supplies hydrogen gas to the hybrid redox fuel cell stack 554, where the hydrogen gas is oxidized at the anode while oxidant is reduced at the cathode (e.g., higher oxidation state metal ion is reduced to lower oxidation state metal ion in liquid electrolyte). Power generated from the hybrid redox fuel cell stack 554 is supplied to the power conditioning system 558, and oxidant is regenerated (e.g., lower oxidation state metal ion is oxidized back to higher oxidation state metal ion) and supplied to the hybrid redox fuel cell stack 554 by the oxidant delivery system 556. Because water is not a byproduct of the hybrid redox fuel cell process, and because the electrical efficiency of the hybrid redox fuel cell is inherently higher (>80%), the water management system 514, air delivery system 518, and thermal management system 520 are eliminated from the hybrid redox fuel cell system, substantially reducing system complexity as compared with the traditional fuel cell system 500. A simplified system design is advantageous, translating to fewer system components, simpler control algorithms, lower system cost, and increased system reliabilities.

As shown in FIGS. 5B and 5C, the oxidant delivery system 556 includes an oxidant regeneration reactor 562 that regenerates oxidant in the liquid electrolyte from the liquid electrolyte effluent discharged from the cathode of the hybrid redox fuel cell. In particular, the cathode reaction of the hybrid redox fuel cell reduces a metal ion in the liquid electrolyte from a higher oxidation state to a lower oxidation state (e.g., lower in oxidation number than the higher oxidation state). The liquid electrolyte discharged from the cathode and supplied to the oxidant regeneration reactor includes the lower oxidation state metal ion. The oxidant regeneration reactor oxidizes the lower oxidation state metal ion, restoring the metal ion to its higher oxidation state, before returning the liquid electrolyte to the cathode of the hybrid redox fuel cell. In the case of a hydrogen-ferric/ferrous ion hybrid redox fuel cell, ferric ion (higher oxidation state metal ion) is reduced to ferrous ion (lower oxidation state metal ion) at the cathode reaction of the fuel cell. At the oxidant regeneration reactor, the ferrous ion is oxidized back to ferric ion, before being returned to the cathode of the fuel cell.

As demonstrated in the schematic 560, the oxidant regeneration reactor 562 may include various oxidant regeneration processes 570 and various reactor designs 580. In one embodiment, the oxidant regeneration process 570 includes bio-oxidation 574, where the lower oxidation state metal ion is oxidized to the higher oxidation state in a bioreactor with chemolithotrophic microorganisms. In another embodiment, the oxidant regeneration process 570 includes air oxidation 576, where the lower oxidation state metal ion is oxidized to the higher oxidation state in the presence of air (oxygen). Both bio-oxidation and air oxidation processes may utilize a trickle bed reactor design 584 or a spiral wound bed reactor design 586. As further described with reference to FIGS. 6-11, the trickle bed and spiral wound reactor designs facilitate increased contact times and higher active surface areas for fluidly contacting the lower oxidation state metal ion with an oxidizing fluid, thereby reducing mass transfer limitations and increasing oxidant regeneration rates, while reducing manufacturing and operational costs.

In the case of bio-oxidation 574, oxidant regeneration occurs in the presence of chemolithotrophic microorganisms, which are able to oxidize the metal ion from the lower oxidation state to the higher oxidation state as part of its metabolism along with consumption of $CO_2$. In the case of a hydrogen-ferric/ferrous ion hybrid redox fuel cell, chemolithotrophic microorganisms such as *A. ferrooxidans, T. ferrooxidans*, and *Leptospirdlurn ferrooxidans* aid in ferric ion regeneration because these microorganisms are capable of consuming $CO_2$ as its sole source of carbon in all biosynthesis with energy derived from iron oxidation. In this way, the bio-oxidation oxidant regeneration process also serves as a $CO_2$ capturing technology. In the case of other types of hybrid redox fuel cells, selection of an appropriate chemolithotrophic microorganism may correspond to the metal ion oxidant used. In another example, a sulfur oxidizing chemolithotrophic bacterium may be utilized.

The microbial iron oxidation by *A. ferrooxidans* is based on the following net reaction in equation (3):

$$4FeSO_4 + 2H_2SO_4 + O_2 = 2Fe_2(SO_4)_3 + 2H_2O \quad (3)$$

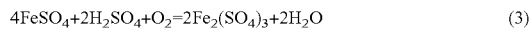

Biological oxidation of ferrous ions is an attractive method, in comparison to other oxidant regeneration methods, because of its low environmental impact and lower costs. However, the biological oxidation of ferrous iron has not been widely used commercially because of its relatively low oxidation rate on freely suspended cells. In particular, the low oxidation rate can result in long residence times and large reactor volumes, resulting in higher manufacturing and operating costs. To address this issue, *A. ferrooxidans* and other microorganisms can be immobilized on biomass support particles (BSP) to increase ferrous iron oxidation rates, reduce residence times, and enable smaller reactor volumes.

Immobilization of the microorganisms may refer to localization of the microorganisms to a defined region of space (e.g., on a carrier or substrate such as BSP) so as to confine free migration of the microorganisms. Accordingly, immobilized microorganisms can exhibit altered hydrodynamic characteristics as compared to non-immobilized microorganisms while retaining their catalytic activity for continuous use. Compared with systems utilizing suspended microorganisms, immobilization of microorganisms may be advantageous owing to facilitating and achieving continuous utilization, higher microorganism density, higher metabolic activity, prevention of interfacial inactivation, and increased catalytic productivity, protection against acidification and shear forces in the environment, and resistance to heavy metals, solvents, pH and temperature. Furthermore, immobilized microorganisms are more tolerant to changing environmental conditions and less vulnerable to toxic substances present in the bulk phase as compared to suspended microorganisms. Non-limiting examples of immobilization methods include flocculation, adsorption on surfaces, covalent bonding to carriers, cross-linking of microorganisms, entrapment, encapsulation, and nanocoating.

Air oxidation of ferrous ion, represented by equation (4), is thermodynamically favorable, but kinetically slow due to the ORR.

$$4Fe^{2+} + O_2 + 4H^+ \rightarrow 2H_2O + 4Fe^{3+} \Delta G° = -42.28 \text{ kcal/mol} \quad (4)$$

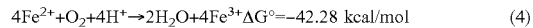

As further discussed with reference to FIG. 6, an oxygen regeneration reactor test apparatus can be utilized to characterize the kinetics of continuous bio-oxidation of ferrous iron using *A. Ferrooxidans* immobilized on BSP, and/or to characterize the kinetics of continuous air-oxidation of ferrous ion. The characterization results can aid in scale up and commercialization and design of trickle bed and spiral wound bed reactor designs for bio-oxidation or air oxidation of the reduced metal ion oxidant.

Figure 6:
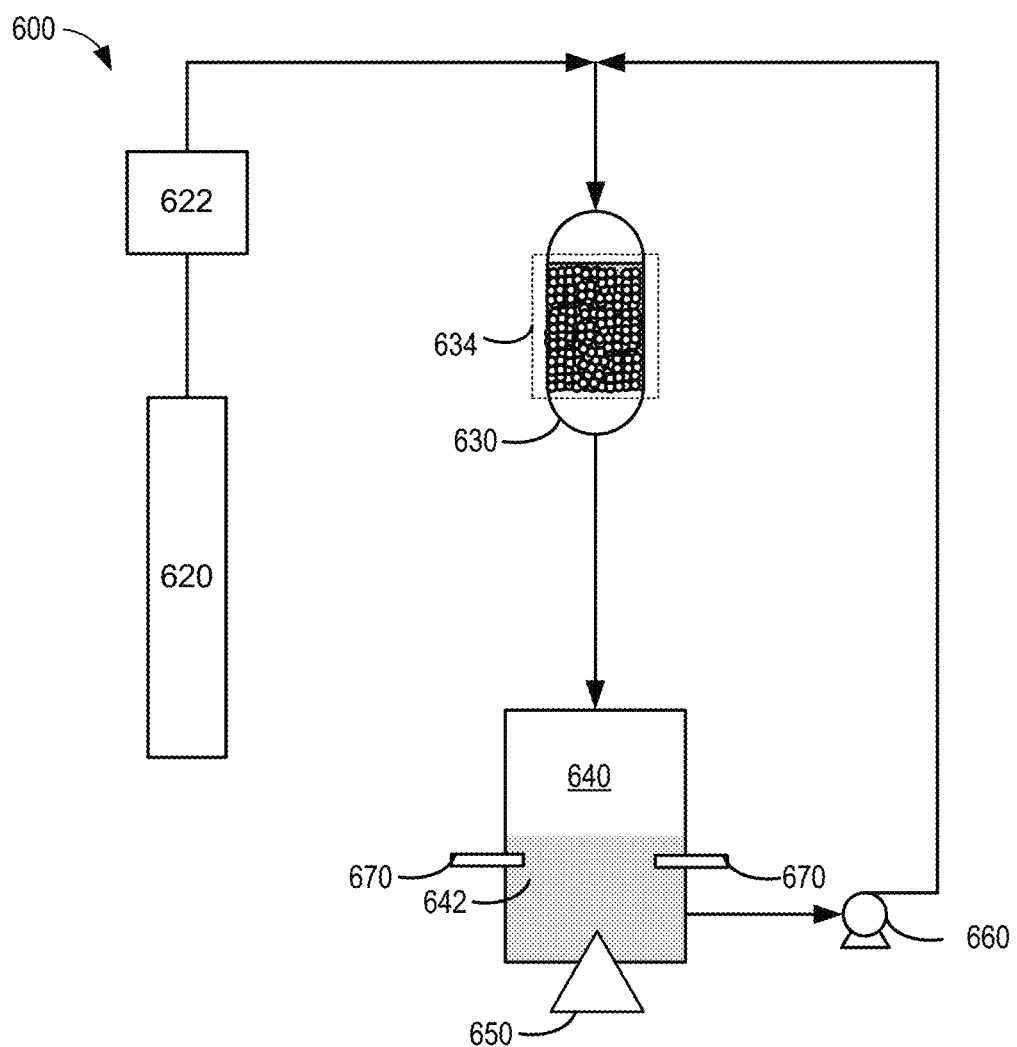
FIG. 6 shows a schematic of an example test apparatus for characterizing an oxidant regeneration process for the hybrid redox fuel cell of FIG. 1.

Turning now to FIG. 6, it illustrates a schematic of an example test apparatus 600 for testing an oxidant regeneration reaction for a hybrid redox fuel cell, for example, a hydrogen-ferric/ferrous ion hybrid redox fuel cell. In particular, the test apparatus 600 may be utilized for characterizing bio-oxidation of ferrous ion according to equation (3), or for characterizing air oxidation of ferrous ion according to equation (4). As shown in FIG. 6, electrolyte solution 642 including a lower oxidation state metal ion (e.g., $M^{(x-1)+}$) of known concentration may be pumped by pump 660 from an electrolyte source 640 (e.g., a storage tank) at a measured flow rate to an oxidant regeneration reactor 630. A gas source 620 (air, oxygen, or oxygen/$CO_2$), including but not limited to one or multiple gas cylinders and/or storage tanks, may supply air, oxygen, and/or $CO_2$ gas to the oxidant regeneration reactor 630 at a flow rate regulated by a metering device 622, for example, a rotameter. The electrolyte solution 642 including the lower oxidation state metal ion may be mixed with the entering gases at the inlet of the oxidant regeneration reactor 630, thereby flowing through the oxidant regeneration reactor 630 as a gas-liquid mixture. In other examples, the reactants in the liquid and gaseous phases may be supplied to the oxidant regeneration reactor 630 so that they flow through the reactor in a co-current or countercurrent configuration. In the case of an oxidant regeneration reactor for a hydrogen-ferric/ferrous ion hybrid redox fuel cell system, the electrolyte solution may include ferrous ion in sulfuric acid solution, and can include ferrous ion, sulfate ion and acid protons.

In one embodiment, the oxidant regeneration reactor 630 includes a trickle bed reactor, including a catalyst bed 634 including closely-packed solid catalyst particles. The solid catalyst particles may include porous substrate particles supporting catalyst material. The catalyst material may be distributed throughout the porous substrate particles and may be accessible by fluids contacting the porous and external surface areas of the porous substrate particles. The closely-packed solid particles may include interparticle and intraparticle pores through which fluid (e.g., liquid, gas, or a mixture thereof) can flow and in which fluids can fluidly contact the surfaces of the catalyst particles. In another embodiment, the oxidant regeneration reactor 630 includes a spiral wound jelly roll structured bed reactor, including a catalyst bed 634 including a one-piece spiral wound jelly roll configuration, as further described in detail with reference to FIGS. 9-11. The spiral wound jelly roll configuration may include a substrate layer coated with a catalyst bed, the catalyst bed including a catalyst layer. The substrate layer coated with the catalyst layer are spiral wound into a jelly roll configuration and inserted into the oxidant regeneration reactor 630, forming a one-piece catalyst bed configuration through which fluid (e.g., liquid, gas, or a mixture thereof) can flow and in which fluids can fluidly contact the surfaces of the catalyst particles.

In the case of an air oxidation reactor, the catalyst bed 634 may include carbon-supported precious metal catalyst particles and/or graphite catalyst particles and the gas source 620 includes air or oxygen. Examples of the precious metal catalyst particles include Pt, Pd, Ru, Rd or their alloys, supported on a conductive carrier, such as carbon or graphite. In the case of a bio-oxidation reactor, the catalyst bed 634 may include chemolithotrophic microorganisms immobilized on biomass support particles (BSP), and the gas source 620 includes air or oxygen, and $CO_2$. For a regeneration biooxidation reactor in a hydrogen-ferric/ferrous ion hybrid redox fuel cell system, the BSP includes cubic polyurethane foam as carriers for immobilization of A. ferrooxidans cells.

As the gas-liquid mixture and electrolyte flows over the catalyst bed 634, the gas and the liquid electrolyte are fluidly contacted over the surfaces of the catalyst bed 634. Because the catalyst bed 634 includes packed catalyst particles with interparticle and intraparticle pores, the catalyst surface area per volume of catalyst exposed for fluidly contacting the gases and the liquid electrolyte can be increased, thereby reducing mass transfer limitations and facilitating and increasing the rates of reaction therebetween. Furthermore, because the gas-liquid mixture of gas and liquid electrolyte trickles through the catalyst bed 634, a contact time and contact surface area for fluidly contacting the gases and the liquid electrolyte can be increased, thereby facilitating the oxidation of the metal ion at the catalyst surface according to equations (3) or (4).

The reaction products of the oxidant regeneration reactor 630 are returned to the electrolyte source 640. Sensors 670 may include one or a plurality of sensors and/or measurement devices to measure chemical properties of electrolyte solution 642. As an example, sensor 670 may include a potentiostat and a three-electrode sensor including a glassy carbon working electrode, a platinum mesh counter electrode, and an Ag/AgCl reference electrode for performing cyclic voltammetry to measure dynamic electrolyte (e.g., ferric ion, ferrous ion) concentration profiles. The potentiostat may be set at a scan rate of 1/minute to analyze the electrolyte solution 642. For the case of a hydrogen-ferric/ferrous ion hybrid redox fuel cell, the electrolyte solution includes ferrous ion and ferric ion, and the cyclic voltammetry may determine the changes in ferrous ion concentration in the electrolyte solution by measuring the ferrous-to-ferric oxidation peak. Sensor 670 may further include a pH meter for measuring changes in the electrolyte solution pH during the testing, as hydrogen protons (e.g., $H^+$) are consumed during ferrous ion oxidation. Sensor 670 may further include a thermocouple for indicating temperature inside the oxidant regeneration reactor 630. A heater 650 can be utilized to heat the electrolyte solution 642 to a desired temperature, similar to the hybrid redox fuel cell system operating conditions.

To evaluate the test apparatus 600, periodic cyclic voltammetry (CV) scanning between 200 mV to 800 mV (vs. Ag/AgCl) at a scanning rate of 50 mV/s may be performed using the potentiostat. Cyclic voltammograms 700 (e.g., FIG. 7) of the electrolyte circulating through test apparatus 600 can be plotted over time. In the case of evaluating ferric ion regeneration for a hydrogen ferric/ferrous ion hybrid redox fuel cell, the lower oxidation state metal ion corresponds to ferrous ion. Accordingly, ferrous ion is oxidized to ferric ion in the oxidant regeneration reactor 630. As the ferrous oxidation reaction proceeds, ferric ion concentration in solution increases and therefore its reduction peak height also increases. When the test apparatus temperature and ionic diffusion coefficient are held constant, the cyclic voltammogram peak height increase is then proportional to the change in ferric ion concentration. As described above, characterizing the continuous oxidation of ferrous ion with the oxidant regeneration reactor 630 at different temperatures, ferrous ion concentrations, electrolyte pH, catalyst type and catalyst particle sizes utilizing the test apparatus 600 enables operation of the oxidant regeneration reactor 630 to match the rate of ferrous iron oxidation, utilizing air oxidation or bio-oxidation, to the ferric iron reduction rate in the hybrid redox fuel cell. As such, operation of the oxidant regeneration reactor 630 can be adjusted corresponding to changes in the metal ion reduction rate and/or power generation rates of the hybrid redox fuel cell. Although the characterization of the test apparatus 600 is described herein with reference to a hydrogen-ferric/ferrous ion hybrid redox fuel cell, the methods and systems related thereto are non-limiting. In particular, the oxidant regeneration reactor 630 can be applied and characterized for oxidant regeneration processes for metal ion oxidants utilized in other types of hybrid redox fuel cells.

In order to characterize the reaction kinetics of the ferrous ion oxidation reaction (for either air oxidation or bio-oxidation), a model for the oxidant regeneration reactor 630 may be represented by equations (5)-(7):

$$-r' = N\frac{dX}{dW} \tag{5}$$

$$r' = r/\rho_{cat} \tag{6}$$

$$R = kC_{Fe2}^x * C_{O2}^y \tag{7}$$

Where r'=rate of reaction (mol/s-g), r=rate of reaction (mol/s-L), R=rate of reaction (mol/s-L), N=molar flow (molls), dX=conversion (%), dW=weight of catalyst (g), $\rho_{cat}$=density of catalyst (g/l), C=concentration of species, k=reaction constant $(1/s*(L/mol)^{x+1-1})$, x=the order of reaction on ferrous ion concentration, and y=the order of reaction on oxygen partial pressure.

Using the above-described apparatus, a series of experiments may be carried out to characterize the reaction kinetics, in particular, to study how the reaction rate changes with ferrous ion concentration and oxygen partial pressure. For example, to determine the reaction order with respect to ferrous ion concentration, the test apparatus 600 may be operated over a range of ferrous ion concentrations while oxygen partial pressure and flow rates are held constant. Similarly, to determine the reaction order with respect to oxygen partial pressure, the test apparatus 600 may be operated over a range of oxygen partial pressures while ferrous ion concentration is held constant. To determine the reaction rate constant, k, as a function of temperature, a predetermined set of standard test conditions can be selected (e.g., ferrous ion concentration, oxygen partial pressure) and held constant while varying electrolyte temperature. Furthermore, the reaction rate constant at each temperature may be characterized using a range of different catalyst types (e.g., microorganisms supported on BSP, graphite supported on solid particles, precious metal supported on particles), a range of particles sizes, and a range of packing bed structures. These experiments can aid in selecting a reactor bed design for each catalyst type that exhibits the highest ferrous oxidation reaction rate.

The ferrous oxidation reaction is also sensitive to electrolyte pH. While maintaining all other test conditions (e.g., reactant concentrations, temperature) the same, the starting electrolyte pH can be varied from 1 to 4, and the resulting reaction kinetic behaviors can be characterized using test apparatus 600. The ferrous oxidation reaction is not solely affected by the catalyst properties. Because this is a two phase reaction, reactor designs also play a big role as how well the reactants mix on the surface of the catalyst. Therefore, several oxidant regeneration reactor designs and design iterations can be tested and compared under a predetermined set of standard test conditions.

Turning now to FIG. 8, it illustrates a process flow schematic for an example hybrid redox fuel cell system 800, including a hybrid redox fuel cell 100 (as previously described with reference to FIGS. 1 and 4) and oxidant regeneration reactor 870. As described with reference to FIG. 1, the hybrid redox fuel cell may include a hydrogen-ferric/ferrous ion hybrid redox fuel cell; however, the systems and methods described herein may include other types of hybrid redox fuel cells. In the hybrid redox fuel cell system 800, the hybrid redox fuel cell 100 may include one or more hybrid redox fuel cells 100 electrically connected in series and/or parallel to generate power. As described above with reference to FIG. 4, the one or more hybrid redox fuel cells 100 may include a stack of hybrid redox fuel cells 100 electrically connected together in one or more cell assemblies 400.

Similarly, oxidant regeneration reactor 870 may include a plurality of oxidant regeneration reactors 870, each fluidly connected in parallel to the one or more hybrid redox fuel cells such that liquid electrolyte from the cathode side 116 of each hybrid redox fuel cell can be flexibly directed to one or more of the plurality of oxidant regeneration reactors. In this way, any one of the oxidant regeneration reactor 870 can be taken offline for service, without major disruption to operation and power generation of the hybrid redox fuel cell. Furthermore, oxidant regeneration capacity can be more flexibly and reliably increased and decreased to match oxidant reduction rates at the stack(s) of hybrid redox fuel cells as power generation demands vary. Further still, as shown in FIGS. 8 and 15, each of the oxidant regeneration reactors 870 may be fluidly connected to the cathode side 116 of one or more hybrid redox fuel cells 100 without (e.g., in the absence of) being fluidly connected to the anode side 114 of the hybrid redox fuel cells 100. In other words, the anode side 114 of the hybrid redox fuel cells 100 are fluidly decoupled from the oxidant regeneration reactors 870, except for the hydrogen protons crossing over from the anode side 114 to the cathode side 116 through the separator 122.

The hybrid redox fuel cell 100 may include one or more sensors 834 and 836 positioned at the anode side 114 and the cathode side 116, that transmit data related to the operation of the hybrid redox fuel cell 100 to the controller 812. In one example, the sensors 834 may include a pressure sensor, and a temperature sensor. Similarly, the sensors 836 may include one or more of a pressure sensor, a temperature sensor, an electrolyte concentration sensor, a pH sensor, optical probes, and an electrolyte conductivity sensor. In one embodiment, the one or more sensors 834 and 836 can include sensors positioned at the outlet of the anode side 114 and cathode side 116, respectively, to indicate conditions at the anode side 114 and the cathode side 116.

A power conditioning unit 804 and an external load 802 may be electrically connected between the anode side 114 (by way of the anode current collector at the anode 124) and the cathode side 116 (by way of the cathode current collector at the cathode 126). Power conditioning unit 804 may aid in filtering, converting, storing, and the like, the current generated at the anode prior to delivery of said current to the external load 802. Similarly, power conditioning unit 804 may aid in filtering, converting, storing, and the like, the current returning from external load 802 prior to returning said current to the cathode current collector at the cathode 126. In one example, the power conditioning unit 804 may convert direct current generated at the hybrid redox fuel cell 100 to alternating current for utilization at the external load 802; additionally, the power conditioning unit 804 may convert alternating current discharged from the external load 802 to direct current prior to returning the current to the hybrid redox fuel cell 100. Both the power conditioning unit 804 and the external load 802 may be communicatively coupled with a controller 812. In one example, the controller 812 may adjust an output of the power conditioning unit 804 to the external load 802, based on a power demand signal received from the external load 802. Further still, power conditioning unit 804 may measure the current and/or voltage generated from each hybrid redox fuel cell 100, and communicate the measured current and/or voltage to the controller 812. In this way, the controller 812 can monitor performance of individual hybrid redox fuel cells 100.

A reductant source 805 supplies reductant (e.g., hydrogen gas) to the anode side 114 of the hybrid redox fuel cell 100 by way of a reductant supply flow control device 842 and a reductant supply line 840. In one example, the reductant source 805 includes a pressurized gas cylinder. Reductant supply flow control device 842 may include one or more of a control valve, a flow meter and a pressure regulator for regulating flow and pressure of reductant gas to the anode side 114. Reductant supply flow control device 842 may be communicatively coupled to the controller 812, transmitting reductant supply flow rate and pressure data to the controller 812, and receiving flow rate, valve position, and/or pressure set points from the controller 812. The reductant is oxidized at the anode 124, producing electrons that are conducted to the power conditioning unit 804.

Unreacted reductant as well as byproducts from the reductant oxidation reaction are discharged from the anode side 114 at a reductant discharge line 848 of the hybrid redox fuel cell 100 by way of a reductant discharge flow control device 844. The reductant discharge flow control device 844 may include one or more of a control valve, a flow meter and a pressure regulator for regulating flow and pressure of reductant gas from the anode side 114. Reductant discharge flow control device 844 may be communicatively coupled to the controller 812, transmitting reductant discharge flow rate and pressure data to the controller 812, and receiving flow rate, valve position, and/or pressure set points from the controller 812. In the case where the hybrid redox fuel cell 100 includes a hydrogen-ferric/ferrous ion hybrid redox fuel cell, the reductant includes hydrogen gas, and the reductant discharge includes unreacted hydrogen gas, and may include gaseous hydrogen protons produced by way of reduction reaction equation (1). A portion of the hydrogen protons produced from the hydrogen oxidation reaction may cross over separator 122 to the cathode side 116.

A reductant recycle flow control device 846 may be fluidly coupled between the reductant supply line 840 and the reductant discharge line 848. In this way, a portion of the reductant discharge stream may be recycled to the anode side 114. An amount or flow rate of reductant recycled from the reductant discharge to the anode side 114 may be regulated by the controller 812 adjusting a valve position and/or flow rate and/or pressure of the reductant discharge flow control device 844 and/or the reductant recycle flow control device 846. When the reductant recycle flow control device 846 is fully closed (and the reductant recycle flow control device is open), all of the reductant discharge flows through the reductant discharge flow control device 844; in contrast, when the reductant discharge flow control device 844 is fully closed (and the reductant recycle flow control device is open), all the reductant discharge flows through the reductant recycle flow control device 846. When the reductant discharge flow control device 844 and the reductant recycle flow control device 846 are both open (partially and/or fully), a portion of the reductant discharge flows through the reductant recycle flow control device 846. In one example, responsive to a reductant concentration at the reductant discharge line 848 being greater than a threshold reductant discharge concentration, the controller 812 may adjust one or more of flow control devices 846 and 844 to increase a reductant recycle flow rate. When the reductant discharge concentration is greater than the threshold reductant discharge concentration, increasing a reductant recycle flow rate may maintain a higher conversion (e.g., oxidation) of reductant at the anode side 114, thereby reduce operational costs.

Next, liquid electrolyte may be supplied to the cathode side 116 by way of an oxidant supply device (e.g., flow control device 811) such as a pump. The supporting electrolyte source 806 may include liquid electrolyte with one or more of a higher oxidation state metal ion and a lower oxidation state metal ion, wherein the higher oxidation state metal ion is reduced to the lower oxidation state metal ion at the cathode 126 by way of the reduction reaction given by equation (2). The supporting electrolyte source 806 may include one or more electrolyte storage tanks containing various electrolyte solutions. In particular, supporting electrolyte source 806 may include an electrolyte storage tank with the higher oxidation state metal ion and a lower oxidation state metal ion in equilibrium; in another example, supporting electrolyte source 806 may include an electrolyte storage tank with higher oxidation state metal ion and a separate electrolyte storage tank with lower oxidation state metal ion. Furthermore, supporting electrolyte source 806 may include supporting electrolyte species such as counterions corresponding to the higher and lower oxidation state metal ions. Further still the supporting electrolyte source 806 may include pH regulating species such as hydroxide ion, hydrogen protons, supporting salts, and their corresponding counterions. For the case where the hybrid redox fuel cell 100 is a hydrogen-ferric/ferrous ion hybrid redox fuel cell, the supporting electrolyte source 806 includes one or more of ferric ion and/or ferrous ion, chloride ion, sulfate ion, hydrogen protons, and may further include other supporting electrolyte salt compounds.

As indicated in FIG. 8, supporting electrolyte source 806 may supply electrolyte to one or more of the cathode side 116 and the oxidant regeneration reactor 870 by way of pump 810 and one or more flow control devices (positioned between pump 810 and cathode side 116 or oxidant regeneration reactor 870, such as flow control device 811 (other flow control devices not shown). In one example, the supporting electrolyte source 806 may be used to deliver liquid electrolyte (including the higher oxidation state metal ion) to the cathode side 116 during startup of the hybrid redox fuel cell system by way of oxidant supply pump 810.

Furthermore, oxidant supply pump may be communicatively coupled to the controller 812, such that the controller 812 may adjust a speed of the oxidant supply pump 810 responsive to a signal received from sensor 807. For example, the controller 812 may switch off the oxidant supply pump 810 in response to a decrease in a level (e.g., volume) of liquid electrolyte at the supporting electrolyte source 806, indicating that a threshold volume of liquid electrolyte has been delivered to the cathode side 116. In another example, after the cathode side 116 is filled with liquid electrolyte, the controller 812 may close a flow control device 811. In another example, after startup of and during continuous operation of the hybrid redox fuel cell, the controller 812 may open the flow control device 811 and adjust a speed of the oxidant supply pump 810 to deliver liquid electrolyte to the cathode side 116 responsive to a threshold oxidant electrolyte condition. The threshold oxidant electrolyte condition may include when a concentration of the oxidant electrolyte at the cathode side 116 falls below a threshold electrolyte concentration. In one example, the threshold electrolyte concentration may correspond to the threshold oxidant electrolyte concentration.

After startup of, and during continuous operation of the hybrid redox fuel cell system 800, the flow control device 811 may remain closed, and the controller 812 may regulate circulation of reductant gas through the anode side 114 and liquid electrolyte through the cathode side 116. In particular, oxidant discharge may be discharged at the oxidant discharge line 858 to the oxidant regeneration reactor 870. Flow of the oxidant discharge may be regulated by way of one or more of the oxidant discharge flow control device 854 and the oxidant recirculation pump 857. The oxidant discharge flow control device 854 may include one or more of a control valve, a flow meter and a pressure regulator for regulating flow and pressure of oxidant electrolyte from the cathode side 116. Oxidant discharge flow control device 854 may be communicatively coupled to the controller 812, transmitting oxidant discharge flow rate and pressure data to the controller 812, and receiving flow rate, valve position, and/or pressure set points from the controller 812. Oxidant recirculation pump 857 may be communicatively coupled to the controller 812, transmitting pump speed to the controller 812, and receiving pump speed set point from the controller 812. In the case where the hybrid redox fuel cell 100 includes a hydrogen-ferric/ferrous ion hybrid redox fuel cell, the oxidant discharge includes unreacted ferric ion (e.g., higher oxidation state metal ion), ferrous ion (e.g., lower oxidation state metal ion) produced from the reduction of ferric ion by way of equation (2'), hydrogen protons crossing over from the anode side 114 by way of separator 122, and supporting electrolyte species.

As described with reference to schematic 560, the oxidant regeneration reactor 870 may include one of various reactor designs for carrying out oxidation (e.g., regeneration) of the lower oxidation state metal ion back to the higher oxidation state metal ion. In particular, the oxidant regeneration process may include bio-oxidation of the lower oxidation state metal ion, as represented by equation (3), or may include air oxidation of the lower oxidation state metal ion, as represented by equation (4). Thus, oxidation of the lower oxidation state metal ion to the higher oxidation state metal ion is carried out in the oxidant regeneration reactor 870 without connection to an external load or power source. Furthermore, the oxidant regeneration reactor 870 can include a trickle (packed) bed reactor, or a spiral wound (packed) bed reactor design. In the case of when oxidant regeneration reactor 870 is a trickle bed reactor, operation thereof may correspond to the trickle bed reactor embodiment as described for oxidant regeneration reactor 630, where the catalyst bed 874 corresponds to a trickle packed catalyst bed 634. In the case of when oxidant regeneration reactor 870 is a spiral wound jelly roll structured bed reactor, operation thereof may correspond to the spiral wound structured bed reactor embodiment as described for oxidant regeneration reactor 630, where the catalyst bed 874 corresponds to a spiral wound jelly roll structured catalyst bed 634.

Oxidant regeneration reactor 870 may further include one or more sensors 876 positioned thereat for indicating and transmitting temperature, pressure, electrolyte concentrations, pH, and the like to the controller 812. In one example, the one or more sensors 876 may be positioned at the regeneration discharge line 872, for indicating average conditions inside the oxidant regeneration reactor 870. Oxidant regeneration reactor 870 may include one or more heaters 873 for regulating temperature of the catalyst bed 874. Non-limiting examples of heater 873 may include one or more of an electrical coil heater, an external jacket heater, an oil heat exchanger, and an in-line pipe heater. In one example, heater 873 may include an in-line pipe heater thermally coupled to the oxidant discharge line 858 for heating inlet liquid electrolyte to the oxidant regeneration reactor 870, and an external jacket heater or an electrical coil heater thermally coupled to the oxidant regeneration reactor 870 for maintaining (or modulating) a temperature of the catalyst bed 874.

Effluent from the oxidant regeneration reactor 870 is delivered by way of regeneration discharge line 872 and oxidant supply flow control device 852 and oxidant supply line 850 to the cathode side 116 of the hybrid redox fuel cell 100. Oxidant supply flow control device 852 may include one or more of a control valve, a flow meter and a pressure regulator for regulating flow and pressure of oxidant electrolyte to the cathode side 116. Oxidant supply flow control device 852 may be communicatively coupled to the controller 812, transmitting oxidant supply flow rate and pressure data to the controller 812, and receiving flow rate, valve position, and/or pressure set points from the controller 812. Referring to equations (3) and (4), effluent may include water, unreacted lower oxidant metal ion, higher oxidant metal ion regenerated (e.g., oxidized) from lower oxidant metal ion, and supporting electrolyte species. In the case of a hydrogen-ferric/ferrous ion hybrid redox fuel cell system, the effluent from the oxidant regeneration reactor 870 may include ferric ion, ferrous ion, and sulfate ions.

A regeneration recycle flow control device 878 may be positioned in a recycle passage fluidly coupled between the oxidant discharge line 858 and the regeneration discharge line 872. As non-limiting examples, the regeneration recycle flow control device 878 may include a flow control valve, a pressure regulator, or a mass flow meter communicatively coupled to the controller 812. In this way, a portion of the effluent from the oxidant regeneration reactor 870 may be recycled back to the oxidant regeneration reactor 870, prior to being returned from the oxidant regeneration reactor 870 to the cathode side 116. An amount or flow rate of effluent recycled from the regeneration discharge line 872 to the oxidant regeneration reactor 870 may be regulated by the controller 812 adjusting a % open position and/or flow rate and/or pressure of the regeneration recycle flow control device 878 and/or the oxidant supply flow control device 852. When the regeneration recycle flow control device 878 is fully closed (and the oxidant supply flow control device 852 is open), all of the effluent from the oxidant regeneration reactor 870 flows through the oxidant supply flow control device 852 back to the cathode side 116 of the hybrid redox fuel cell 100; in contrast, when the oxidant supply flow control device 852 is fully closed (and the regeneration recycle flow control device 878 is open), all of the effluent from the oxidant regeneration reactor is recycled thereto. When the oxidant supply flow control device 852 and the regeneration recycle flow control device 878 are both open (partially and/or fully open), a portion of the effluent from the oxidant regeneration reactor 870 flows through the regeneration recycle flow control device 878, with the remaining portion returning to the cathode side 116.

In the case of a hydrogen-ferric/ferrous ion hybrid redox fuel cell, an electrolyte mixture of ferrous ion (lower oxidation state metal ion), ferric ion (higher oxidation state metal ion), sulfate anions, and acidic protons may be supplied to the oxidant regeneration reactor from the hybrid redox fuel cell 100. As the liquid electrolyte flows over the particles of the packed catalyst bed 874, ferrous ion is oxidized (e.g., by way of equation (3) or (4)) to ferric ion, thereby regenerating oxidant for the hybrid redox fuel cell 100.

As described herein, supporting electrolyte source 806 may include one or more auxiliary storage tanks for supporting electrolyte species, including acids, salt anions, and the like. Supporting electrolyte source 806 may also serve as facilities for batch preparation of electrolyte solutions of salts, acids, and the like, for utilization in the hybrid redox fuel cell system 800. As indicated in FIG. 8, supporting electrolyte source 806 may supply electrolyte to one or more of the cathode side 116 and the oxidant regeneration reactor 870 by way of pump 810 and one or more flow control devices 811 positioned between pump 810 and cathode side 116 (and positioned between pump 810 and oxidant regeneration reactor 870, not shown in FIG. 8). Each of the one or more flow control devices 811 can include one or more of a control valve, a flow meter and a pressure regulator for regulating flow and pressure of oxidant electrolyte to the cathode side 116 and/or the oxidant regeneration reactor 870. Furthermore, pump 810 and each of the one or more flow control devices 811 may be communicatively coupled to the controller 812, transmitting oxidant supply flow rate and pressure data to the controller 812, and receiving flow rate, valve position, and/or pressure set points from the controller 812. In this way, the supporting electrolyte species can be supplied to replenish concentrations thereof at the cathode side 116, and/or oxidant regeneration reactor. In one example, responsive to a rise in pH above an upper threshold regeneration pH at the oxidant regeneration reactor 870 and/or responsive to a rise in pH above an upper threshold pH at the cathode side 116, the controller 812 may increase a flow rate of acid from supporting electrolyte source 806 to the oxidant regeneration reactor 870 and/or the cathode side 116. In another example, responsive to a rise in pH above an upper threshold regeneration pH at the oxidant regeneration reactor 870 and/or responsive to a rise in pH above an upper threshold pH at the cathode side 116, the controller 812 may increase a flow rate of reductant from reductant source 805 to the anode side 114 in order to increase a hydrogen gas oxidation rate at the anode side 114.

In other examples, pH at the hybrid redox fuel cell 100 may be self-regulating, in that hydrogen protons produced by the hydrogen oxidation reaction at the anode side 114 flow through the separator 122 to the cathode side 116 thereby replenishing the hydrogen protons flowing out of the cathode side 116 and regulating the pH thereat. Furthermore, hydrogen protons may flow from the cathode side 116 to the oxidant regeneration reactor 870, replenishing the hydrogen protons consumed by the oxidant regeneration reaction and regulating the pH thereat. In this way, the hybrid redox fuel cell system may operate in a closed loop manner with respect to pH control. In other words, acid from a source external to the hybrid redox fuel cell 100 such as supporting electrolyte source 806 may not be utilized. Instead, the acid hydrogen protons produced by way of hydrogen gas oxidation at the anode side 114 replenish and supply acid to the cathode side 116 and the oxidant regeneration reactor 870. Accordingly, during operation of the hybrid redox fuel cell system in a closed loop manner with respect to pH control, in order to balance and regulate pH, the flow rate of hydrogen gas (e.g., reductant 110 to the anode side 114 may be regulated by controller 812. In particular, a flow rate of hydrogen gas delivered to the anode side 114 may be increased responsive to a decrease in pH at one or more of the cathode side 116 and/or the oxidant regeneration reactor 870. Conversely, a flow rate of hydrogen gas delivered to the anode side 114 may be decreased responsive to an increase in pH at one or more of the cathode side 116 and/or the oxidant regeneration reactor 870.

Regeneration gas source 882 supplies one or more of oxygen, carbon dioxide, and/or air to the oxidant regeneration reactor 870 by way of a regeneration gas flow control device 884. In one example, the regeneration gas source 882 includes one or more pressurized gas cylinders and/or storage tanks. Regeneration gas flow control device 884 may include one or more of a control valve, a flow meter and a pressure regulator for regulating flow and pressure of reductant gas to the oxidant regeneration reactor 870. Regeneration gas flow control device 884 may be communicatively coupled to the controller 812, transmitting reductant supply flow rate and pressure data to the controller 812, and receiving flow rate, valve position, and/or pressure set points from the controller 812. In the case of a bio-oxidation, regeneration gas source 882 supplies oxygen and carbon dioxide to the oxidant regeneration reactor 870. In one example, the regeneration gas source 882 includes an oxygen gas source and a separate carbon dioxide gas source. In another example, the regeneration gas source includes an air cylinder, or a compressor or fan supplying compressed air to the oxidant regeneration reactor. The oxygen gas is supplied to drive the bio-oxidation of the lower oxidation state metal ion as given by equation (3), while the carbon dioxide is supplied for metabolic consumption by the chemolithotrophic microorganisms. In the case of air oxidation, the regeneration gas source includes an air cylinder or an oxygen gas cylinder. The air or oxygen gas is supplied to the oxidant regeneration reactor to drive the oxidation of the lower oxidation state metal ion as given by equation (4). Utilizing separate carbon dioxide and oxygen gas sources as the regeneration gas source as compared with an air gas source may be advantageous because the flow rate and concentrations of oxygen and carbon dioxide gas directed to the oxidant regeneration reactor 870 can be independently controlled.

As described analogously with reference to FIG. 6, the liquid electrolyte supplied to the oxidant regeneration reactor 870 may be mixed with the entering gas from the regeneration gas source 882 at the inlet of the oxidant regeneration reactor 870, thereby flowing through the oxidant regeneration reactor 870 as a gas-liquid mixture. In other examples, the reactants in the liquid and gaseous phases may be supplied to the oxidant regeneration reactor 870 so that they flow through the reactor in a co-current or countercurrent configuration. In the case of a countercurrent configuration, the liquid electrolyte may be delivered to the top of the oxidant regeneration reactor, where it trickles down through the catalyst bed 874; the oxygen and/or carbon dioxide supplied from the regeneration gas source 882 may be supplied to the bottom of the oxidant regeneration reactor 870 where it flows upward through the catalyst bed 874.

In this way, only the cathode side 116 of the hybrid redox fuel cell 100 is fluidly coupled to the oxidant regeneration reactor 870. Said another way, the cathode side 116 of the hybrid redox fuel cell 100 is fluidly coupled to the oxidant regeneration reactor 870 without fluidly coupling the anode side 114 of the hybrid redox fuel cell 100 to the oxidant regeneration reactor 870. As such, liquid electrolyte flows between the cathode side 116 of the hybrid redox fuel cell 100 and the oxidant regeneration reactor 870 without flowing to the anode side 114 of the hybrid redox fuel cell 100. Only gaseous reductant is supplied to the anode side 114 of the hybrid redox fuel cell 100. Further still, a concentration of the lower oxidation state metal ion in the liquid electrolyte directed from the outlet of the cathode side 116 (e.g., oxidant discharge line 858) to the oxidant regeneration reactor 870 may be higher than a concentration of the lower oxidation state metal ion in the liquid electrolyte directed from the outlet of the oxidant regeneration reactor 870 to the cathode side 116. Similarly, a concentration of the higher oxidation state metal ion in the liquid electrolyte directed from the outlet of the cathode side 116 (e.g., oxidant discharge line 858) to the oxidant regeneration reactor 870 may be lower than a concentration of the higher oxidation state metal ion in the liquid electrolyte directed from the outlet of the oxidant regeneration reactor 870 to the cathode side 116.

Controller 812 as shown in FIG. 8 may include a microcomputer, including a microprocessor unit, input/output (I/O) ports, an electronic storage medium for executable programs (e.g., executable instructions) and non-transitory read-only memory (ROM), random access memory (RAM), keep alive memory (KAM), and a data bus. As described herein, controller 812 receives signals from the various sensors and communicates with the various actuators to adjust operation of one or more components of the hybrid redox fuel cell system based on the received signals and instructions stored on a memory of the controller 812.

Controller 812 may receive various signals from sensors coupled to the hybrid redox fuel cell 100, oxidant regeneration reactor 870, power conditioning unit 804, supporting electrolyte source 806, regeneration gas source 882, and reductant source 805, as well as other components of the hybrid redox fuel cell system 800 such as flow control devices and pumps. Furthermore, controller 812 may transmit signals to various actuators such as pumps, flow control devices, the power conditioning unit 804, and the like, during operation of the hybrid redox fuel cell system 800. Furthermore, upon receiving sensor information, the controller 812 which may in turn actuate one or more of the various actuators to perform various control functions, as an example. As such, the controller 812 may implement various control strategies responsive to one or a combination of sensors and probes. For example, in response to an increasing power demand at the external load 802, the controller 812 may simultaneously increase a flow rate of reductant supplied to the anode 124 by increasing a valve opening position of reductant supply flow control device 842 and increasing a recirculation flow rate of electrolyte oxidant between the cathode side 116 and the oxidant regeneration reactor 870 by increasing a speed of oxidant recirculation pump 857.

Controller 812 may regulate operating conditions in the oxidant regeneration reactor 870 in order to maintain a rate of oxidant regeneration (e.g., oxidation of the metal ion from the lower oxidation state to the higher oxidation state) thereat balanced with (e.g., equal to) a rate of oxidant reduction (e.g., reduction of the metal ion at the higher oxidation state to the metal ion at the lower oxidation state) at the cathode side 116. When a rate of oxidant regeneration at the oxidant regeneration reactor is balanced with the rate of oxidant reduction at the cathode side 116, a total amount of metal ion at the higher oxidation state at the hybrid redox fuel cell 100 and the oxidant regeneration reactor 870 is constant. In other words, the total amount of metal ion at the higher oxidation state at the hybrid redox fuel cell 100 and the oxidant regeneration reactor 870 being constant may correspond to when the oxidant regeneration reactor is operating at steady-state equilibrium. Furthermore, controller 812 may regulate operating conditions in the oxidant regeneration reactor 870 to reduce a risk of degradation (thermal degradation, precipitation and fouling, death/inhibition of microorganisms) of the oxidant regeneration reactor 870.

A temperature of the oxidant regeneration reactor may be maintained between a lower threshold regeneration temperature and an upper threshold regeneration temperature. When a temperature of the oxidant regeneration reactor decreases below the lower threshold regeneration temperature, a rate of oxidant regeneration may be too slow. In contrast, when a temperature of the oxidant regeneration reactor increases above the upper threshold regeneration temperature, a risk of degradation hybrid redox fuel cell components can occur (e.g., fouling and occlusion of the separator 122, degradation of the substrate layer 904 or separator layer 910). In the case of bio-oxidation, when a temperature of the oxidant regeneration reactor decreases below the lower threshold regeneration temperature, metabolism of the microorganisms may cease or decrease significantly, thereby reducing an achievable rate of oxidant regeneration. In contrast, when a temperature of the oxidant regeneration reactor increases above the upper threshold regeneration temperature, the microorganisms may not survive. In one example, for a bio-oxidation process, the lower regeneration threshold temperature may include 30 degrees Celsius and the upper regeneration threshold temperature may include 40 degrees Celsius. In another example, for the air oxidation process, the lower oxidant regeneration reactor threshold temperature may include the freezing temperature of the liquid electrolyte, and the upper oxidant regeneration reactor threshold temperature may include the boiling temperature of the liquid electrolyte. The freezing temperature of the liquid electrolyte may be at or below 0 degrees Celsius and the boiling temperature of the liquid electrolyte may be at or above 100 degrees Celsius. Maintaining a higher temperature of the liquid electrolyte may be advantageous because the kinetic reaction rates of the redox reactions in the hybrid redox fuel cell 100 and the oxidant regeneration reactor 870 may be higher; however, operating costs may be increased to maintain and design system components to operate continuously at higher temperatures.

In one example, the controller 812 may increase or decrease power to the one or more heaters 873 in order to increase or decrease, respectively, a temperature of the oxidant regeneration reactor 870. For instance, responsive to the temperature at the oxidant regeneration reactor 870 decreasing below the lower threshold regeneration temperature, the controller 812 may increase power to the one or more heaters 873; responsive to the temperature at the oxidant regeneration reactor 870 increasing above the upper threshold regeneration temperature, the controller 812 may decrease power to the one or more heaters 873.

A pH of the liquid electrolyte inside the oxidant regeneration reactor 870 may be maintained between a lower threshold regeneration pH and an upper threshold regeneration pH. When a pH of the oxidant regeneration reactor decreases below the lower threshold regeneration pH, a rate of oxidant regeneration may be too slow. In contrast, when a temperature of the oxidant regeneration reactor increases above the upper threshold regeneration pH, a risk of degradation hybrid redox fuel cell components can occur due to precipitate formation in the liquid electrolytes which can foul and occlude the catalyst bed 874 and separator 122. For the case of a hydrogen-ferric/ferrous ion hybrid redox fuel cell, when a pH increases above the upper threshold regeneration pH, precipitation of ferric hydroxysulfates (e.g., jarosites) can occur.

In the case of bio-oxidation, when a pH of the oxidant regeneration reactor decreases below the lower threshold regeneration pH, or when a pH of the oxidant regeneration reactor increases above the upper threshold regeneration pH, growth and metabolism of the microorganisms may cease or decrease significantly, thereby reducing an achievable rate of oxidant regeneration. Furthermore, above the upper threshold regeneration pH, a solubility of the higher oxidation state metal ion may be reduced, thereby increasing a risk of precipitate formation. In one example, for a bio-oxidation process, the lower regeneration threshold pH may include 1.5 and the upper regeneration threshold pH may include 6. In other examples, the lower regeneration threshold pH and the upper regeneration threshold pH may vary depending on the type and nature of the oxidant regeneration reactor. In another example, for the case of a hydrogen ferric/ferrous ion hybrid redox fuel cell, the upper regeneration threshold pH may include 2 (above which a risk of precipitation of ferric ion is increased).

In one example, the controller 812 may increase or decrease a flow of acid protons from supporting electrolyte source 806 to the oxidant regeneration reactor 870 in order to decrease or increase, respectively, an electrolyte pH inside the oxidant regeneration reactor 870. For instance, responsive to the pH at the oxidant regeneration reactor 870 decreasing below the lower threshold regeneration pH, the controller 812 may decrease a flow rate of acid protons from the supporting electrolyte source 806 to the oxidant regeneration reactor 870; responsive to the pH at the oxidant regeneration reactor 870 increasing above the upper threshold regeneration pH, the controller 812 may increase a flow rate of acid protons from the supporting electrolyte source 806 to the oxidant regeneration reactor 870. In one embodiment, during operation of the hybrid redox fuel cell system 800, pH at the oxidant regeneration reactor 870 may be maintained between the lower regeneration threshold pH and the upper regeneration threshold pH by hydrogen protons generated by hydrogen oxidation at the anode side 114 of the hybrid redox fuel cell crossing over separator 122 and flowing to the oxidant regeneration reactor 870, without supply of acid from an source external to the hybrid redox fuel cell 100 and the oxidant regeneration reactor 870.

A higher oxidation state metal ion concentration, $[M^{x+}]$, and a lower oxidation state metal ion, $[M^{(x-1)+}]$, may be maintained between lower threshold higher oxidation state metal ion and lower threshold lower oxidation state metal ion regeneration concentrations, $[M^{x+}]_{TH,lower}$ and $[M^{(x-1)+}]_{TH,lower}$, respectively, and between upper threshold higher oxidation state metal ion and upper threshold lower oxidation state metal ion regeneration concentrations, $[M^{x+}]_{TH,upper}$ and $[M^{(x-1)+}]_{TH,upper}$, respectively. In the case of bio-oxidation, when $[M^{x+}]$ and/or $[M^{(x-1)+}]$ decrease below $[M^{x+}]_{TH,lower}$ and/or $[M^{(x-1)+}]_{TH,lower}$, respectively, or when $[M^{x+}]$ and/or $[M^{(x-1)+}]$ increase above $[M^{x+}]_{TH,upper}$ and/or $[M^{(x-1)+}]_{TH,upper}$, respectively, a risk of inhibition of the oxidant regeneration reaction by the chemolithotrophic microorganisms increases due to competing mechanisms. For the case of bio-oxidation of a hydrogen-ferric/ferrous ion fuel cell, $[M^{(x-1)+}]_{TH,lower}$ may include 2 g/L and $[M^{(x-1)+}]_{TH,upper}$ may include 20 g/L; $[M^{x+}]_{TH,lower}$ may include 2 g/L and $[M^{x+}]_{TH,upper}$ may include 15.6 g/L. $[M^{(x-1)+}]_{TH,lower}$ and $[M^{x+}]_{TH,lower}$ and/or $[M^{(x-1)+}]_{TH,upper}$ may vary depending on the type and nature of the oxidant regeneration reactor. In one example, the controller 812 may increase or decrease a flow of $[M^{x+}]$ and/or $[M^{(x-1)+}]$ from supporting electrolyte source 806 to the oxidant regeneration reactor 870 in order to increase or decrease $[M^{x+}]$ and/or $[M^{(x-1)+}]$, respectively, inside the oxidant regeneration reactor 870. For instance, responsive to $[M^{x+}]$ and/or $[M^{(x-1)+}]$ at the oxidant regeneration reactor 870 decreasing below $[M^{x+}]_{TH,lower}$ and/or $[M^{(x-1)+}]_{TH,lower}$, respectively, the controller 812 may increase a flow rate $[M^{x+}]$ and/or $[M^{(x-1)+}]$, respectively, from the supporting electrolyte source 806 to the oxidant regeneration reactor 870; responsive to $[M^{x+}]$ and/or $[M^{(x-1)+}]$ at the oxidant regeneration reactor 870 increasing above $[M^{x+}]_{TH,upper}$ and/or $[M^{(x-1)+}]_{TH,upper}$, respectively, the controller 812 may decrease a flow rate $[M^{x+}]$ and/or $[M^{(x-1)+}]$, respectively, from the supporting electrolyte source 806 to the oxidant regeneration reactor 870.

In another example, controller 812 may increase flow rate of effluent recycled back to the oxidant regeneration reactor (e.g., by increasing an open position of the regeneration recycle flow control device) in response to the concentration of higher oxidation state metal ion, $[M^{x+}]$, at the regeneration discharge line 872 decreasing below $[M^{x+}]_{TH,lower}$. When $[M^{x+}]_{TH,lower}$ and/or $[M^{(x-1)+}]_{TH,lower}$ a rate of higher oxidation state metal ion reduction at the cathode side 116 is lowered, and power generation at the hybrid redox fuel cell 100 may decrease. By increasing a flow rate of effluent recycled back to the oxidant regeneration reactor, a residence time of the fluid electrolyte in the oxidant regeneration reactor increases, thereby increasing conversion (e.g., oxidation) of the lower oxidation state metal ion to the higher oxidation state metal ion in the oxidant regeneration reactor. Additionally or alternatively, responsive to $[M^{x+}]<[M^{x+}]_{TH,lower}$, the hybrid redox fuel cell cathode side effluent may be directed to a different oxidant regeneration reactor (e.g., a fresh oxidant regeneration reactor), and/or additional metal ion oxidant may be supplied from an external source, such as supporting electrolyte source 806. In another example controller 812 may reduce a flow rate of effluent recycled back to the oxidant regeneration reactor in response to $[M^{x+}]$ at the oxidant discharge line 858 being greater than $[M^{x+}]_{TH,upper}$. By decreasing a flow rate of effluent recycled back to the oxidant regeneration reactor, a residence time of the fluid electrolyte in the oxidant regeneration reactor decreases, thereby decreasing conversion (e.g., oxidation) of the lower oxidation state metal ion to the higher oxidation state metal ion in the oxidant regeneration reactor below $[M^{x+}]_{TH,upper}$.

An oxygen gas concentration, $[O_2]$, at the oxidant regeneration reactor 870 may be maintained between a lower threshold oxygen regeneration concentration, $[O_2]_{TH,lower}$ and between an upper threshold oxygen regeneration concentration, $[O_2]_{TH,upper}$. In the case of bio-oxidation, when $[O_2]$ decreases below $[O_2]_{TH,lower}$, bacterial growth may cease or be reduced significantly. For the case of bio-oxidation of a hydrogen-ferric/ferrous ion fuel cell, $[O_2]_{TH,lower}$ may include 29 mg/L. $[O_2]_{TH,lower}$ and $[O_2]_{TH,upper}$ may depend on the type and nature of the oxidant regeneration reactor. In one example, the controller 812 may increase or decrease a flow of $[O_2]$ from regeneration gas source 882 to the oxidant regeneration reactor 870 in order to increase or decrease $[O_2]$ inside the oxidant regeneration reactor 870. For instance, responsive to $[O_2]$ at the oxidant regeneration reactor 870 decreasing below $[O_2]_{TH,lower}$, the controller 812 may increase a flow rate $[O_2]$ from the supporting electrolyte source 806 to the oxidant regeneration reactor 870; responsive to $[O_2]$ at the oxidant regeneration reactor 870 increasing above $[O_2]_{TH,upper}$, the controller 812 may decrease a flow rate $[O_2]$ from the supporting electrolyte source 806 to the oxidant regeneration reactor 870. In another example, oxygen gas may be supplied from air; accordingly when oxygen gas is supplied from air, $[O_2]$ may be maintained stably at the air concentration (e.g., approximately 21 mol % in dry air).

In the case of bio-oxidation, a carbon dioxide gas concentration, $[CO_2]$, at the oxidant regeneration reactor 870 may be maintained between a lower threshold carbon dioxide regeneration concentration, $[CO_2]_{TH,lower}$, and between an upper threshold carbon dioxide regeneration concentration, $[CO_2]_{TH,upper}$. When $[CO_2]$ decreases below $[CO_2]_{TH,lower}$, bacterial growth may cease or be reduced significantly. Conversely, when $[CO_2]$ increases above $[CO_2]_{TH,upper}$, other cellular mechanisms (e.g., $HCO_3^-$, and $H^+$ production) may be favored over cellular growth, reducing oxidant regeneration efficiency by the chemolithotrophic microorganisms. For the case of bio-oxidation of a hydrogen-ferric/ferrous ion fuel cell, $[CO_2]_{TH,lower}$ may include 5% in air, and $[CO_2]_{TH,upper}$ may include 8% in air. $[CO_2]_{TH,lower}$ and $[CO_2]_{TH,upper}$ may depend on the type and nature of the oxidant regeneration reactor. In one example, the controller 812 may increase or decrease a flow of $[CO_2]$ from regeneration gas source 882 to the oxidant regeneration reactor 870 in order to increase or decrease $[CO_2]$ inside the oxidant regeneration reactor 870. For instance, responsive to $[CO_2]$ at the oxidant regeneration reactor 870 decreasing below $[CO_2]_{TH,lower}$, the controller 812 may increase a flow rate $[CO_2]$ from the supporting electrolyte source 806 to the oxidant regeneration reactor 870; responsive to $[CO_2]$ at the oxidant regeneration reactor 870 increasing above $[CO_2]_{TH,upper}$, the controller 812 may decrease a flow rate $[CO_2]$ from the supporting electrolyte source 806 to the oxidant regeneration reactor 870.

Turning now to FIG. 15, it illustrates a schematic of a hybrid redox fuel cell system 1500, including a cell assembly 400 of a stack of N hybrid redox fuel cells 100 fluidly connected with a series 1570 of M oxidant regeneration reactors 870 connected in parallel. It is understood that apart from depicting a plurality of hybrid redox fuel cells and a plurality of oxidant regeneration reactors, the hybrid redox fuel cell system 1500 corresponds directly to the hybrid redox fuel cell system 800. In particular, the controller 812, power conditioning unit 804, external load 802, supporting electrolyte source 806, regeneration gas source 882, as well as several flow control devices, sensors and pumps, are not depicted in FIG. 15 for clarity, however, these components are understood to be included in the hybrid redox fuel cell system 1500.

In the hybrid redox fuel cell system 1500, reductant (e.g., hydrogen gas) is supplied from the reductant source 805 that is fluidly connected in parallel to the anode sides 114 of each of the N hybrid redox fuel cells 100. Effluent from the anode sides 114 may be recycled to the supply side of the anode sides 114 by way of reductant recycle flow control device 846. Furthermore, each hybrid redox fuel cell 100 in the cell assembly 400 is fluidly connected in parallel with the bank of M oxidant regeneration reactors 870. As described herein, each of the M oxidant regeneration reactors 870 may include a trickle bed or jelly roll structured catalyst bed design, at which air oxidation or bio-oxidation of the lower oxidation state metal ion to the higher oxidation state metal ion may occur. Regeneration gas source 882 supplies one or more of air, oxygen, and carbon dioxide gas to each of the oxidant regeneration reactors. A pump 857 and/or oxidant discharge flow control device 854 may be controlled by controller 812 to circulate liquid electrolyte between the cathode sides 116 of the cell assembly 400 and the oxidant regeneration reactors 870, thereby regenerating oxidant electrolyte. Flow control devices 852 and 878 may be controlled to adjust a recycle flow rate of liquid electrolyte back to the oxidant regeneration reactors 870, prior to returning the liquid electrolyte to the cell assembly 400.

In the example of FIG. 15, the M oxidant regeneration reactors 870 are fluidly connected to a single cell assembly 400 of hybrid redox fuel cells 100. However, in other examples, the hybrid redox fuel cell system 1500 may include a plurality of cell assemblies 400 (e.g., of hybrid redox fuel cells 100) fluidly connected to the M oxidant regeneration reactors. Each cell assembly 400 may be conductively coupled to external load 802 by way of power conditioning unit 804. The power conditioning unit 804 may collect, store, filter, convert, distribute, and the like, power generated from each of the cell assemblies 400 to the external load 802 and may also collect, store, filter, convert, distribute, and the like, power discharged from the load to one or more of the cell assemblies 400.

Further still, each cell assembly 400 may be fluidly connected, by way of upstream valves 1540 and 1551 and downstream valves 1544 and 1553, in parallel to the other cell assemblies 400 and to reductant source 805, supporting electrolyte source 806, and supporting electrolyte source 806. Furthermore, each cell assembly 400 may be fluidly isolated from the hybrid redox fuel cell system 1500, as depicted with the dashed border 1550, by way of upstream valves 1540 and 1551, and downstream valves 1544 and 1553 to enable maintenance of individual cell assemblies 400 while avoiding process downtime. Each oxidant regeneration reactor 870 may be fluidly isolated by way of an upstream valve 1554 and a downstream valve 1552 to enable maintenance of individual oxidant regeneration reactors 870 while avoiding process downtime. Upstream valves 1554 and downstream valves 1552 may include flow control devices that transmit and receive signals from the controller 812. Furthermore, during operation of the hybrid redox fuel cell system 800 and/or 1500, the controller 812 may coordinate operation of the one or more oxidant regeneration reactors 870 and the one or more hybrid redox fuel cells 100 simultaneously. In particular, depending on the power generation demand, and the resultant oxidant regeneration demand by the cell assembly 400, any one or more of the M oxidant regeneration reactors 870 may be utilized. In other words, the controller 812 may open and close upstream and downstream valves 1554 and 1552, respectively, in order to bring additional oxidant regeneration reactors 870 online or offline, in order to aid in balancing oxidant regeneration rates (e.g., rate of oxidation of lower oxidation state metal ion) with the rate of oxidant reduction at the cell assembly 400 (e.g., rate of reduction of higher oxidation state metal ion).

Furthermore, during operation of the hybrid redox fuel cell system 800 and/or 1500, the controller 812 may coordinate operation of the one or more oxidant regeneration reactors 870 and the one or more hybrid redox fuel cells 100 simultaneously. In particular, depending on the power demand, and the resultant oxidant regeneration demand by the cell assemblies 400, any one or more of the oxidant regeneration reactors 870 may be utilized. In other words, the controller 812 may open and/or close various sets of upstream valves 1554 and downstream valves 1552, in order to bring additional oxidant regeneration reactors 870 online and/or offline, in order to aid in balancing oxidant regeneration rates (e.g., rate of oxidation of lower oxidation state metal ion) with the rate of oxidant reduction at the cell assemblies 400 (e.g., rate of reduction of higher oxidation state metal ion).

Additionally, the controller 812 may maintain a ratio, Z=M/N, of the number of oxidant regeneration reactors to the number of hybrid redox flow cells 100, constant to balance the oxidant reduction rate with the oxidant regeneration rate in the hybrid redox fuel cell system 1500. The value of Z may be predetermined, depending on an oxidant regeneration capacity of each of the oxidant regeneration reactors 870, and the power generation capacity of each of the hybrid redox fuel cells 100. Thus, responsive to additional hybrid redox fuel cells 100 being fluidly connected and brought online in the hybrid redox fuel cell system 1500 for generating power, the controller 812 may bring additional oxidant regeneration reactors 870 online to maintain the ratio, Z, and to balance a rate of oxidant regeneration (e.g., oxidation of the metal ion from the lower oxidation state to the higher oxidation state) with (e.g., equal to) a rate of oxidant reduction (e.g., reduction of the metal ion at the higher oxidation state to the metal ion at the lower oxidation state) at the cathode sides 116, thereby maintaining a total amount of higher oxidation state metal ion, $M^{x+}_{total}$ across the cell assemblies 400 and each of the online oxidant regeneration reactors 870 constant. $M^{x+}_{total}$ may be determined by from the respective higher oxidation state metal ion concentrations and volumes corresponding to each online hybrid redox fuel cell 100 and each online oxidant regeneration reactor 870, as shown in equation (8). In equation (8), $V_{i,cell}$ represents the volume of the $i^{th}$ hybrid redox fuel cell cathode side 116, $([M^{x+}]*V)_{i,cell}$ represents the total amount of $M^{x+}$ in the $i^{th}$ hybrid redox fuel cell cathode side 116, $V_{j,regen}$ represents the free liquid volume of the $j^{th}$ oxidant regeneration reactor 870, $([M^{x+}]*V)_{j,regen}$ represents the total amount of $M^{x+}$ in the free liquid volume of the $j^{th}$ oxidant regeneration reactor 870. The free liquid volume refers to the volume space taken up by the free liquid electrolyte in oxidant regeneration reactor, which excludes the volume of the catalyst bed (non-liquid components), flow distribution devices, and other non-liquid components in the oxidant regeneration reactor.

$$M^{x+}_{total} = \sum_i ([M^{x+}]*V)_{i,cell} + \sum_j ([M^{x+}]*V)_{j,regen} \quad (8)$$

Thus, in the case of a hydrogen-ferric/ferrous ion hybrid redox fuel cell, the controller 812 may bring additional oxidant regeneration reactors 870 online responsive to an increase in ferric ion reduction at the cathode side 116 of the hybrid redox fuel cells 100 and/or a decrease in ferric ion concentration in the effluent from the oxidant regeneration reactors 870, in order to increase a rate of ferrous ion oxidation at the oxidant regeneration reactors 870. Similarly, the controller 812 may bring additional oxidant regeneration reactors 870 offline responsive to a decrease in ferric ion reduction at the cathode side 116 of the hybrid redox fuel cells 100 and/or an increase in ferric ion concentration in the effluent from the oxidant regeneration reactors 870, in order to decrease a rate of ferrous ion oxidation at the oxidant regeneration reactors 870. While balancing the oxidant regeneration rate in the oxidant regeneration reactors with the rate of oxidant reduction in the hybrid redox fuel cells, the total amount of higher oxidation state metal ion in the oxidant regeneration reactors and the hybrid redox fuel cells can be maintained constant; as such, a power generation capacity of the hybrid redox fuel cell system can be maintained.

In another example, analogous to the control strategies described above with reference to FIG. 8, responsive to a change in [$M^{x+}$] at the effluent of one or more oxidant regeneration reactors 870, the controller 812 may adjust an effluent recycle flow rate. For instance, a decrease in [$M^{x+}$] at the effluent of one or more oxidant regeneration reactors 870 indicates a decrease in the oxidant regeneration rate (e.g., rate of oxidation of $M^{(x-1)+}$) thereat. Thus, responsive to a decrease in [$M^{x+}$] at the effluent of a first oxidant regeneration reactor 870, the controller 812 may increase a flow rate of effluent recycled back to the first oxidant regeneration reactor (to increase residence time therein), and/or increase a flow rate of electrolyte from supporting electrolyte source 806 to the first oxidant regeneration reactor, and/or direct effluent from the cathode side 116 away from the first oxidant regeneration reactor to a second oxidant regeneration reactor while bringing the first oxidant regeneration reactor offline. As additional strategies, responsive to a decrease in [$M^{x+}$] at the effluent of a first oxidant regeneration reactor 870, the controller 812 may increase a temperature at the first oxidant regeneration reactor 870, adjust a pH at the first oxidant regeneration reactor, increase a concentration of oxygen gas at the first oxidant regeneration reactor, and/or increase a concentration of carbon dioxide gas (e.g., in the case of bio-oxidation) at the first oxidant regeneration reactor. At the same time, the controller 812 may regulate pH, temperature, [$M^{x+}$], [$O_2$], [$CO_2$], subject to the upper and lower regeneration threshold values discussed herein.

For the case where one or more of the above control actions taken by controller 812 responsive to a decrease in [$M^{x+}$] at the effluent of a first oxidant regeneration reactor fails to bring about an increase in [$M^{x+}$] at the effluent of a first oxidant regeneration reactor, the catalyst bed in the first oxidant regeneration reactor may be degraded. Degradation of an oxidant regeneration reactor 870 may occur due to accumulation of biomass (e.g., due to cell growth or cell byproducts/waste from bio-oxidation), precipitation due to side reactions in the electrolyte, build-up of impurities in the catalyst bed, and the like. Responsive to indication of a degraded catalyst bed, the controller 812 may direct effluent from the cathode side 116 away from the first oxidant regeneration reactor to a second oxidant regeneration reactor while bringing the first oxidant regeneration reactor offline.

Thus, a hybrid redox fuel cell system 1500 may include a plurality of hybrid redox fuel cells 100 stacked in series and/or in parallel. Analogous to the hybrid redox fuel cell systems 800, the cathode sides 116 of the hybrid redox fuel cells 100 are fluidly coupled to one or more of cell oxidant regeneration reactors 870 so that the liquid electrolyte can be recirculated therebetween. Furthermore, reductant 110 flows through the anode sides 114 of the hybrid redox fuel cells 100 without being directed to the oxidant regeneration reactors 870, except for hydrogen protons crossing over separator 122 from the anode side 114 to the cathode side 116. Similarly, regeneration gas source 882 supplies gas (e.g., oxygen, carbon dioxide, and/or air) to the oxidant regeneration reactors 870 without supplying gas to the hybrid redox fuel cells 100. Said another way, the anode sides 114 are fluidly isolated from the oxidant regeneration reactors 870, except for hydrogen protons crossing over separator 122 from the anode side 114 to the cathode side.

The amount of the liquid electrolyte directed from the hybrid redox fuel cells 100 to the oxidant regeneration reactors 870 may be regulated by the controller 812 to balance the reduction of higher oxidation state metal ion at the cathode sides 116 with the oxidation of lower oxidation state metal ion at the oxidant regeneration reactors 870. Furthermore, the design of the hybrid redox fuel cells 100 and their configuration in cell assemblies 400, and the design and configuration of the oxidant regeneration reactors 870, may facilitate regulation of liquid and gas pressures between individual hybrid redox fuel cells 100 within a cell assembly 400, and between the oxidant regeneration reactors 870 and cell assemblies 400. In one embodiment, the controller 812 may regulate supply of liquid electrolyte and gaseous reactants to the individual hybrid redox fuel cells 100 and the oxidant regeneration reactors 870 and between cell assemblies 400 and the oxidant regeneration reactors 870 based on current (or voltage) demand from the hybrid redox fuel cell system 800.

Turning now to FIG. 9, it illustrates schematics of a spiral wound jelly roll configuration of a catalyst bed for an oxidant regeneration reactor 870, including a cross-sectional view of the structured catalyst bed in an unrolled (e.g., unwound) configuration 900, a cross-sectional view 902 in a spiral-wound configuration, and a longitudinal perspective view 903. The unrolled structured catalyst bed 900 may be formed by coating a substrate layer 904 with a catalyst layer 906. One or both sides of the substrate layer 904 may be coated with the catalyst layer 906, to provide enough active surface area for facilitating the oxidation regeneration reaction, as given by equations (3) and (4). Coating both sides of the substrate layer 904 may increase the redox reaction rate of the catalyst bed as compared to coating a single side of the substrate layer 904. Substrate layer 904 may include a flexible and bendable planar substrate such as carbon cloth, carbon paper, or another type of membrane. Substrate layer 904 may be porous or non-porous, and/or permeable to oxygen or carbon dioxide gas, hydrogen ions, and to hybrid redox fuel cell electrolyte species. Substrate layer 904 may further be inert with respect to air, oxygen, and carbon dioxide gases, hydrogen ions, and the electrolyte including the higher oxidation state metal ion, lower oxidation state metal ion, salt anions, and supporting electrolyte species. The thickness of the substrate layer 904 may be small enough so as not to substantially hinder diffusion or convective transport of electrolyte species through the substrate layer. When the substrate layer 904 is thinner than 0.5 mm, reaction rates may be higher as compared to when the substrate layer 904 is thicker than 0.5 mm. The substrate layer 904 may be conductive, semi-conductive, or non-conductive. Conductive substrate layers may yield higher reaction rates as compared to non-conductive substrate layers. For example, a carbon substrate (e.g., carbon cloth, carbon paper, and the like) may aid in electron transfer, and provides a catalytic surface for the oxidation reaction of the lower oxidation state metal ion (e.g., equations (3) and (4)). Some example membrane materials that may be utilized for the substrate layer 904 include polypropylene, polyolefin, perfluoroalkoxy alkanes (PFA), polysulfone amide (PSA), and the like. In addition, the substrate layer 904 may include a thin ceramic sheet or a thin metal sheet, provided the substrate layer 904 does not react with the electrolyte species.

For the case of air oxidation of the lower oxidation state metal ion, catalyst layer 906 may include one or more different types of catalyst materials such as platinum, palladium, ruthenium, rhodium, titanium, and alloys thereof. The weight percent of the catalyst material on the substrate layer 904 may be from 0.2 wt. % to greater than 0.5 wt. %. The substrate layer 904 coated with the catalyst layer 906 may be porous and permeable to oxygen and carbon dioxide gases, hydrogen ions, and to liquid electrolyte species. When oxygen gas and metal ions in the electrolyte are fluidly contacted at the catalyst layer 906, the catalyst layer 906 may catalyze an oxidation reaction whereby the lower oxidation state metal ions may be oxidized to higher oxidation state metal ions (e.g., according to equations (3) and (4)). The substrate layer 904 may be coated entirely with the catalyst layer 906 to increase an oxidation reaction rate of the lower oxidation state metal ions at the catalyst layer surface.

Unrolled structured catalyst bed 900 may further include a spacing layer 910 positioned on the catalyst layer. As shown in the cross sectional view of an unrolled structured catalyst bed 900, end cross-sectional view of a jelly roll structured catalyst bed 902, and longitudinal perspective view of a jelly roll structured catalyst bed 903, the spacing layer 910 may be thinner than the substrate layer 904, however in other examples, the substrate layer 904 may be thinner than the spacing layer 910. Thinner spacing layers may yield higher catalyst bed reaction rates with higher pressure drops across the catalyst bed while thicker spacing layers may yield lower reaction rates with lower pressure drops across the catalyst bed. In some examples, the spacing layer 910 may be less than 1 mm thick. The spacing layer 910 may include a mesh, such as a plastic or other type of non-conductive mesh. For example, the spacing layer 910 may include a polypropylene, polyolefin, polyethylene, polystyrene or other polymer mesh that is stable (e.g., does not react with, degrade in the presence of) ferric/ferrous ion solutions. In other examples, the spacing layer 910 may include an open-celled plastic foam or sponge material.

The catalyst bed 900 may be spiral wound in on itself in concentric layers to form a jelly roll structured catalyst bed 920. Said another way, spiral winding the catalyst bed 900 in on itself forms a helically coiled one-piece removable catalyst bed. As shown in the cross-sectional view 902, successive concentric substrate layers 904 and catalyst layers 906 of the spiral wound jelly roll structured catalyst bed 920 are separated by the spacing layer 910. The spacing layer 910 may entirely cover the catalyst layer 906, as shown in schematic of unrolled structured catalyst bed 900. The number of concentric layers forming the jelly roll structured catalyst bed 920 is greater than one. In this way, each of the successive concentric catalyst layers 906 and substrate layers 904 in the jelly roll structured catalyst bed 920 are entirely separated by the spacing layer 910. As shown in the longitudinal perspective view 903, the spacing layers 910 may extend across the entire axial dimension (in z-direction of axis 901) of the jelly roll structured catalyst bed 920.

Turning now to FIG. 10, it illustrates example configurations of an oxidant regeneration reactor vessel 1000, including reference axis 1001 depicting an axial direction, z, and radial direction, r. In one example, the reactor vessel 1000 corresponds to the oxygen regeneration reactor 870 in the hybrid redox fuel cell system 800, whereby one or more oxidant regeneration reactors 1000 may be fluidly connected to a cathode side 116 of one or more hybrid redox fuel cells 100. For example, oxidant regeneration reactor 1000 may be placed in the flow path of the electrolyte discharged from the cathode side 116, such that electrolyte effluent from the cathode side 116 and gases (e.g., oxygen, carbon dioxide, and/or air) are delivered thereto. As indicated by arrow 1002, the electrolyte effluent may be directed axially (e.g., in an axial direction, z) into the catalyst bed 920 of the reactor vessel 1000. In other examples, the oxidant regeneration reactors 1000 may be positioned in a parallel flow path to the electrolyte flows to and from one or more hybrid redox fuel cells 100. In this way, oxygen gas and electrolyte may be directed from a cathode side 116 of a hybrid redox fuel cell 100 to a first reactor vessel 1000, and oxygen gas and electrolyte may be directed from a cathode side 116 of another hybrid redox fuel cell 100 to a second reactor vessel 1000.

As shown in FIG. 10, reactor vessel 1000 may include a jelly roll structured catalyst bed 920 supported in the reactor vessel 1000. In some examples, the catalyst bed 920 may be supported in a catalyst bed housing that may include baffles or other flow distribution devices or systems for aiding in distributing inlet fluid flow throughout the jelly roll structured catalyst bed layers. For example, a flow path may be formed to ensure even distribution in, through, and out of the jelly roll reactor. As another example, in some embodiments (as shown in FIG. 10, left side), a flow distribution device may include an inlet, such as an inlet pipe 1010 positioned upstream of the catalyst bed 920, and a lower shroud 1020 positioned downstream from the catalyst bed 920, and adjacent to a lower surface of the catalyst bed 920. The inlet pipe 1010 may direct inlet fluid axially to the reactor vessel 1000 to the radial center of the jelly roll structured catalyst bed without directing inlet fluid to the radial perimeter of the jelly roll structured catalyst bed. In some examples, the inlet pipe 1010 may be positioned upstream of a center of the catalyst bed 920 so that fluid may be directed to the center layers of the jelly roll structured catalyst bed. The inlet fluid (e.g., gases, electrolyte, and the like) may enter the jelly roll structured catalyst bed 920 substantially via the more highly porous spacing layer 910 near the center of the jelly roll as shown by dashed arrow 1032. The lower shroud 1020 may extend radially (e.g., in a radial direction, r) beyond a radial perimeter of the jelly roll structured catalyst bed. In this way, the lower shroud 1020 may prevent fluid between the concentric layers of the jelly roll from exiting the bottom of the jelly roll structured catalyst bed 920, thereby directing fluid inside the jelly roll radially outward through each of the successive concentric layers of the spiral wound jelly roll structured catalyst bed 920, prior to exiting the catalyst bed near the walls of the reactor vessel 1000, as shown by dashed arrows 1034 and dashed arrows 1036 and 1038. As the oxygen gas and metal ions in the electrolyte are fluidly contacted at the surface of the catalyst layer 906, lower oxidation state metal ions be oxidized (e.g., as per equations (3) or (4)), which can aid in regenerating the higher oxidation state metal ion for the hybrid redox fuel cell system 800.

In the case of bio-oxidation, the catalyst layer includes chemolithotrophic microorganisms, whereby in addition to oxygen gas, carbon dioxide gas is also fluidly contacted at the surface of the catalyst layer 906 to fuel the metabolism of the microorganisms. Fluid exiting the catalyst bed near the walls of the reactor vessel 1000 (dashed arrows 1036) is then directed down towards the outlet of the reactor vessel 1000, as shown by arrows 1038, where the outlet flow is returned to the cathode side 116 of a hybrid redox fuel cell 100, as represented by arrow 1004. Although the reactor vessel 1000 including the inlet pipe 1010 and lower shroud 1020 is described with a jelly roll structured catalyst bed, an analogous reactor vessel 1000 may be utilized with a trickle (packed) catalyst bed, whereby the inlet fluid enters the catalyst bed in a trickle bed reactor by way of inlet pipe 1010 near the center of the packed bed, and flow may be directed radially outward through the packed bed by the lower shroud 1020, as shown by dashed arrows 1034, exiting the catalyst bed near the walls of the reactor vessel 1000, as shown by dashed arrows 1036 and 1038. As the oxygen gas and metal ions in the electrolyte are fluidly contacted at the surface of the catalyst bed 920, lower oxidation state metal ions are oxidized (e.g., as per equations (3) or (4)), which can aid in regenerating the higher oxidation state metal ion for the hybrid redox fuel cell system 800.

An alternate configuration of reactor vessel 1000 is shown at the right side of FIG. 10. Here, a catalyst bed housing may include flow distribution devices including an upper shroud 1040 and a lower shroud 1050 with an outlet, such as outlet pipe 1060. The upper shroud 1040 may be positioned upstream of the catalyst bed 920, and adjacent to an upper surface of the catalyst bed 920. In contrast, the lower shroud 1050 and outlet pipe 1060 may be positioned downstream of the catalyst bed 920, adjacent to a lower surface of the catalyst bed 920. The upper shroud 1040 may extend radially beyond a radial perimeter of the jelly roll structured catalyst bed. In this way, the upper shroud 1040 may prevent fluid from entering between the concentric layers of the jelly roll at the upper surface of the jelly roll structured catalyst bed 920 such that the inlet fluid to the reactor vessel 1000 may be directed by way of the upper shroud 1040 towards the side walls of the reactor vessel 1000, as shown by dashed arrows 1072; there, the inlet fluid flows downward (dashed arrows 1076) in the annular space between the catalyst bed 920 and the side walls of the reactor vessel 1000. The outlet pipe 1060 may be positioned at the radial center of the jelly roll structured catalyst bed to ensure even flow distribution in, throughout, and out of the jelly roll reactor. Returning to this alternate example, the lower shroud 1050 directs fluid in the annular space between the catalyst bed 920 and the side walls of the reactor vessel 1000 radially inward through each of the successive concentric substrate layers 904, catalyst layers 906, and spacing layers 910 of the jelly roll structured catalyst bed 920, as shown by dashed arrows 1074, prior to exiting at the radial center of catalyst bed by way of outlet pipe 1060. As the oxygen gas and metal ions in the electrolyte are fluidly contacted at the surface of the catalyst layer 906, lower oxidation state metal ions may be oxidized (e.g., as per equations (3) or (4)), which can aid in regenerating the higher oxidation state metal ion for the hybrid redox fuel cell system 800.

In the case of bio-oxidation, the catalyst layer includes chemolithotrophic microorganisms, whereby in addition to oxygen gas, carbon dioxide gas is also fluidly contacted at the surface of the catalyst layer 906 to fuel the metabolism of the microorganisms. Upon reaching the central portion of the catalyst bed 920, fluid may be directed downward in an axial direction via outlet pipe 1060 as shown by dashed arrows 1078. Outlet flow from the reactor vessel 1000 may be returned to the cathode side 116 of a hybrid redox fuel cell 100, as shown by arrow 1004. Although the reactor vessel 1000 including the upper shroud 1040, lower shroud 1050, and outlet pipe 1060 is described with a jelly roll structured catalyst bed, an analogous reactor vessel 1000 may be utilized with a trickle (packed) catalyst bed, whereby the inlet fluid to the reactor vessel 1000 may be directed via the upper shroud 1040 towards the side walls of the reactor vessel 1000, as shown by dashed arrows 1072, where the inlet fluid flows downward (dashed arrows 1076) in the annular space between the catalyst bed 920 and the side walls of the reactor vessel 1000. Although shown as an outlet pipe to the center, in other embodiments, the disclosed system ensures even flow distribution in and out of the catalyst bed 920. Next, the lower shroud 1050 directs fluid in the annular space between the catalyst bed 920 and the side walls of the reactor vessel 1000 radially inward through the catalyst bed 920, as shown by dashed arrows 1074. As the oxygen gas and metal ions in the electrolyte are fluidly contacted at the surface of the catalyst particles, lower oxidation state metal ions may be oxidized (e.g., as per equations (3) or (4)), which can aid in regenerating the higher oxidation state metal ion for the hybrid redox fuel cell system 800.

In the example configurations of oxidant regeneration reactor 1000, the catalyst bed housing baffle components promote radial flow of fluid through the successive layers of the jelly roll structured catalyst bed 920. In this way, the efficiency per pass of the redox reaction involving oxygen and metal ion species of the catalyst bed can be increased since the contact time of the electrolyte fluid and gases (e.g., oxygen, air, carbon dioxide) in the catalyst bed is prolonged. Furthermore, the amount of unreacted oxygen gas and lower oxidation state metal ions passing through the reactor vessel 1000 may be reduced. Other configurations of catalyst bed housings, baffles, and the like may be employed within the reactor vessel to promote contacting of the electrolyte fluid and the gases with the catalyst bed. The jelly roll structured catalyst bed 920 may be advantageous as compared to the trickle packed catalyst bed 584 because a pressure drop across the reactor vessel 1000 may be reduced. Further still, the jelly roll structured catalyst bed 920, being of a one-piece construction, may be more easily removed in one piece, which can reduce maintenance costs and process down time.

Increasing packing density in a packed catalyst bed of a reactor vessel may result in increased reaction rates. Increasing the number of layers in the jelly roll structured catalyst bed may increase the catalyst density in the reactor vessel 1000, and may increase an oxidant regeneration reaction rate per pass, which may allow for a more compact or smaller sized reactor vessel. However, the pressure drop across the reactor vessel 1000 may be increased when increasing a number of layers in the jelly roll structured catalyst bed, thereby reducing achievable flow rates. Furthermore, increasing the number of layers in the jelly roll structure may call for additional flow distribution analysis to verify that the gas and liquid electrolyte mixture concentrations are suitable and to ensure that distribution of flows and concentrations of gas (e.g., oxygen, carbon dioxide) and electrolyte species are adequate throughout the catalyst bed. The oxidant regeneration reactor 1000 may include inlet and/or outlet baffle or other flow distribution means to increase uniformity of flow distribution across the catalyst bed. Increasing a thickness of the spacing layer 910 or porosity may aid in reducing a pressure drop across the reactor vessel 1000, for a given number of layers in the jelly roll. By extending across an axial length of the jelly roll structured catalyst bed 920, the spacing layer 910 can aid in distributing the electrolyte fluid and the gases across the entire surface of the catalyst layer 906 within the catalyst bed because electrolyte liquid and gases can flow axially, radially, and angularly across the spacing layers within the jelly roll structure. Furthermore, the spacing layers in the jelly roll structure intervene and maintain successive substrate and catalyst layers separated thereby reducing a risk of pinching or lamination of successive catalyst layers in the jelly roll structure which could increase the pressure drop across the catalyst bed and reduce accessibility of the catalyst layer to the electrolyte liquids and gases. In contrast, in a catalyst bed of a trickle bed reactor (also described herein), channeling and irregularities in interparticle distributions within the packed bed may give rise to uneven distribution of fluid within the catalyst bed, reducing specific oxidant regeneration reaction rates for a give catalyst bed loading.

Turning now to FIG. 11, it illustrates further examples of reactor vessels 1100 that may be used for carrying out the oxidant regeneration reactions given by equations (3) and (4). As shown in the side view (left) and top view (right), the reactor vessel 1100 may include a higher aspect ratio reactor shape (length to diameter ratio is higher), including inlet and outlet neck regions 1110 and 1112, respectively, inlet and outlet shoulder regions 1120 and 1122, respectively, and a middle region 1130. Inlet flow is directed into the reactor vessel 1100 at an inlet neck region 1110 after which the fluid is distributed radially at the shoulder regions 1120 to the circumference of the middle region 1130. The higher aspect ratio of the reactor shape, including the high aspect ratio inlet neck region, and the gradual angling of the shoulder region that transitions slowly from the neck region 1110 to the middle region 1130, may aid in promoting more even distribution of the inlet fluid throughout the catalyst bed 920. Shoulder region 1120 facilitates the gradual transition from the inlet neck region 1110 to the middle region 1130, as illustrated by lines of constant radius 1124, 1126, and 1128; as the reactor vessel 1100 slowly transitions from inlet neck region 1110 to the middle region 1130, the radius gradually increases as shown by the increasing circumference and radii progressing from lines of constant radius 1124 to 1126, and from lines of constant radius 1126 to 1128.

In some examples, a reactor vessel 1100 may have no interior baffling (e.g., as compared to the baffles and pipes for flow distribution shown in oxidant regeneration reactor 1000), yet may provide for adequate distribution of flow throughout the catalyst bed 920. In one non-limiting example, a diameter of the inlet neck region 1110 may include 10 cm.

Figure 12:
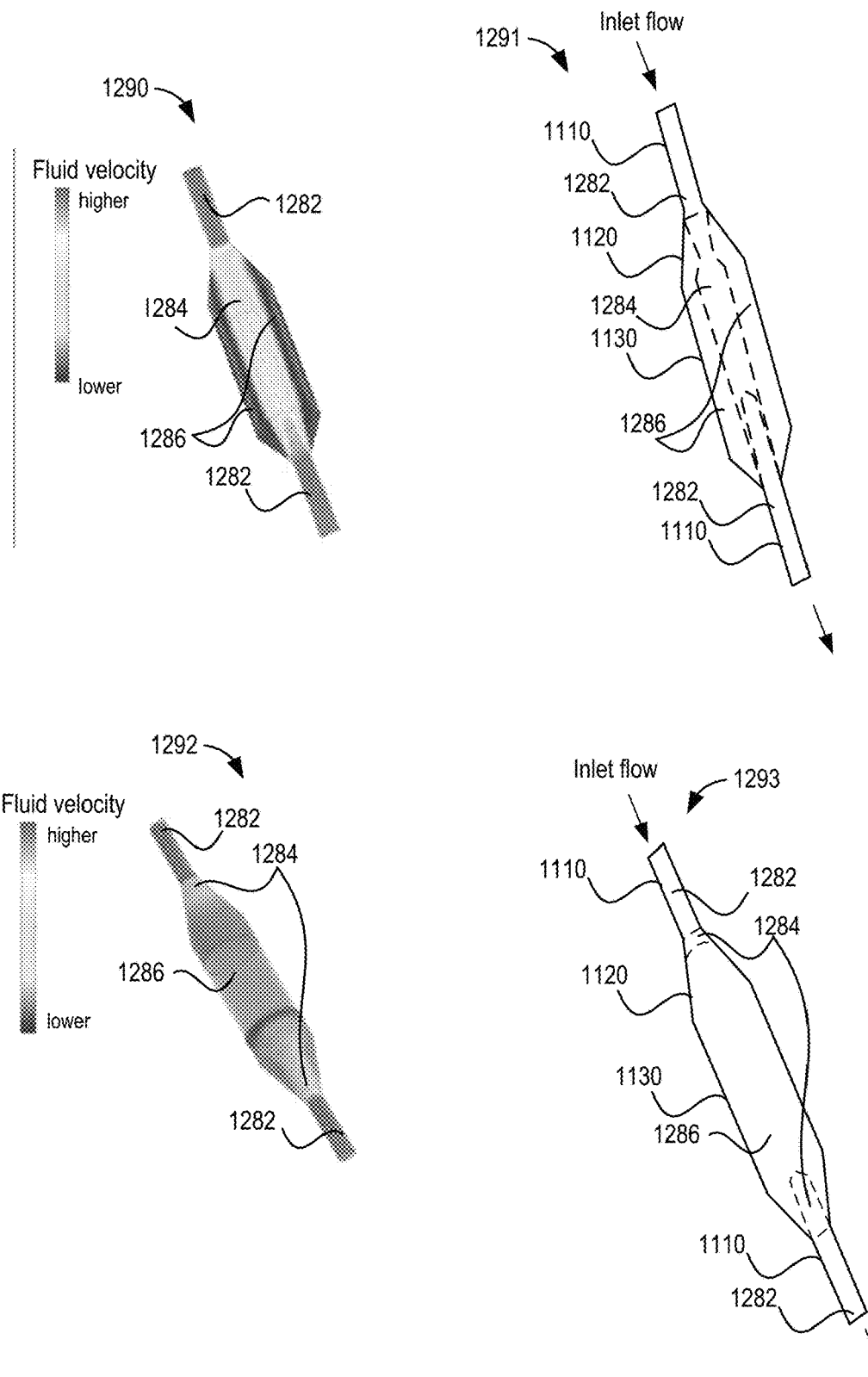
FIG. 12 shows flow distribution schematics for the oxidant regeneration reactor vessels of FIG. 10

Flow distributions for reactor vessel 1100 are shown by comparing the sample flow distribution diagrams of FIG. 12, including 1290, 1291 (reactor vessel with no baffling) and 1292, 1293 (reactor vessel with baffling). The dashed lines in the black and white flow diagram representations 1291 and 1293 approximately illustrate regions of higher flow velocity 1282, more moderate flow velocity 1284, and lower flow velocity 1286, as depicted in the corresponding greyscale flow distribution diagrams 1290 and 1292. As shown in the flow distribution diagrams 1290 and 1291 for the base reactor vessel without baffling, fairly even flow distribution is maintained within the reactor vessel, however moderate flow velocities are observed in the central portion of the catalyst bed as compared to nearer to the side walls of the middle region 930, where lower flow velocities are observed. In comparison, as shown in the flow distribution diagrams 1292 and for 1293 for the reactor vessel with baffling, more even flow distribution within the reactor vessel can be achieved: lower flow velocities are observed in nearly the entire middle region 930 (e.g., where the catalyst bed may be positioned). In the example reactor vessels 1100, convective fluid flow may be primarily in the axial direction of the reactor vessels. However, reactor vessel design elements such as the higher aspect ratio neck regions, gradual transitioning shoulder regions 1120, and the higher aspect ratio of the overall reactor vessels, may aid in even distribution of the fluid in a radial direction across the catalyst bed 920.

In this manner, a hybrid redox fuel cell system comprises, a hybrid redox fuel cell including an anode side through which a reductant is flowed and a cathode side through which a liquid electrolyte is flowed, and a trickle bed reactor including a catalyst bed fluidly connected to the cathode side. Furthermore, the liquid electrolyte includes a metal ion at a higher oxidation state and the metal ion at a lower oxidation state, and power is generated at the hybrid redox fuel cell by reducing the metal ion from at the higher oxidation state to the lower oxidation state at the cathode side while oxidizing the reductant at the anode side. In a first example, the hybrid redox fuel cell system further comprises, wherein the hybrid redox fuel cell includes a hydrogen-ferric/ferrous ion hybrid redox fuel cell, the reductant includes hydrogen gas, the metal ion at the lower oxidation state includes ferrous ion, and the metal ion at the higher oxidation state includes ferric ion. In a second example, optionally including the first example, the hybrid redox fuel cell system further comprises, a pump positioned between the hybrid redox fuel cell and the catalyst bed, wherein the pump directs the liquid electrolyte from the cathode side to the catalyst bed, and recirculates the liquid electrolyte from the catalyst bed back to the cathode side after the liquid electrolyte fluidly contacts the catalyst bed. In a third example, optionally including one or more of the first and second examples, the hybrid redox fuel cell system further comprises, wherein the metal ion at the lower oxidation state is oxidized to the metal ion at the higher oxidation state while fluidly contacting the catalyst bed. In a fourth example, optionally including one or more of the first through third examples, the hybrid redox fuel cell system further comprises, wherein a concentration of the metal ion at the higher oxidation state is higher in the liquid electrolyte directed from the catalyst bed to the cathode side than the concentration of the metal ion at the higher oxidation state in the liquid electrolyte directed from the cathode side to the catalyst bed. In a fifth example, optionally including one or more of the first through fourth examples, the hybrid redox fuel cell system further comprises, wherein the anode side is fluidly decoupled from the catalyst bed. In a sixth example, optionally including one or more of the first through fifth examples, the hybrid redox fuel cell system further comprises, wherein the catalyst bed includes a chemolithotrophic microorganism. In a seventh example, optionally including one or more of the first through sixth examples, the hybrid redox fuel cell system further comprises, wherein the catalyst bed includes the chemolithotrophic microorganism immobilized on biomass support particles. In an eighth example, optionally including one or more of the first through seventh examples, the hybrid redox fuel cell system further comprises, a regeneration gas source, wherein carbon dioxide gas is directed from the regeneration gas source to the catalyst bed. In a ninth example, optionally including one or more of the first through eighth examples, the hybrid redox fuel cell system further comprises, wherein the catalyst bed includes one or more of Pt, Pd, Ru, Rd, and alloys thereof. In a tenth example, optionally including one or more of the first through ninth examples, the hybrid redox fuel cell system further comprises, a regeneration gas source, wherein oxygen gas is directed from the regeneration gas source to the catalyst bed. In an eleventh example, optionally including one or more of the first through tenth examples, the hybrid redox fuel cell system further comprises, wherein the trickle bed reactor further includes a flow distribution device, wherein the flow distribution device is positioned to direct the liquid electrolyte radially and axially across the catalyst bed prior to exiting the trickle bed reactor. In a twelfth example, optionally including one or more of the first through eleventh examples, the hybrid redox fuel cell system further comprises, wherein the flow distribution device includes a lower shroud positioned downstream of the catalyst bed, the lower shroud extending beyond a radial perimeter of the catalyst bed. In a thirteenth example, optionally including one or more of the first through twelfth examples, the hybrid redox fuel cell system further comprises, wherein the flow distribution device includes an upper shroud positioned upstream of the catalyst bed, the upper shroud extending beyond a radial perimeter of the catalyst bed. In a fourteenth example, optionally including one or more of the first through thirteenth examples, the hybrid redox fuel cell system further comprises, wherein the lower shroud includes an outlet pipe positioned at a radial center of the catalyst bed, wherein the lower shroud directs the liquid electrolyte radially inward from the radial perimeter to the radial center of the catalyst bed prior to the liquid electrolyte exiting the catalyst bed.

In this manner, a hybrid redox fuel cell system comprises, a hybrid redox fuel cell including an anode side and a cathode side, a trickle bed reactor including a catalyst bed fluidly connected to the cathode side of the hybrid redox fuel cell, and a controller. Furthermore, the controller includes instructions stored in non-transitory memory thereon, the instructions executable to, direct a reductant to the anode side, direct a liquid electrolyte to the cathode side, wherein the liquid electrolyte includes a metal ion at a higher oxidation state and the metal ion at a lower oxidation state, and generate power at the hybrid redox fuel cell by way of reducing the metal ion at the higher oxidation state to the lower oxidation state at the cathode side while oxidizing the reductant at the anode side. In a first example, the hybrid redox fuel cell system further comprises, wherein the instructions are further executable to oxidize the metal ion at the lower oxidation state to the higher oxidation state at the catalyst bed. In a second example, optionally including the first example, the hybrid redox fuel cell system further comprises, wherein the instructions are further executable to direct the liquid electrolyte from the catalyst bed to the cathode side after oxidizing the metal ion at the lower oxidation state to the higher oxidation state. In a third example, optionally including one or more of the first and second examples, the hybrid redox fuel cell system further comprises, wherein the instructions are further executable to balance a rate of reducing the metal ion at the higher oxidation state to the lower oxidation state at the cathode side with a rate of oxidizing the metal ion at the lower oxidation state to the higher oxidation state at the catalyst bed to maintain a total amount of metal ion at the higher oxidation state at the cathode side and the catalyst bed constant. In a fourth example, optionally including one or more of the first through third examples, the hybrid redox fuel cell system further comprises, wherein the catalyst bed includes chemolithotrophic microorganisms immobilized on a biomass support. In a fifth example, optionally including one or more of the first through fourth examples, the hybrid redox fuel cell system further comprises, wherein directing the liquid electrolyte to the cathode side includes directing the liquid electrolyte to the cathode side without directing the liquid electrolyte to the anode side. In a sixth example, optionally including one or more of the first through fifth examples, the hybrid redox fuel cell system further comprises, wherein the directing the reductant to the anode side includes directing only gaseous reductant to the anode side, wherein the anode side is fluidly decoupled from the catalyst bed. In a seventh example, optionally including one or more of the first through sixth examples, the hybrid redox fuel cell system further comprises, wherein the instructions are further executable to direct the liquid electrolyte from the catalyst bed to the cathode side after oxidizing the metal ion at the lower oxidation state to the higher oxidation state. In an eighth example, optionally including one or more of the first through seventh examples, the hybrid redox fuel cell system further comprises, wherein the trickle bed reactor further includes a flow distribution device, wherein the liquid electrolyte is directed by the flow distribution device radially and axially across the catalyst bed prior to exiting the trickle bed reactor.

In this manner, a hybrid redox fuel cell system includes, a hybrid redox fuel cell including an anode side and a cathode side, a trickle bed reactor including a first catalyst bed fluidly connected to the cathode side, and a controller including instructions stored in non-transitory memory thereon, the instructions executable to, direct a reductant to the anode side, recirculate a liquid electrolyte between the cathode side and the first catalyst bed, wherein the liquid electrolyte includes a metal ion at a higher oxidation state and the metal ion at a lower oxidation state, wherein power is generated at the hybrid redox fuel cell by way of reducing the metal ion at the higher oxidation state to the lower oxidation state at the cathode side while oxidizing the reductant at the anode side. In a first example, the hybrid redox fuel cell system further includes, wherein upon fluidly contacting the first catalyst bed, the metal ion at the lower oxidation state is oxidized to the metal ion at the higher oxidation state. In a second example, optionally including the first example, the hybrid redox fuel cell system further includes a recycle control valve fluidly coupling a discharge from the first catalyst bed with an inlet to the first catalyst bed, wherein the instructions are further executable to open the recycle control valve to recycle a portion of the liquid electrolyte, upon exiting the first catalyst bed, back to the first catalyst bed prior to directing the portion of the liquid electrolyte to the cathode side. In a third example, optionally including one or more of the first and second examples, the hybrid redox fuel cell system further includes, wherein the instructions are further executable to change a valve position of the recycle control valve to a more open position to increase the portion of the liquid electrolyte recycled to the first catalyst bed responsive to a rate of oxidizing the metal ion at the lower oxidation state to the metal ion at the higher oxidation state at the first catalyst bed being less than a rate of reducing the metal ion at the higher oxidation state to the metal ion at the lower oxidation state at the cathode side. In a fourth example, optionally including one or more of the first through third examples, the hybrid redox fuel cell system further includes, wherein the instructions are further executable to change a valve position of the recycle control valve to a more open position to increase the portion of the liquid electrolyte recycled to the first catalyst bed responsive to a concentration of the metal ion at the higher oxidation state at the cathode side being less than a threshold concentration. In a fifth example, optionally including one or more of the first through fourth examples, the hybrid redox fuel cell system further includes a second trickle bed reactor including a second catalyst bed, wherein upon fluidly contacting the second catalyst bed, the metal ion at the lower oxidation state is oxidized to the metal ion at the higher oxidation state, and wherein the instructions are further executable to, responsive to a flow rate of the liquid electrolyte through the recycle control valve to the first catalyst bed being greater than a threshold flow rate, recirculating the liquid electrolyte between the cathode side and the second catalyst bed.

In this manner, a hybrid redox fuel cell system includes, a hybrid redox fuel cell including an anode side and a cathode side, a first catalyst bed fluidly connected to the cathode side of the hybrid redox fuel cell, the first catalyst bed including a substrate layer spiral wound with a catalyst layer into a jelly roll structure, and a controller including instructions stored in non-transitory memory thereon, the instructions executable to, direct a reductant to the anode side, and recirculate a liquid electrolyte between the cathode side and the first catalyst bed, wherein the liquid electrolyte includes a metal ion at a higher oxidation state and the metal ion at a lower oxidation state, wherein power is generated at the hybrid redox fuel cell by way of reducing the metal ion at the higher oxidation state to the lower oxidation state at the cathode side while oxidizing the reductant at the anode side. In a first example, the hybrid redox fuel cell system further includes, wherein the metal ion at the lower oxidation state is oxidized to the metal ion at the higher oxidation state at the first catalyst bed. In a second example, optionally including the first example, the hybrid redox fuel cell system further includes a recycle control valve fluidly coupling a discharge from the first catalyst bed with an inlet to the first catalyst bed, wherein the instructions are further executable to open the recycle control valve to recycle a portion of the liquid electrolyte, upon exiting the first catalyst bed, back to the first catalyst bed prior to directing the portion of the liquid electrolyte to the cathode side. In a third example, optionally including one or more of the first and second examples, the hybrid redox fuel cell system further includes, wherein the instructions are further executable to change a valve position of the recycle control valve to a more open position to increase the portion of the liquid electrolyte recycled to the first catalyst bed responsive to a rate of oxidizing the metal ion at the lower oxidation state to the metal ion at the higher oxidation state at the first catalyst bed being less than a rate of reducing the metal ion at the higher oxidation state to the metal ion at the lower oxidation state at the cathode side. In a fourth example, optionally including one or more of the first through third examples, the hybrid redox fuel cell system further includes, wherein the instructions are further executable to change a valve position of the recycle control valve to a more open position to increase the portion of the liquid electrolyte recycled to the first catalyst bed responsive to a concentration of the metal ion at the higher oxidation state at the cathode side being less than a threshold concentration.

Figure 13:
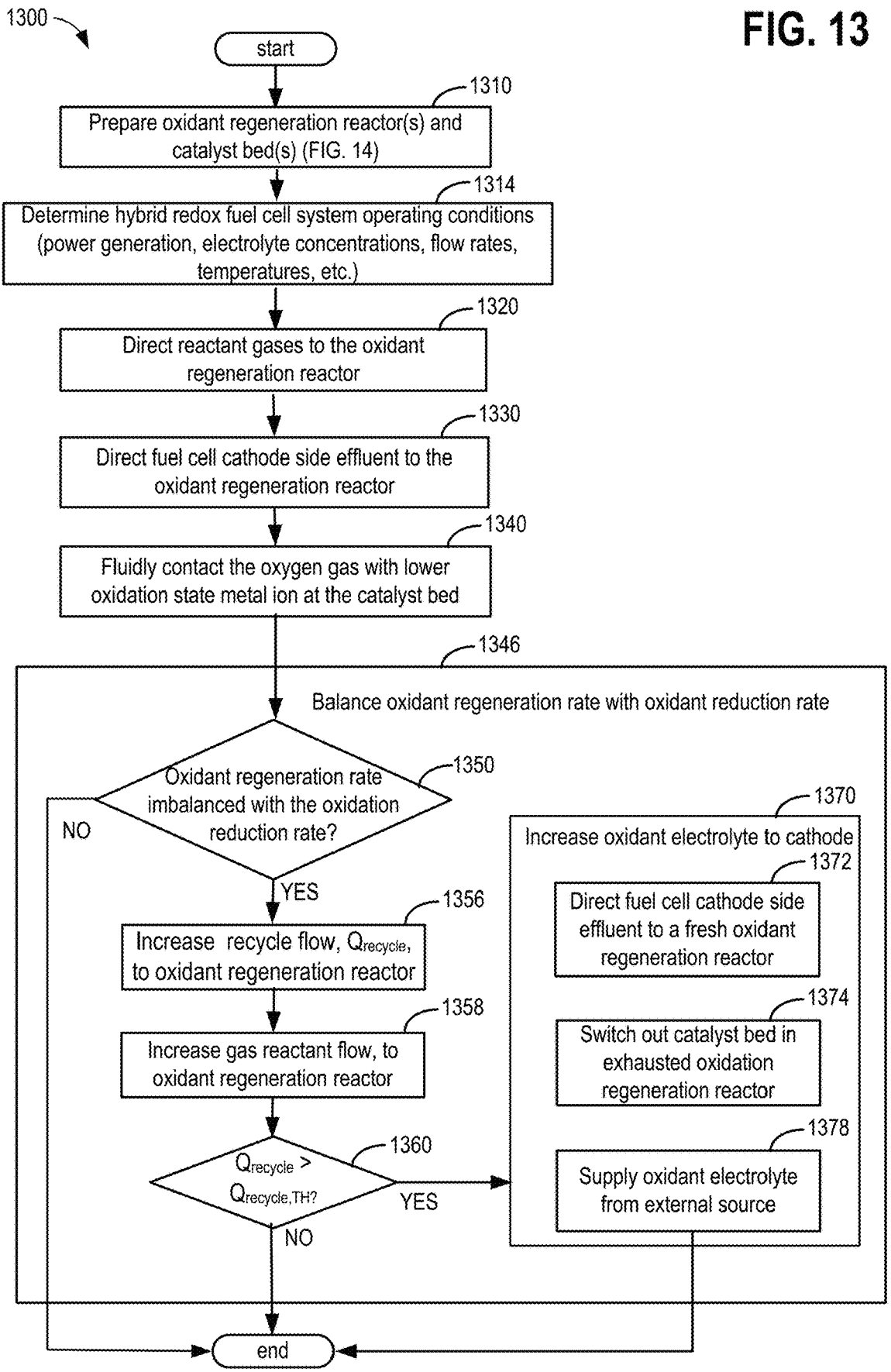
FIGS. 13 and 14 show flow charts for a method for operating the hybrid redox fuel cell system of FIG. 8.
Figure 14:
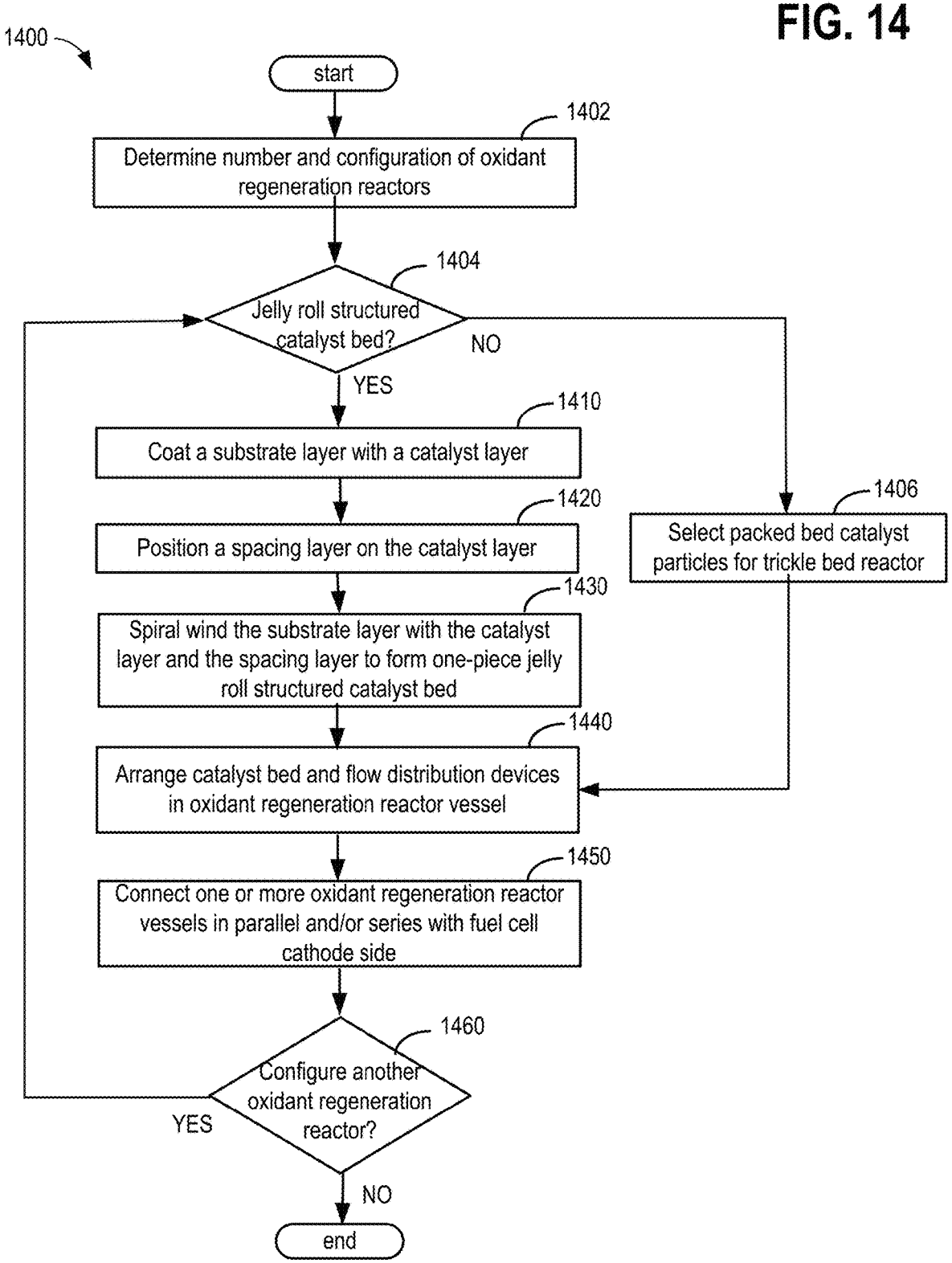
Figure 15:
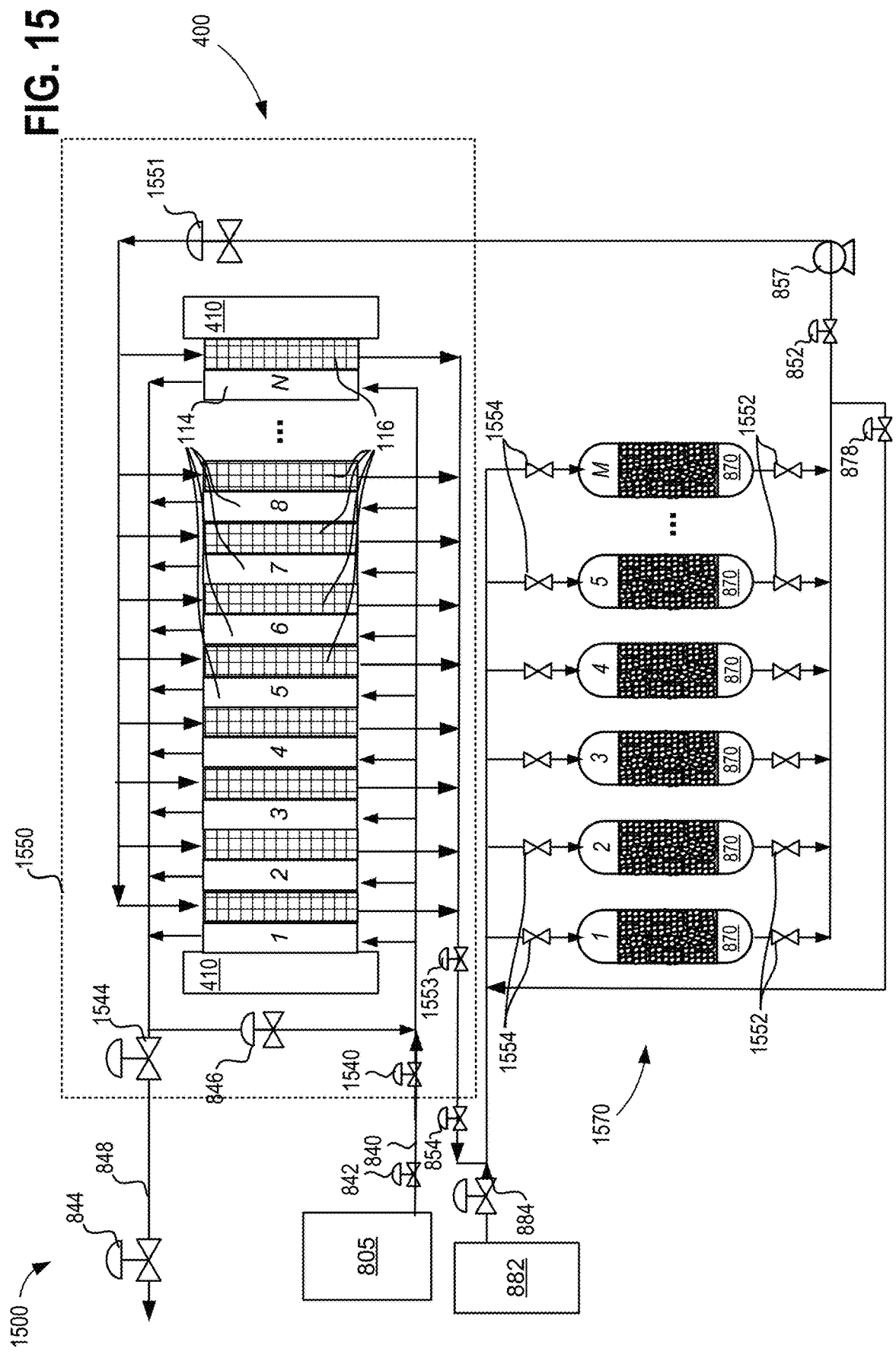
FIG. 15 shows a partial schematic of a hybrid redox fuel cell system including a plurality of hybrid redox fuel cells and a plurality of oxidant regeneration reactors.

Turning now to FIGS. 13 and 14, they illustrate flow charts for example methods 1300 and 1400 of operating the hybrid redox fuel cell system 800 (or hybrid redox fuel cell system 1500). Instructions for carrying out methods 1300 and 1400 may be executed by a controller 812 based on instructions stored in non-transitory memory of the controller 812 and in conjunction with signals received from sensors of the hybrid redox fuel cell system 800 (or hybrid redox fuel cell system 1500), such as the sensors described above with reference to FIGS. 1, 4, 8, and 15. The controller 812 may employ actuators of the hybrid redox fuel cell system 800 and/or 1500 to adjust operation of the hybrid redox fuel cell 100, power conditioner, and/or oxidant regeneration reactor 870, according to the methods described below.

Method 1300 begins at 1310 by preparing one or more oxidant regeneration reactors and their corresponding catalyst beds. The method continues with method 1400 at 1402, where the number and configuration of oxidant regeneration reactors to be utilized in the hybrid redox fuel cell system 800 is determined. As indicated by the schematic for the oxidant delivery system 556, the oxidant regeneration reactor may include a bio-oxidation and/or air oxidation process and a trickle (packed) bed and/or spiral wound bed design. Furthermore, the hybrid redox fuel cell system 800 may include one or more oxidant regeneration reactors connected in series and/or parallel. Choice of oxidant regeneration process and reactor design (or a combination thereof), and the number of oxidant regeneration reactors depends on a power generation capacity of the hybrid redox fuel cell system 800, available materials and technology, the available facilities, and the cost and budget for the hybrid redox fuel cell system 800. For example, utilizing a jelly roll structured catalyst bed in an oxidant regeneration reactor may increase oxidant regeneration rates as compared to a trickle (packed) catalyst bed, but may be associated with a higher upfront capital costs. As another example, bio-oxidation may be desirable when compared with air oxidation because of its carbon-capture characteristics and because of the higher reaction rates achievable for chemolithotrophic oxidant regeneration (equation (3)) as compared with air oxidation (equation (4)), but additional facilities for handling, and management, cultivation of the microorganisms and associated biomass may be involved. Further still, a plurality of oxidant regeneration reactors (connected in series and/or parallel) may provide increased oxidant regeneration capacity relative to one or fewer number of oxidant regeneration reactors, but are associated with higher capital costs, increased process complexity and maintenance costs, as well as lower system reliability.

Furthermore, the number of hybrid redox fuel cells 100, N in each cell assembly 400 may be different and/or the same, and the number of oxidant regeneration reactors 870 may be more or less than the number N of hybrid redox fuel cells 100. The numbers N and M may be predetermined according to predicted power generation demand and/or the desired reaction rate of ferric ion regeneration for the hybrid redox fuel cell system 800 (or hybrid redox fuel cell system 1500).

Method 1400 continues at 1404 where it is determined if a catalyst bed for an oxidant regeneration reactor 870 is a jelly roll structured catalyst bed. For the case where the catalyst bed is not a jelly roll structured catalyst bed at 1404, the method 1400 continues at 1406 where catalyst particles for a trickle (packed) bed, including carbon-supported precious metal catalyst particles and/or graphite catalyst particles, are selected. Returning to 1404, for the case where the catalyst bed is a jelly roll structured catalyst bed, method 1400 continues at 1410, where a substrate layer 904 may be coated with a catalyst layer 906. As described above, the substrate layer 904 may include a porous membrane or other substrate such as a carbon cloth or carbon paper. The substrate layer 904 may be permeable to oxygen and carbon dioxide gas and electrolyte fluid of the hybrid redox fuel cell system 800. In the case of air oxidation, the catalyst layer 906 may include one or more of different types of catalysts such as Pt, Pd, Ru, or alloys thereof and a catalyst loading on the substrate layer 904 may include from 0.05 to 5 mg/cm$^2$. In the case of bio-oxidation, the catalyst layer 906 may include chemolithotrophic microorganisms immobilized on a layer of biomass support particles (BSP). In either case of air oxidation or bio-oxidation, the catalyst loading (wt. % metal, or wt. % microorganisms, or wt. % catalytically active material) may be increased or decreased to increase or decrease a specific oxidation (of the lower oxidation state metal ion) reaction rate per volume of catalyst bed. Reducing a catalyst loading, or utilizing metal alloy catalysts may aid in reducing the catalyst bed manufacturing cost, and may also aid in reducing corrosion of the catalyst, which can preserve oxidation reaction rates throughout the useful life of the catalyst bed. The catalyst layer 906 may be uniformly coated across the entire surface of the substrate layer 904.

At 1420, a spacing layer 910 may be positioned on the catalyst layer 906. As described above, the spacing layer 910 may include a porous mesh, foam or sponge. In some example, the spacing layer 910 may include a plastic material, such as a plastic mesh or a polymer foam or polymer sponge. The porosity of the spacing layer 910 may be selected to promote higher flows of electrolyte fluid and oxygen or carbon dioxide gas through the pores of the spacing layer 910 as compared to flows of the electrolyte fluid and oxygen or carbon dioxide gas through the pores of the substrate layer 904 and the catalyst layer 906. The spacing layer 910 may completely cover the catalyst layer 906. At 1430, the substrate layer 904 with the catalyst layer 906 may be spiral wound to form a one-piece jelly roll structured catalyst bed 920. If the spacing layer 910 is positioned on top of the catalyst layer 906, the spacing layer 910 may also be spiral wound and incorporated into the jelly roll structured catalyst bed 920 such that the spacing layer 910 separates successive substrate layers 904 and catalyst layers 906 within the jelly roll. In this way, the spacing layer can aid in distributing fluid inside the catalyst bed across the entire surface of the catalyst layer 906, thereby increasing an oxidant regeneration rate in the oxidant regeneration reactor. Integrating the substrate layer 904, catalyst layer 906, and spacing layer 910 into a single one-piece catalyst bed can facilitate easier installation and removal of the catalyst bed 920, thereby reducing downtime, and operating and manufacturing costs.

Next, method 1400 continues at 1440 where the catalyst bed (jelly roll structured bed or trickle packed bed) is arranged in the oxidant regeneration reactor vessel along with any flow distribution devices. As described herein, the flow distribution devices aid in distributing fluids entering the oxidant regeneration reactor throughout the catalyst bed such that stagnant regions of the catalyst bed during operation of the oxidant regeneration reactor are reduced. Some non-limiting examples of flow distribution devices include inlet and outlet pipes, upper and lower shrouds, as described with reference to FIG. 10, as well as other types of baffles. Method 1400 continues at 1450 where the oxidant regeneration vessel is fluidly connected to the cathode side 116 of one or more hybrid redox fuel cells 100. In the case where there are multiple oxidant regeneration reactors, the current oxidant regeneration reactor may be fluidly connected in parallel and/or in series to one or more other oxidant regeneration reactor vessels.

Next, method 1400 continues at 1460 where it determines if additional oxidant regeneration reactors are to be configured. For the case where additional oxidant regeneration reactors are to be configured, method 1400 returns to 1404. For the case where additional oxidant regeneration reactors are not to be configured, method 1400 ends, and returns to method 1300 after 1310. After 1310, method 1300 continues at 1314 where the controller 812 determines hybrid redox fuel cell system operating conditions such as electrolyte species concentrations, gas pressures and flow rates, temperatures, pH, power generation at the hybrid redox fuel cell 100, and the like. Determining the operating conditions may also include the controller 812 determining calculated quantities from measured parameters such as the reductant oxidation reaction rate at the anode side 114 and the oxidant reduction rate at the cathode side 116, and the associated current delivered to the power conditioning unit 804 and the external load 802.

In one example, the reductant oxidation rate may be calculated from a difference in the steady-state inlet and outlet flows of reductant from each hybrid redox fuel cell 100, while the oxidant reduction rate may be calculated from the difference in inlet and outlet flows of oxidant from each hybrid redox fuel cell 100, as shown by equations (9) and (10):

$$\text{Rate of reductant oxidation(anode side)[mol/time]} = ([R]_{inlet} - [R]_{outlet}) * Q_{R,tot} \quad (9)$$

$$\text{Rate of oxidant reduction(cathode side)[mol/time]} = ([M^{x+}]_{inlet} - [M^{x+}]_{outlet}) * Q_{liq,tot} \quad (10)$$

[R] represents the molar concentration of reductant, $Q_{red,tot}$ represents the volumetric flow rate through the anode side 114, $[M^{x+}]$ represents the molar concentration of higher oxidation state metal, and $Q_{liq,tot}$ represents the total volumetric flow rate through the cathode side 116. For the case of a hydrogen-ferric/ferrous ion hybrid redox fuel cell, [R] corresponds to hydrogen gas concentration, $[H_2]$, $Q_{R,tot}$ is the total gas flow rate to the anode side 114, $[M^{x+}]$ corresponds to $[Fe^{3+}]$, and $Q_{liq,tot}$ is the total liquid electrolyte flow rate to the cathode side 116. Furthermore, the associated current delivered from the hybrid redox fuel cell 100 is given by equation (11), and may be determined using the oxidant reduction rate and the stoichiometric ratio of electrons (e.g., y) consumed for each mole of $M^{x+}$ reduced according to equation (2).

$$\text{Current} = (\text{Rate of oxidant reduction}) * (y \text{ mol } e^-)/(1 \text{ mol } M^{x+})(1F/\text{mol } e^-)(96485 C/F) \quad (11)$$

Next, at 1320, the controller 812 directs reactant gases (e.g., oxygen, carbon dioxide, air) to the oxidant regeneration reactor 1320. In one example, the flow rate of reactant gases may be determined by the controller 812 by calculating the oxidant reduction rate at the cathode side 116. In particular, the controller 812 may set a flow rate of the oxygen from the regeneration gas source 882 to the oxidant regeneration reactor 870 corresponding to an oxidant regeneration rate that balances the oxidant reduction rate at the cathode side. Furthermore, in the case of bio-oxidation of the lower oxidation state metal ion at the oxidant regeneration reactor 870, the controller 812 may maintain a flow rate of carbon dioxide gas to the oxidant regeneration reactor 870 above a threshold $CO_2$ flow rate to sustain a metabolism rate of the chemolithotrophic microorganisms therein.

Method 1300 continues at 1330 where the controller 812 directs effluent from the cathode side 116 to the oxidant regeneration reactor. Effluent from the cathode side 116 may include reactants and products of the cathode side oxidant reduction reaction given by equation (2), including unreacted higher oxidation state metal ion, lower oxidation state metal ion, as well as supporting electrolyte species such as salt counterions and hydrogen protons. In the case where the hybrid redox fuel cell is a hydrogen ferric/ferrous ion fuel cell, the cathode side effluent may include ferric ion, ferrous ion, sulfate ion, and hydrogen protons. One or more sensors 836 may be positioned at the cathode side 116 (including at an outlet thereof) for measuring and transmitting data to the controller 812 associated with electrolyte species concentrations, pH, temperature, and conductivity thereat.

Next at 1340, the inlet reactant gases and cathode effluent species, including the lower oxidation state metal ion, are fluidly contacted in the oxidant regeneration reactor 870 at a catalyst surface of the catalyst bed. The catalyst bed may include one or more of a trickle (packed) catalyst bed including carbon-supported precious metal catalyst particles and/or graphite catalyst particles, and a jelly roll structured catalyst bed with chemolithotrophic microorganisms immobilized on BSP. The precious metal catalyst particles may include Pt, Pd, Ru, Rd or their alloys, supported on a conductive carrier, such as carbon or graphite. In the case where the hybrid redox fuel cell is a hydrogen ferric/ferrous ion fuel cell, oxygen gas is fluidly contacted with ferrous ion at a catalyst surface of catalyst bed 874 to catalyze oxidation of the ferrous ion to ferric ion, thereby regenerating ferric ion for the cathode side reaction (equation (2)) of the hybrid redox fuel cell.

Method 1300 continues at 1346 where the controller 812 balances the oxidant regeneration rate at the oxidant regeneration reactor 870 with the oxidant reduction rate at the hybrid redox fuel cell cathode side 116. The oxidant regeneration rate refers to a rate of oxidation of the lower oxidation state metal ion to the higher oxidation state metal ion, taking place in one or more oxidant regeneration reactors 870 of the hybrid redox fuel cell system 800 (e.g., equation (3) or (4)). The oxidant reduction rate refers to the rate of reduction of the higher oxidation state metal ion to the lower oxidation state metal ion, taking place in one or more hybrid redox fuel cells 100 (e.g., cathode side 116 reaction (2)). When the oxidant regeneration rate is balanced (e.g., equal) with the oxidant reduction rate, the concentration of ferric ion supplied to the hybrid redox fuel cell, and the resultant power generated by the hybrid redox fuel cell system, can both be maintained approximately constant during operation of the hybrid redox fuel cell system 800.

In one example, the hybrid redox fuel system 800 may be operated to maintain a desired concentration of $[M^{x+}]$ and $[M^{(x-1)+}]$ in the cathode side 116 of the hybrid redox fuel cell and in the catalyst bed 874 of oxidant regeneration reactor to achieve a desired power generation from the hybrid redox fuel cell system while balancing the oxidant regeneration rate with the oxidant reduction rate. As such, balancing the oxidant regeneration rate with the oxidant reduction rate may include adjusting operation of the hybrid redox fuel system 800 to maintain desired metal ion concentrations in one or more of the hybrid redox fuel cell 100 and the oxidant regeneration reactor 870. For example, responsive to $[M^{x+}]$ at one or more of the cathode side 116 and the catalyst bed 874 being less than a threshold concentration, $[M^+]_{TH}$, the controller 812 may increase a flow rate of the effluent from one or more oxidant regeneration reactors through a regeneration recycle flow control device 878 to recycle more of the effluent back to inlet of the oxidant regeneration reactor 870; in another example, the controller 812 may responsively increase a supply of $[M^{x+}]$ from the supporting electrolyte source 806 through flow control device 811 to one or more of the cathode side 116 of the hybrid redox fuel cell 100 or the oxidant regeneration reactor 870.

As shown at 1346, various strategies to balance the oxidant regeneration rate with the oxidant reduction rate can be employed by the controller 812. At 1350, the controller 812 may determine if an oxidant regeneration rate at the oxidant regeneration reactor 870 and an oxidant reduction rate at the hybrid redox fuel cell 100 are imbalanced. The oxidant regeneration rate for each oxidant regeneration reactor 870 may be calculated from the difference between oxidant regeneration reactor outlet and inlet concentrations of higher oxidation state metal ion and the total liquid electrolyte flow rate thereto, $Q_{regen,tot}$, according to equation (12). The oxidant reduction rate for each hybrid redox fuel cell 100 may be calculated as described above, according to equation (10).

Rate of oxidant regeneration(oxidant regen.reactor)
$$[\text{mol/time}] = ([M^{x+}]_{outlet} - [M^{x+}]_{inlet}) * Q_{regen,tot} \quad (12)$$

In one example, responsive to an oxidant regeneration rate being less than the oxidant reduction rate at 1350, the controller 812 at 1356, may increase a flow rate of the effluent from one or more oxidant regeneration reactors through a regeneration recycle flow control device 878 to recycle more of the effluent back to inlet of the oxidant regeneration reactor 870. In another example, responsive to an oxidant regeneration rate being less than the oxidant reduction rate, the controller 812 at 1358 may increase a gas reactant flow from regeneration gas source 882 to the oxidant regeneration reactor. Increasing the gas reactant flow can increase a concentration of oxygen at the oxidant regeneration reactor, thereby increasing a rate of oxidant regeneration (equation (12)). Conversely, responsive to an oxidant regeneration rate being greater than the oxidant reduction rate, the controller 812 may decrease a flow rate of the effluent from one or more oxidant regeneration reactors through a regeneration recycle flow control device 878 to recycle less of the effluent back to inlet of the oxidant regeneration reactor 870; furthermore, the controller 812 may decrease a gas reactant flow from regeneration gas source 882 to the oxidant regeneration reactor.

Next, method 1300 continues at 1360 where the controller 812 may determine if a recycle flow rate $Q_{recycle}$ to the oxidant regeneration reactor 870 is greater than a threshold recycle flow rate, $Q_{recycle,TH}$. $Q_{recycle,TH}$ may correspond to a recycle flow rate above which a pressure drop across the oxidant regeneration reactor increases, thereby indicating a reduced efficiency of the oxidant regeneration reactor. For the case where $Q_{recycle} > Q_{recycle,TH}$, method 1300 continues at 1370, where the controller 812 may employ additional strategies for increasing the oxidant electrolyte supply to the cathode side, and balancing the oxidant reduction rate and the oxidant regeneration rate. For example, at 1372, the controller 812 may direct cathode side effluent to a fresh oxidant regeneration reactor 870. As depicted in FIG. 15, multiple oxidant regeneration reactors 870 may be fluidly connected to and fluidly isolated from the hybrid redox fuel cell 100 by way of upstream and downstream valves 1554 and 1552, respectively. By fluidly connecting an additional oxidant regeneration reactor to the hybrid redox fuel cell, additional oxidant regeneration capacity can be added to the system, thereby increasing an oxidant regeneration rate. At the same time, the controller 812 may switch out an exhausted catalyst bed by fluidly isolating an oxidant regeneration reactor from the hybrid redox fuel cell, at 1374. As such, the isolated catalyst bed may be serviced or replaced with a fresh catalyst bed, before being returned to service, while maintaining operation of the hybrid redox fuel cell system 1500.

In another example, at 1378, the controller 812 may supply additional oxidant electrolyte from an external source, such as supporting electrolyte source 806, in order to increase $[M^{x+}]$ at the cathode side 116. Additional oxidant electrolyte may be supplied to one or both of cathode side 116 and oxidant regeneration reactor 870 from supporting electrolyte source 806 by way of oxidant supply pump 810. In the case where the oxidant regeneration rate is lower than an oxidant reduction rate, an amount of higher oxidation state metal ion returning to the cathode side is reduced. Thus, supplying additional oxidant electrolyte from the supporting electrolyte source 806 can aid in compensating for the decrease in [$M^{x+}$]. Although not shown in FIG. 13, the controller 812 can employ additional strategies for balancing the rate of oxidant reduction with the rate of oxidant regeneration in the hybrid redox fuel cell system. In one example, an oxidant regeneration reactor temperature may be increased to increase an oxidant regeneration reaction rate therein. Furthermore, trickle (packed) catalyst beds may be replaced with jelly roll structured catalyst beds, to increase oxidant regeneration reaction rates. Furthermore, oxidant regeneration reactors with air oxidation catalyst beds may be replaced with oxidant regeneration reactors with bio-oxidation catalyst beds, to increase oxidant regeneration reaction rates.

Returning to method 1300 at 1350, for the case where the oxidant regeneration rate and the oxidant reduction rate are not imbalanced, or at 1360 for the case where $Q_{recycle}$ is not greater than $Q_{recycle,TH}$, or after 1370, method 1300 ends. In this manner, a method of operating a hybrid redox fuel cell system comprises, flowing a reductant through an anode side of a hybrid redox fuel cell of the hybrid redox fuel cell system, and flowing a liquid electrolyte through a cathode side of the hybrid redox fuel cell, wherein the liquid electrolyte includes a metal ion at a higher oxidation state and the metal ion at a lower oxidation state. The method further comprises directing the liquid electrolyte from the cathode side to a catalyst bed inside a trickle bed reactor, and reducing the metal ion at the higher oxidation state to the lower oxidation state at the cathode side while oxidizing the reductant at the anode side to generate power at the hybrid redox fuel cell. In a first example, the method further comprises, oxidizing the metal ion at the lower oxidation state to the higher oxidation state at the catalyst bed. In a second example, optionally including the first example, the method further comprises, wherein oxidizing the metal ion at the lower oxidation state to the higher oxidation state at the catalyst bed comprises fluidly contacting oxygen gas with the metal ion at the lower oxidation state at the catalyst bed. In a third example, optionally including one or more of the first and second examples, the method further comprises, wherein the catalyst bed includes a chemolithotrophic microorganism immobilized on a biomass support particle. In a fourth example, optionally including one or more of the first through third examples, the method further comprises, fluidly contacting carbon dioxide gas with the chemolithotrophic microorganism at the catalyst bed. In a fifth example, optionally including one or more of the first through fourth examples, the method further comprises, balancing a rate of reducing the metal ion at the higher oxidation state to the lower oxidation state at the cathode side with a rate of oxidizing the metal ion at the lower oxidation state to the higher oxidation state at the catalyst bed, wherein a total amount of the metal ion at the higher oxidation state at the cathode side and the catalyst bed is constant. In a sixth example, optionally including one or more of the first through fifth examples, the method further comprises, directing the liquid electrolyte from the catalyst bed to the cathode side after oxidizing the metal ion at the lower oxidation state to the higher oxidation state. In a seventh example, optionally including one or more of the first through sixth examples, the method further comprises, directing the liquid electrolyte from a radial perimeter to a radial center of the catalyst bed prior to directing the liquid electrolyte from the catalyst bed to the cathode side. In an eighth example, optionally including one or more of the first through seventh examples, the method further comprises, directing the liquid electrolyte, upon exiting the catalyst bed, to the cathode side of the hybrid redox fuel cell, without directing the liquid electrolyte to the anode side. In a ninth example, optionally including one or more of the first through eighth examples, the method further comprises, recycling a portion of the liquid electrolyte, upon exiting the catalyst bed, back to the catalyst bed prior to directing the portion of the liquid electrolyte to the cathode side.

FIGS. 4, 10, and 11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 4, 10, and 11 are drawn approximately to scale, although other dimensions or relative dimensions may be used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A hybrid redox fuel cell system, comprising:
a hybrid redox fuel cell including an anode side through which a reductant is flowed and a cathode side through which a liquid electrolyte is flowed,
a trickle bed reactor including a catalyst bed fluidly connected to the cathode side, and a plurality of flow control devices, each of the plurality of flow control devices comprising one or more of a control valve, a flow meter and a pressure regulator, the plurality of flow control devices comprising:
- a first flow control device located between a reductant supply line, the reductant supply line fluidly connecting a reductant source and the anode side, and a reductant discharge line; and
- a second flow control device located between a first oxidant supply line, the first oxidant supply line fluidly connecting an outlet of the catalyst bed and the cathode side, and an oxidant discharge line, the oxidant discharge line fluidly connecting the cathode side and an inlet of the catalyst bed;

wherein,
- the liquid electrolyte includes a metal ion at a higher oxidation state and the metal ion at a lower oxidation state, and
- power is generated at the hybrid redox fuel cell by reducing the metal ion at the higher oxidation state to the lower oxidation state at the cathode side while oxidizing the reductant at the anode side.

2. The hybrid redox fuel cell system of claim 1, wherein the hybrid redox fuel cell includes a hydrogen-ferric/ferrous ion hybrid redox fuel cell, the reductant includes hydrogen gas, the metal ion at the lower oxidation state includes ferrous ion, and the metal ion at the higher oxidation state includes ferric ion.

3. The hybrid redox fuel cell system of claim 1, further comprising a pump positioned between the hybrid redox fuel cell and the catalyst bed, wherein the pump directs the liquid electrolyte from the cathode side to the catalyst bed, and recirculates the liquid electrolyte from the catalyst bed back to the cathode side after the liquid electrolyte fluidly contacts the catalyst bed.

4. The hybrid redox fuel cell system of claim 3, wherein the metal ion at the lower oxidation state is oxidized to the metal ion at the higher oxidation state while fluidly contacting the catalyst bed.

5. The hybrid redox fuel cell system of claim 4, wherein a concentration of the metal ion at the higher oxidation state is higher in the liquid electrolyte directed from the catalyst bed to the cathode side than the concentration of the metal ion at the higher oxidation state in the liquid electrolyte directed from the cathode side to the catalyst bed.

6. The hybrid redox fuel cell system of claim 5, wherein the anode side is fluidly decoupled from the catalyst bed except for hydrogen protons crossing over from the anode to the cathode side through a separator.

7. The hybrid redox fuel cell system of claim 3, wherein the catalyst bed includes a chemolithotrophic microorganism.

8. The hybrid redox fuel cell system of claim 7, wherein the catalyst bed includes the chemolithotrophic microorganism immobilized on biomass support particles.

9. The hybrid redox fuel cell system of claim 8, further comprising a regeneration gas source, wherein carbon dioxide gas is directed from the regeneration gas source to the catalyst bed.

* * * * *